United States Patent
Zemła

(10) Patent No.: US 12,519,657 B2
(45) Date of Patent: Jan. 6, 2026

(54) BROWSER-BASED AUTHENTICATION SCHEME

(71) Applicant: Shore Labs Zbigniew Zemła, Katowice (PL)

(72) Inventor: Zbigniew Józef Zemła, Katowice (PL)

(73) Assignee: Shore Labs Zbigniew ZEMŁA, Katowice (PL)

( * ) Notice: Subject to any disclaimer, the term of this patent is extended or adjusted under 35 U.S.C. 154(b) by 0 days.

(21) Appl. No.: 18/667,984

(22) Filed: May 17, 2024

(65) Prior Publication Data

US 2024/0388443 A1 Nov. 21, 2024

Related U.S. Application Data

(60) Provisional application No. 63/503,441, filed on May 19, 2023.

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01)

(58) Field of Classification Search
None
See application file for complete search history.

(56) References Cited

U.S. PATENT DOCUMENTS

| 8,671,384 | B2 | 3/2014 | Hilerio et al. |
| 9,164,671 | B2 | 10/2015 | Hilerio et al. |

(Continued)

FOREIGN PATENT DOCUMENTS

| WO | 2011/156155 A2 | 12/2011 |
| WO | 2022/266364 A1 | 12/2022 |

OTHER PUBLICATIONS

Garba, A., Chen, Z., Guan, Z. and Srivastava, G., 2021. LightLedger: A novel blockchain-based domain certificate authentication and validation scheme. IEEE Transactions on Network Science and Engineering, 8(2), pp. 1698-1710. (Year: 2019).*

(Continued)

*Primary Examiner* — Luu T Pham
*Assistant Examiner* — Edward X Long
(74) *Attorney, Agent, or Firm* — Nicholson, De Vos, Webster & Elliott, LLP

(57) ABSTRACT

Disclosed herein is a method performed by a client application of an authentication provider application. The method includes deriving a reference to a domain name based on an identity handle of a user, querying a domain name system to obtain one or more identity records associated with the identity handle, obtaining one or more public keys based on the one or more identity records, and deriving an authentication endpoint web address based on the identity handle. The authentication endpoint web address is usable to access the authentication provider application. The method further includes sending data to the authentication provider application using the authentication endpoint web address, wherein the authentication provider application is able to access one or more private keys corresponding to the one or more public keys for generating digital signatures. The method further includes receiving, from the authentication provider application, one or more digital signatures.

14 Claims, 22 Drawing Sheets

(56) References Cited

U.S. PATENT DOCUMENTS

| | | | |
|---|---|---|---|
| 11,252,252 | B2 | 2/2022 | Boodman et al. |
| 11,797,289 | B2 | 10/2023 | Zemla |
| 2004/0139227 | A1 | 7/2004 | Takeda |
| 2007/0033569 | A1 | 2/2007 | Davidson et al. |
| 2009/0282248 | A1 | 11/2009 | Dias |
| 2009/0313472 | A1 | 12/2009 | Guccione et al. |
| 2010/0017598 | A1 | 1/2010 | Rodriguez et al. |
| 2014/0040979 | A1 | 2/2014 | Barton et al. |
| 2015/0312190 | A1* | 10/2015 | Rankin ................ H04L 51/52 709/206 |
| 2015/0317171 | A1 | 11/2015 | Blazek |
| 2016/0191645 | A1 | 6/2016 | Hayton et al. |
| 2016/0316364 | A1 | 10/2016 | Blanco et al. |
| 2017/0093587 | A1* | 3/2017 | Glisson ................ H04L 63/062 |
| 2017/0154017 | A1 | 6/2017 | Kristiansson et al. |
| 2018/0018150 | A1 | 1/2018 | Liu et al. |
| 2019/0068578 | A1* | 2/2019 | Balakrishnan ...... H04L 63/0807 |
| 2019/0158353 | A1 | 5/2019 | Johnson et al. |
| 2020/0356397 | A1 | 11/2020 | Kumatagi et al. |
| 2021/0117308 | A1 | 4/2021 | Burgos |
| 2022/0029796 | A1 | 1/2022 | Peddada et al. |
| 2022/0116390 | A1* | 4/2022 | Jass ........................ H04W 12/06 |
| 2022/0131852 | A1 | 4/2022 | Sharma et al. |
| 2024/0195801 | A1* | 6/2024 | Novick ................ G06Q 40/02 |

OTHER PUBLICATIONS

Bansal, C., Bhargavan, K., Delignat-Lavaud, A. and Maffeis, S., 2014. Discovering concrete attacks on website authorization by formal analysis. Journal of Computer Security, 22(4), pp. 601-657. (Year: 2006).*

ICANN, "FAQs for Registrants: About ICANN", available online at <https://www.icann.org/resources/pages/about-icann-faqs-2019-02-25-en>, Feb. 25, 2019, 12 pages.

ICANN, "List_of_Accredited_Registrars", available online at <https://web.archive.org/web/20230518073455/https://www.icann.org/en/accredited-registrars>, 4 pages.

RFC 1034: P. Mockapetris, "Domain Names—Concepts and Facilities", Request for Comments: 1034, Nov. 1987, 55 pages.

RFC 1035: P. Mockapetris, "Domain Names—Implementation and Specification", Request for Comments: 1035, Nov. 1987, 55 pages.

Wikipedia, "Integrated Encryption Scheme", available online at <https://en.wikipedia.org/wiki/Integrated_Encryption_Scheme>, Feb. 2023, 3 pages.

International Search Report and Written Opinion, PCT App. No. PCT/IB2024/054831, Aug. 19, 2024, 16 pages.

Advisory Action, U.S. Appl. No. 176/55,341, Feb. 6, 2023, 3 pages.

Amadeo, R., "Chrome Apps are dead, as Google shuts down the Chrome Web Store section", Ars Technica, Available Online at <https://arstechnica.com/gadgets/2017/12/google-shuts-down-the-apps-section-of-the-chrome-web-store/>, Dec. 6, 2017, pp. 1-6.

Amir Herzberg et al., "DNS-based email sender authentication mechanisms: A critical review," 2009 [retrieved on Dec. 13, 2024], Computers & Security, vol. 28, Issue 8, pp. 731-742, downloaded from <url>:https://www.sciencedirect.com. (Year: 2009).

Apple, "iPhone to Support Third-Party Web 2.0 Applications", Newsroom, Press Release, Available Online at <https://www.apple.com/newsroom/2007/06/11iPhone-to-Support-Third-Party-Web-2-0-Applications/>, Jun. 11, 2007, pp. 1-3.

Caniuse.com, "Offline web applications", Support tables for HTML5, CSS3, etc., Available Online at <https://caniuse.com/offline-apps>, Statistics for Feb. 2022, Retrieved Mar. 15, 2022, pp. 1-2.

Citrix Systems, Inc., "What is containerization?", Containerization Definition, Available Online at <https://www.citrix.com/solutions/app-delivery-and-security/what-is-containerization.html>, Retrieved Mar. 15, 2022, , pp. 1-10.

Final Office Action, U.S. Appl. No. 17/655,341, Oct. 31, 2022, 29 pages.

Google Developers, "Google I/O 2012—The Next Evolution of Chrome Apps", Available Online at <transcriptvids.com/v/j80FAr1YR-0.html>, Jun. 28, 2012, pp. 1-13.

Google Developers, "Introduction to Service Worker", Available Online at <https://developers.google.com/web/ilt/pwa/introduction-to-service-worker>, Jun. 10, 2019, Retrieved Mar. 15, 2022, pp. 1-8.

Google, "Understand the Architecture", Chrome Apps Stable, Available Online at <https://web.archive.org/web/20130621085400/http://developer.chrome.com/apps/app_architecture.html>, Jun. 21, 2013, Retrieved Mar. 15, 2022, pp. 1-3.

Google, "What are Packaged Apps?", Google Chrome Apps, Available Online at <https://web.archive.org/web/20120908054313/http://developer.chrome.com:80/apps/about_apps.html>, Sep. 8, 2012, Retrieved Mar. 15, 2022, pp. 1-3.

International Search Report and Written Opinion, PCT App. No. PCT/IB2023/052547, Jun. 28, 2023, 10 pages.

Lepage, P., "Persistent storage," <https://web.dev/persistent-storage/>, Creative Commons Attribution 4.0 License, Apache 2.0 License, May 12, 2020, 7 pages.

Linode, "Object Storage: High availability S3-compatible object storage", Available Online at <https://www.linode.com/products/object-storage/>, Retrieved Mar. 15, 2022, pp. 1-11.

Mahemoff, M., "Extensions, Packaged Apps, and Hosted Apps in the Chrome Web Store", Chrome Web Store, Available Online at <https://web.archive.org/web/20121015142440/https://developers.google.com/chrome/web-store/articles/apps_vs_extensions>, Sep. 2010, pp. 1-3.

MDN, "Cache", Web APIs, Available Online at <https://developer.mozilla.org/en-US/docs/Web/API/Cache>, Mar. 2, 2022, Retrieved Mar. 15, 2022, pp. 1-11.

MDN, "Origin", MDN Web Docs Glossary: Definitions of Web-related terms, Available Online at <https://developer.mozilla.org/en-US/docs/Glossary/Origin>, Oct. 7, 2021, Retrieved Mar. 15, 2022, pp. 1-2.

MDN, "Same-origin policy", Web security, Available Online at <https://developer.mozilla.org/en-US/docs/Web/Security/Same-origin_policy>, Feb. 7, 2022, Retrieved Mar. 15, 2022, pp. 1-8.

MDN, "ServiceWorker", Web APIs, Available Online at <https://developer.mozilla.org/en-US/docs/Web/API/ServiceWorker>, Feb. 3, 2022, Retrieved Mar. 15, 2022, pp. 1-6.

Microsoft Azure, "What is a container?", Standardized, portable packaging for your applications, Available Online at <https://azure.microsoft.com/en-US/overview/what-is-a-container/#overview>, 2022, Retrieved Mar. 15, 2022, pp. 1-12.

Microsoft Edge Development, "Overview of Progressive Web Apps (PWAs)", Microsoft Docs, Available Online at <https://docs.microsoft.com/en-US/microsoft-edge/progressive-web-apps-chromium/>, Feb. 28, 2022, pp. 1-6.

Microsoft Edge Development, "Use a Web App Manifest to integrate a Progressive Web App into the operating system", Available Online at <https://docs.microsoft.com/en-US/microsoft-edge/progressive-web-apps-chromium/how-to/web-app-manifests>, Jan. 24, 2022, pp. 1-6.

Mozilla Contributors, "CryptoKey.extractable", last updated Jan. 28, 2015, available online at <https://web.archive.org/web/20160809024942/https://developer.mozilla.org/en-US/docs/Web/API/CryptoKey/extractable> via The Wayback Machine as retrieved Aug. 9, 2016, 2 pp.

Mozilla Contributors, "Same-origin policy", last edited Feb. 7, 2022, available online at <https://web.archive.org/web/20220316180526/https://developer.mozilla.org/en-US/docs/Web/Security/Same-origin_policy> via The Wayback Machine as retrieved Mar. 16, 2022, pp. 1-8.

Non-Final Office Action, U.S. Appl. No. 17/655,341, Jun. 8, 2022, 21 pages.

Non-Final Office Action, U.S. Appl. No. 17/655,341, Mar. 10, 2023, 31 pages.

Non-Final Office Action, U.S. Appl. No. 18/467,502, Dec. 19, 2024, 34 pages.

Notice of Allowance, U.S. Appl. No. 17/655,341, Jun. 15, 2023, 14 pages.

Notice of Allowance, U.S. Appl. No. 17/655,341, Sep. 13, 2023, 2 pages.

(56) References Cited

OTHER PUBLICATIONS

Posnick, J., "Using Web Transport", Available Online at <https://web.dev/webtransport/>, Jun. 8, 2020, pp. 1-14.

Roberto Perdisci et al., "WSEC DNS: Protecting recursive DNS resolvers from poisoning attacks," 2009 [retrieved on Dec. 14, 2024], 2009 IEEE/IFIP International Conference on Dependable Systems & Networks, pp. 3-12, downloaded from <url>:https://ieeexplore.ieee.org. (Year: 2009).

Russell, A., "Progressive Web Apps: Escaping Tabs Without Losing Our Soul", Available Online at <https://medium.com/@slightlylate/progressive-apps-escaping-tabs-without-losing-our-soul-3b93a8561955>, Aug. 10, 2015, pp. 1-11.

Scandipwa, "History of Progressive Web Apps", Published in Progressive Web Apps, Available Online at <https://medium.com/progressivewebapps/history-of-progressive-web-apps-4c912533a531>, Jul. 19, 2019, pp. 1-5.

Stack Exchange Inc., "What do people use non-extractable WebCrypto keys for?", Cryptography, available online at <https://web.archive.org/web/20220310055849/https://crypto.stackexchange.com/questions/85587/what-do-people-use-non-extractable-webcrypto-keys-for> via The Wayback Machine as retrieved Mar. 10, 2022, pp. 1-3.

T. Hansen et al., "DomainKeys Identified Mail (DKIM) Service Overview," Network Working Group Request for Comments: 5585, pp. 1-23, downloaded from <url>:https://d1wqtxts1xzle7.cloudfront.net (Year: 2009).

Tante, "The Third Web", Version 1.1, Available Online at <https://tante.cc/2021/12/17/the-third-web/#ENDBOX>, Dec. 17, 2021, pp. 1-30.

Watson, M., "Web Cryptography API", W3C Recommendation, available online at <https://www.w3.org/TR/WebCryptoAPI/>, Jan. 26, 2017, pp. 1-125.

Wikipedia, "Amazon S3", Available Online at <https://en.wikipedia.org/wiki/Amazon_S3>, Mar. 14, 2022, Retrieved on Mar. 15, 2022, pp. 1-13.

Wikipedia, "AWS Lambda", Available Online at <https://en.wikipedia.org/wiki/AWS_Lambda>, Nov. 11, 2021, Retrieved on Mar. 15, 2022, pp. 1-3.

Wikipedia, "Bootloader", Available Online at <https://en.wikipedia.org/wiki/Bootloader>, Mar. 9, 2022, Retrieved Mar. 15, 2022, pp. 1-6.

Wikipedia, "Decentralization", Available Online at <https://en.wikipedia.org/wiki/Decentralization#Technological_decentralization>, Feb. 17, 2022, Retrieved Mar. 15, 2022, pp. 1-33.

Wikipedia, "Distributed computing", Available Online at <https://en.wikipedia.org/wiki/Distributed_computing>, Jan. 12, 2022, Retrieved Mar. 15, 2022, pp. 1-14.

Wikipedia, "DNS over HTTPS", Available Online at <https://en.wikipedia.org/wiki/DNS_over_HTTPS>, Mar. 3, 2022, Retrieved Mar. 15, 2022, pp. 1-10.

Wikipedia, "DNS over HTTPS", last edited Mar. 3, 2022, available online at <https://web.archive.org/web/20220307142145/https://en.wikipedia.org/wiki/DNS_over_HTTPS> via The Wayback Machine as retrieved Mar. 7, 2022, pp. 1-11.

Wikipedia, "DNS-based Authentication of Named Entities", last edited Dec. 17, 2021, available online at <https://web.archive.org/web/20220316052237/https://en.wikipedia.org/wiki/DNS-based_Authentication_of_Named_Entities> via The Wayback Machine as retrieved Mar. 16, 2022, pp. 1-8.

Wikipedia, "Domain Name System", Available Online at <https://en.wikipedia.org/wiki/Domain_Name_System>, Mar. 7, 2022, Retrieved Mar. 15, 2022, pp. 1-22.

Wikipedia, "Domain Name System", last edited Mar. 7, 2022, available online at <https://web.archive.org/web/20220316014255/https://en.wikipedia.org/wiki/Domain_Name_System> via The Wayback Machine as retrieved Mar. 16, 2022, pp. 1-24.

Wikipedia, "DomainKeys Identified Mail", last edited Mar. 1, 2022, available online at <https://web.archive.org/web/20220315190051/https://en.wikipedia.org/wiki/DomainKeys_Identified_Mail> via The Wayback Machine as retrieved Mar. 15, 2022, pp. 1-13.

Wikipedia, "End-to-end encryption", Available Online at <https://en.wikipedia.org/wiki/End-to-end_encryption>, Mar. 2, 2022, Retrieved Mar. 15, 2022, pp. 1-8.

Wikipedia, "In technology and the Internet" from "Decentralization", last edited Feb. 9, 2025, available online at <https://en.wikipedia.org/wiki/Decentralization#In_technology_and_the_Internet>, retrieved Feb. 12, 2025, pp. 13-16 of 30.

Wikipedia, "Passwordless authentication", last edited Dec. 23, 2021, available online at <https://web.archive.org/web/20220307142244/https://en.wikipedia.org/wiki/Passwordless_authentication> via The Wayback Machine as retrieved Mar. 7, 2022, pp. 1-5.

Wikipedia, "Progressive web application", Available Online at <https://en.wikipedia.org/wiki/Progressive_web_application>, Mar. 15, 2022, Retrieved Mar. 15, 2022, pp. 1-8.

Wikipedia, "Progressive web application", last edited Mar. 15, 2022, available online at <https://web.archive.org/web/20220316055734/https://en.wikipedia.org/wiki/Progressive_web_application> via The Wayback Machine as retrieved Mar. 16, 2022, pp. 1-9.

Wikipedia, "Proxy server", Available Online at <https://en.wikipedia.org/wiki/Proxy_server>, Feb. 27, 2022, Retrieved Mar. 15, 2022, pp. 1-14.

Wikipedia, "Public-key cryptography", Available Online at <https://en.wikipedia.org/wiki/Public-key_cryptography>, Feb. 28, 2022, Retrieved Mar. 15, 2022, pp. 1-11.

Wikipedia, "Public-key cryptography", last edited Feb. 28, 2022, available online at <https://web.archive.org/web/20220316042929/https://en.wikipedia.org/wiki/Public-key_cryptography> via The Wayback Machine as retrieved Mar. 16, 2022, pp. 1-11.

Wikipedia, "Snapshot (computer storage)", Available Online at <https://en.wikipedia.org/wiki/Snapshot_(computer_storage)>, Dec. 16, 2021, Retrieved Mar. 15, 2022, pp. 1-3.

Wikipedia, "V8 (JavaScript engine)", Available Online at <https://en.wikipedia.org/wiki/V8_(JavaScript_engine)>, Mar. 2, 2022, Retrieved Mar. 15, 2022, pp. 1-4.

Wikipedia, "WebAuthn", last edited Feb. 18, 2022, available online at <https://web.archive.org/web/20220316055519/https://en.wikipedia.org/wiki/WebAuthn> via The Wayback Machine as retrieved Mar. 16, 2022, pp. 1-8.

Wikipedia, "WebSocket", Available Online at <https://en.wikipedia.org/wiki/WebSocket>, Mar. 6, 2022, Retrieved Mar. 15, 2022, pp. 1-9.

Red Hat, "27.4. Mail Transport Agent (MTA) Configuration," Enterprise Linux 5 Deployment Guide, downloaded from <https://docs.redhat.com/en/documentation/red_hat_enterprise_linux/5/html/deployment_guide/s1-email-switchmail> on Aug. 5, 2025, pages.

Wikipedia, "Message transfer agent", available online at <https://web.archive.org/web/20220311200826/https://en.wikipedia.org/wiki/Message_transfer_agent>, Mar. 11, 2022, pp. 1-3.

Wikipedia, "Sender Policy Framework", available online at <https://web.archive.org/web/20220316070654/https://en.wikipedia.org/wiki/Sender_Policy_Framework>, Mar. 16, 2022, pp. 1-9.

Eiji Kitamura, "Gaining security and privacy by partitioning the cache," 2020 [retrieved Jun. 9, 25], pp. 1-14, downloaded from <url>: https://web.archive.org/web/20220316020848/https://developer.chrome.com/blog/http-cache-partitioning. (Year: 2020).

Non-Final Office Action, U.S. Appl. No. 18/467,502, Jun. 12, 2025, 35 pages.

Advisory Action, U.S. Appl. No. 18/467,502, Jun. 2, 2025, 3 pages.

Final Office Action, U.S. Appl. No. 18/467,502, Mar. 31, 2025, 35 pages.

ICANN, "List of Accredited Registrars", available online at <https://web.archive.org/web/20220320060248/https://www.icann.org/>, Mar. 20, 2022, 4 pages.

\* cited by examiner

Example flow for setting up a web browser to be able to authenticate the user

Figure 7 — Example flow describing how a client application may establish an end-to-end encrypted communication channel with a third-party application

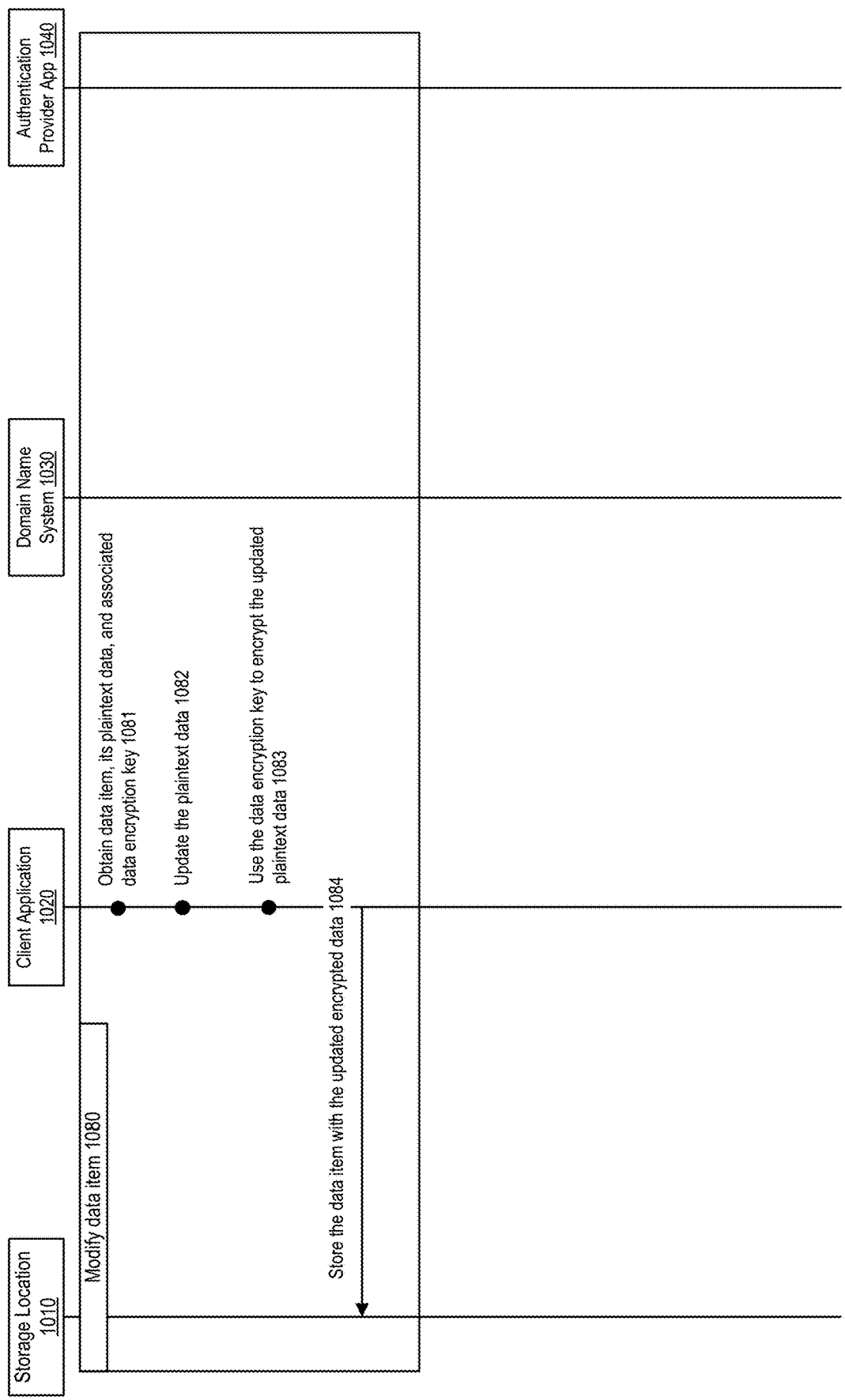

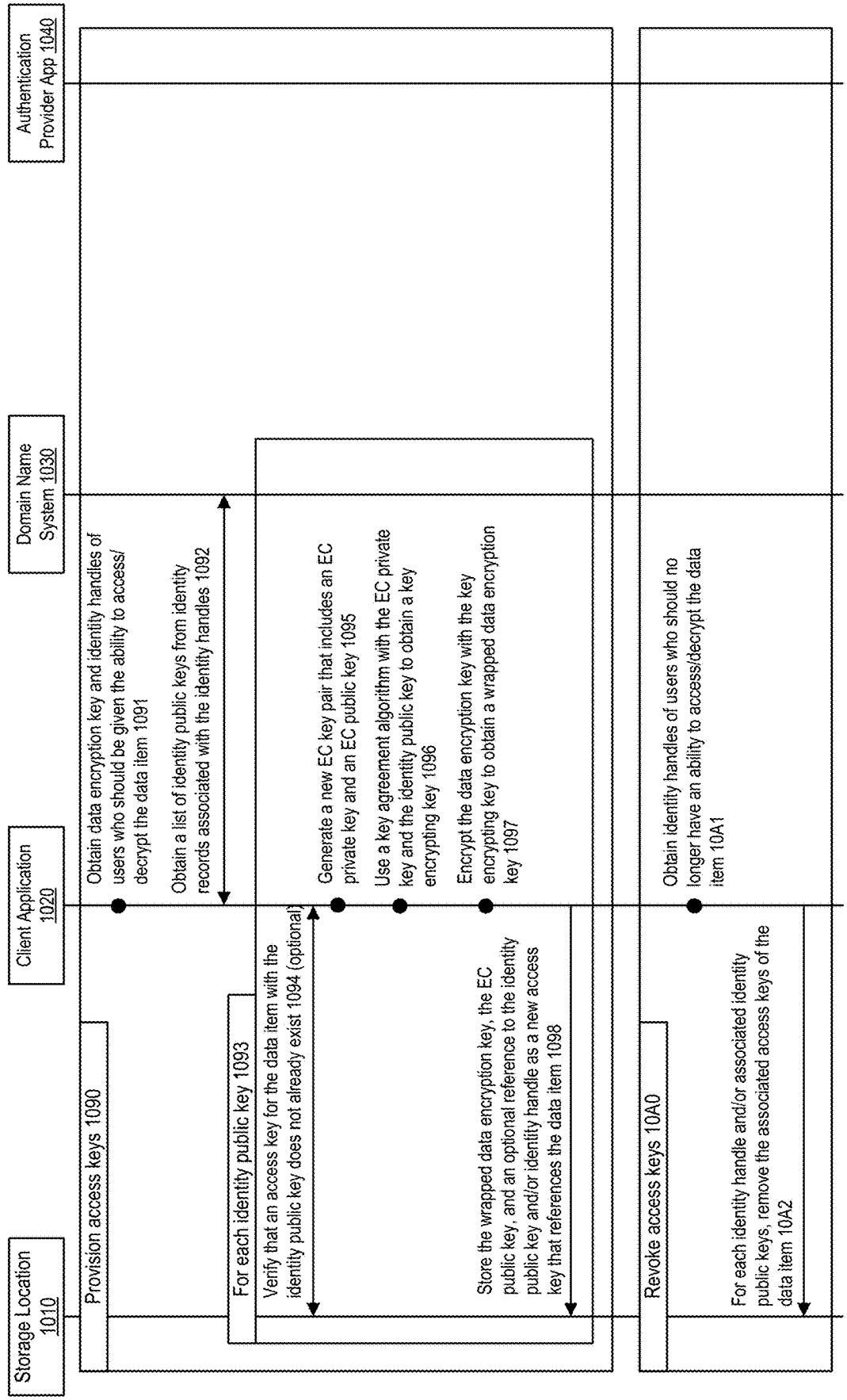

Figure 13

Example view of the user interface of the authentication provider web application during setup mode User's device 1301

Web browser 1302

Auth. app 1303 https://domain.example/ 1304

What identity handle would you like to setup?

john@domain.example 1305

→

To authorize this web browser to authenticate you as john@domain.example to client applications please logon to the domain control panel of the "domain.example" domain and add a TXT resource record for a "john_at_.domain.example" subdomain with a value of:

"key:BFUs9hqekKZZN6gqw0yCLFadx6Z+xFK3CzNE6qpWrfo3a8o9v4xM4ZDwxkX3Y+F8x/QY+Pa/PqhyUp="

1306

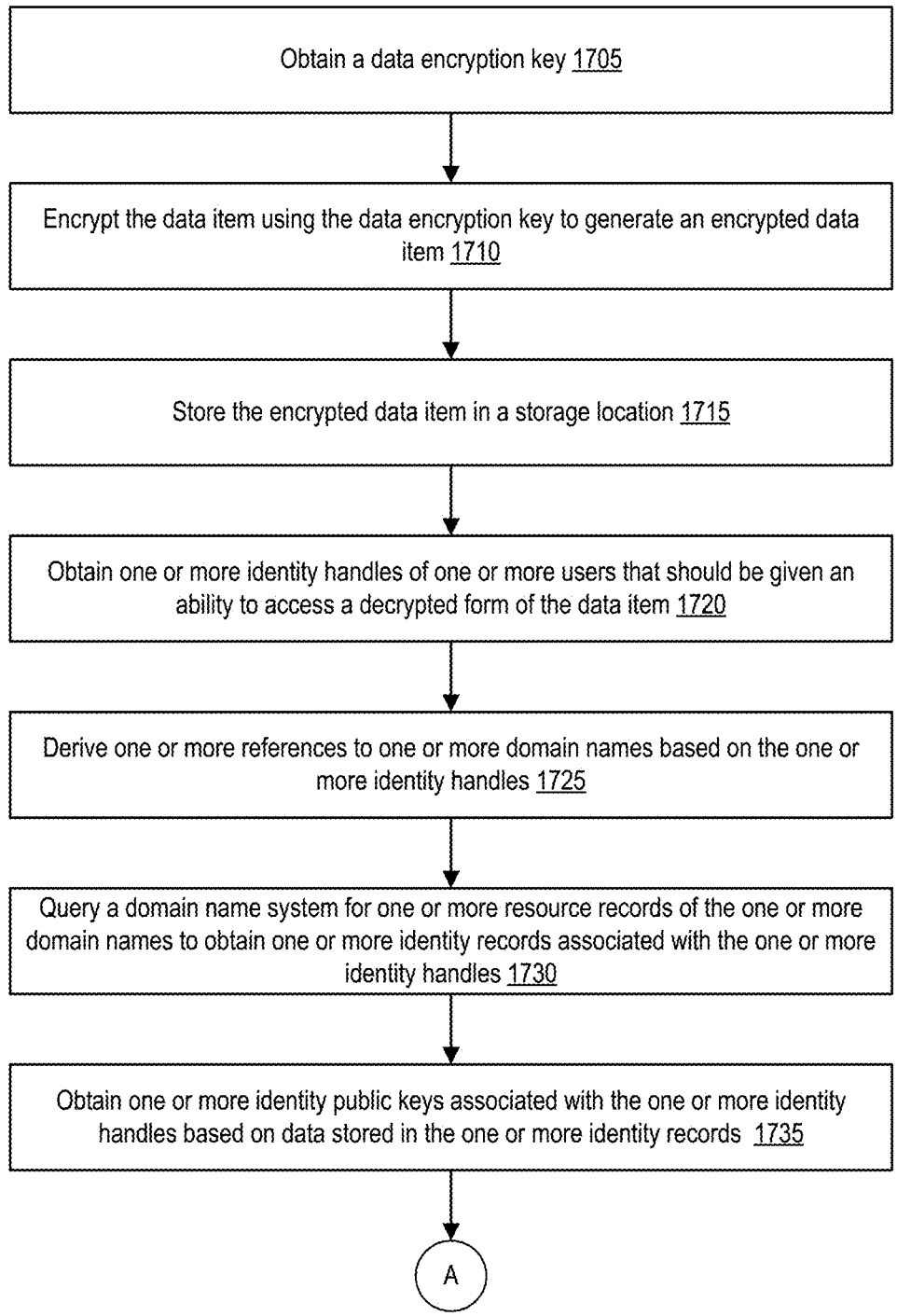

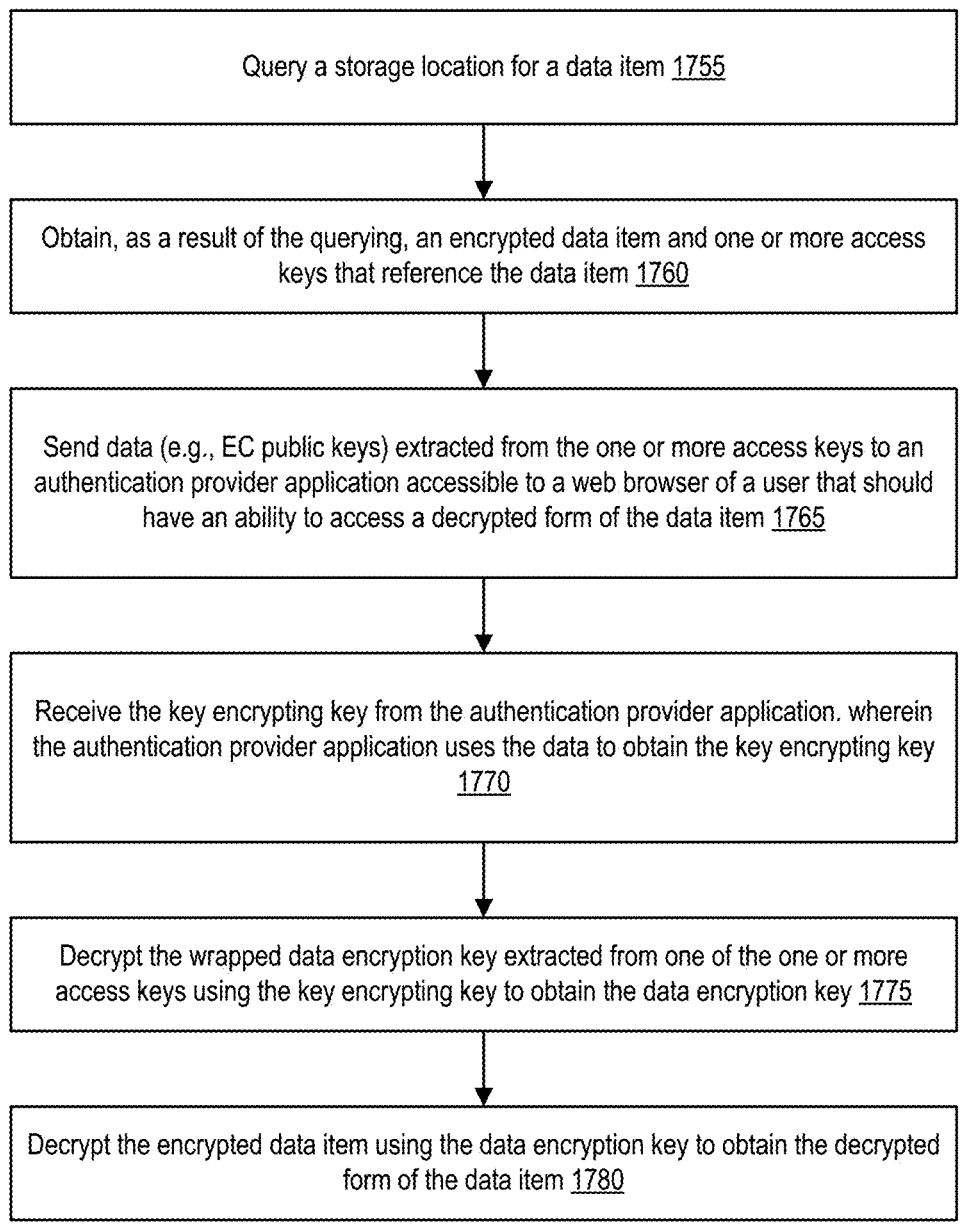

BROWSER-BASED AUTHENTICATION SCHEME

CROSS-REFERENCE TO RELATED APPLICATIONS

This application claims the benefit of U.S. Provisional Application No. 63/503,441 filed May 19, 2023, which is hereby incorporated by reference.

This application is related to International Application No. PCT/IB2024/054831, filed May 17, 2024, which also claims the benefit of U.S. Provisional Application No. 63/503,441 filed May 19, 2023, which is hereby incorporated by reference.

TECHNICAL FIELD

Embodiments disclosed herein relate to the field of user authentication, and more specifically, to a browser-based authentication scheme.

BACKGROUND

The Prevalent Reliance on Password-Based Authentication on the Internet

The ability to verify the identity of users is an important aspect of web applications and services. Even though various web-based authentication protocols have been developed and standardized over the years, most websites still require passwords to authenticate a user or use centralized authentication schemes.

Shortcomings of a Password-Based Authentication Scheme

A password-based authentication scheme, while being one of the oldest and simplest to implement, has several shortcomings. Users typically use passwords that are easy to remember and easy to crack with brute-force attacks. Password fatigue leads to the reuse of the same password across multiple websites, allowing attackers to successfully use leaked passwords from one service to gain access to the user's accounts on other services. Key-logging devices and insecure transport channels allow man-in-the-middle attackers to intercept user passwords. The user may also be susceptible to social engineering such as phishing attacks, which may lead to the password being revealed to attackers. Most password-based authentication schemes also rely on email as a method to reset or recover passwords, which effectively makes the email provider a centralized identity provider for the given user. Any unauthorized access or security breach to the user's account on such centralized identity provider (e.g., email account) may be catastrophic, as it may allow the attacker to reset passwords and access any applications/services that has been used with it.

Shortcomings of Centralized Authentication Schemes

A popular alternative to password-based authentication schemes is a family of schemes known as "social login," that allows users to authenticate to client applications through their accounts on online platforms. Such authentication schemes are usually loosely based on the OAuth protocol and provided by social networking platforms and big tech companies. While they offer certain benefits to users such as simplicity due to the user not having to remember another username or password and allowing the user to use existing accounts to sign in to multiple services, they also have many shortcomings, some of which are mentioned here. One shortcoming is high centralization and the potential for account loss. The social login provider has full access to the connected client applications for all of the users on their platform and can potentially utilize such access at any time without the user's knowledge or consent. Any security breach at the social login provider may be catastrophic and expose all connected accounts to unauthorized access. Additionally, a user's loss of a social login provider's account (e.g., due to a forgotten password or due to the account being suspended or terminated by the social login provider) will instantly block the user from signing in to any of the connected third-party applications or services. Another shortcoming is that when the social login service is down or has any issues, the user may not be able to sign in to other applications or services. Yet another shortcoming is the lack of universality and potential fragmentation. Client applications have to separately implement each specific social login method and it is likely that they may miss a login method that is preferred by the user. Also, when a user has multiple social login accounts and does not remember which one they used to sign in to a service, they may end up with multiple accounts on that service. Yet another shortcoming is the lack of privacy, as the social login provider is able to track the user's login attempts and usage patterns of connected third-party applications.

There is an unfulfilled need for a secure, easy to implement, universal, and decentralized authentication method that can work across a variety of devices (e.g., laptops, smartphones, etc.) and different types of client applications (e.g., desktop applications, web applications, etc.).

BRIEF DESCRIPTION OF THE DRAWINGS

The invention may best be understood by referring to the following description and accompanying drawings that are used to illustrate embodiments of the invention. In the drawings:

FIG. 13 is a diagram showing a user interface of an authentication provider application operating in the setup mode when accessed under the authentication endpoint web address through a web browser on a user's device, according to some embodiments.

FIG. 17B is a flow diagram of a method for querying for and decrypting a data item, according to some embodiments.

DETAILED DESCRIPTION

Figure 1:
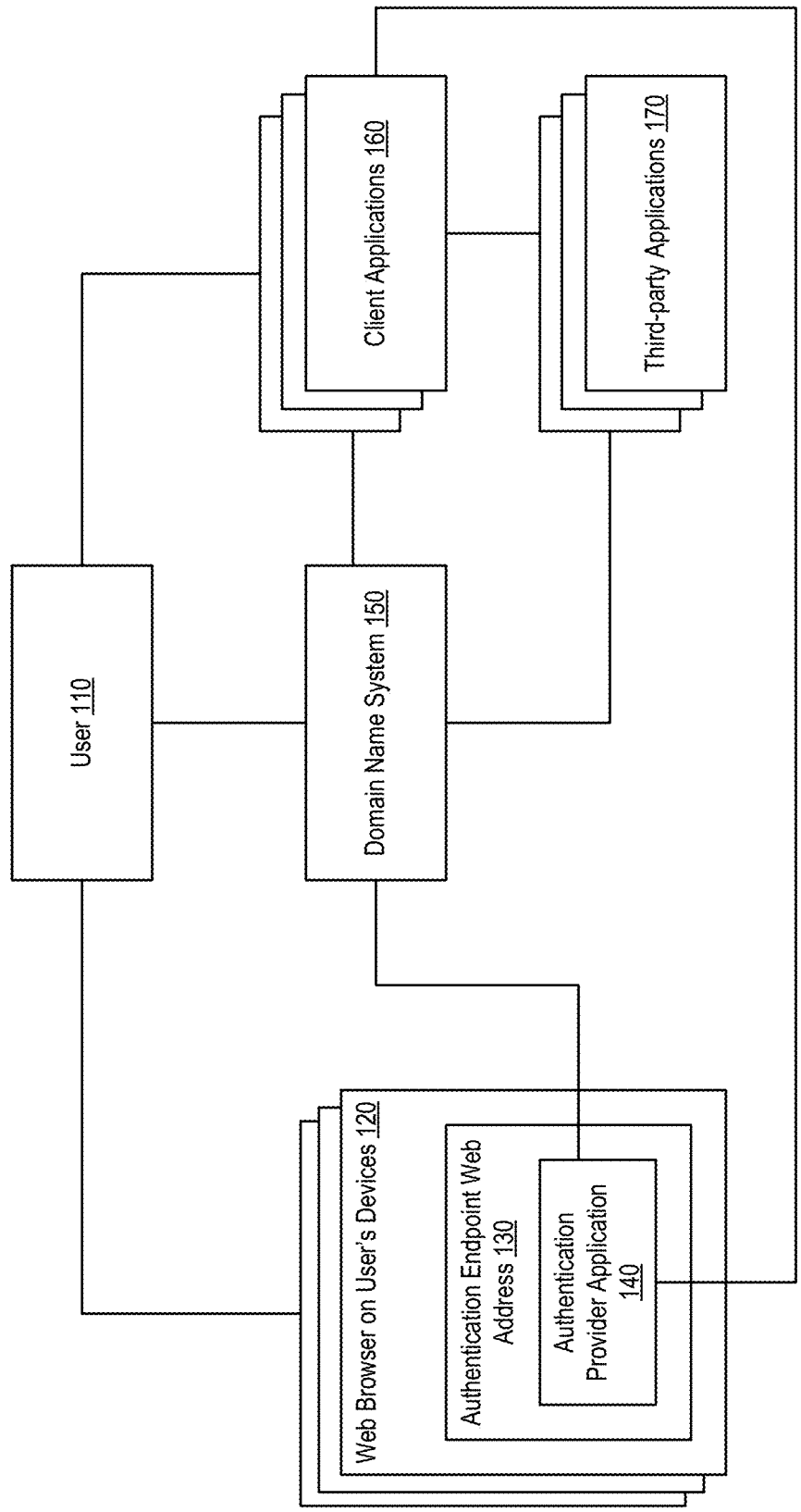
FIG. 1 is a diagram showing an overview of entities and their relationships, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, references in the specification to "embodiments," "embodiments disclosed herein," etc., indicate that some embodiments may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims/embodiments, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is an electronic device that is a piece of networking equipment, including hardware and software, which communicatively interconnects other equipment on the network (e.g., other network devices, end stations).

A novel web browser based decentralized authentication scheme is disclosed herein that allows users to prove their identity to client applications through a web browser installed on the user's device with a zero-knowledge proof that may be performed entirely within the web browser on the user's device, without a need for mediation by any central authority or specialized online identity management platforms. The authentication scheme further allows client applications to authenticate on behalf of the user to other applications, to send messages authenticated on behalf of the user to other applications, and/or to establish a secure end-to-end encrypted communications channel between a client application running in the user's web browser and any other application or service. Additionally, a novel data encryption and sharing scheme is disclosed herein that allows the data to be encrypted and shared by a client application with a group of users, in a way that allows it to be decrypted by any member of the group through the use of combined information accessible to the client application and the authentication provider application accessible in the user's web browser.

The disclosed authentication and encryption schemes may provide certain benefits compared to other authentication and/or encryption methods, some of which are mentioned herein below.

Password-Less Authentication

Embodiments disclosed herein provide password-less authentication, thereby reducing password fatigue and the potential for brute-force and phishing attacks. As will be further described herein, embodiments use cryptographic keys instead of passwords, which can be used to indirectly authenticate the user through a web browser that the user is using. The user does not need to use or remember passwords, and the authentication may be performed using something that the user already has—the web browser running on the user's computing device. In some embodiments, the web browser stores the private key in a way in which it cannot be extracted, even by the authentication provider application, thereby offering additional levels of protection against threat actors.

Device Based Authentication with Fine-Grained Control

A benefit of embodiments disclosed herein is that they provide visibility and fine-grained control over which devices may be used to authenticate the user. As will be further described herein, resource records of a domain name system (DNS) may be used to store the public key or a reference thereto for each web browser that may be used to authenticate the user. When a user loses access to a computing device on which an authorized web browser is installed (e.g., due to a theft or damage), the user can easily remove the corresponding public key from the resource record in the domain name system, thus deactivating the ability of such a web browser to authenticate the user. Similarly, when the user obtains a new computing device that the user wishes to use for authentication, the user may publish a corresponding public key that was generated and stored by the web browser on such device in a resource record of domain name system, thereby allowing such web browser on the new device to authenticate the user. At any time, the user is able to view a complete list of devices which may be used for authentication by the user by looking at the resource records of the domain name system (e.g., to ensure there are no obsolete entries or entries added by rogue third-parties). Since the domain name configuration may be managed by the user's organization, this also provides fine-grained control over which web browsers and associated devices are able to be used for authenticating the user (e.g., the organization may only allow the user to sign in to client applications through the web browser on a company-issued and controlled laptop). Such fine-grained control may make the authentication scheme suitable for zero-trust environments.

Provides an Identity Handle that can be Used with any Client Application

A benefit of embodiments disclosed herein is that they allow users to set up identity handles using domain names that they own or control, and to use them for authentication with any number of client applications. The identity handle may thus become a unique, decentralized, and global identifier for the user on the Internet.

Ability to Use Passphrases

A benefit of embodiments disclosed herein is that a passphrase may be used to additionally encrypt and protect the private key stored by the authentication provider application in the user's web browser. Such passphrase may be required by the authentication provider application each time the user attempts to authenticate to a client application, and offers additional layer of protection by adding another type of authentication (i.e., something that the user knows).

Ability to Keep Detailed Authentication Logs by the Client Applications

A benefit of embodiments disclosed herein is that client applications may be able to obtain and retain additional information (in addition to the identity handle) about a public key associated with the web browser on a user's device that was used to authenticate the user with the client application. As will be further described herein, a private key may be stored by the authentication provider application in a web browser installed on the user's device. The private key may be used to sign a challenge provided by a client application. The private key may be unique to each web browser on each of the user's devices and may cryptographically match a public key that can be obtained by the client application during the authentication process. Information regarding the public key that was used to successfully authenticate the user with a client application may be stored by the client application in the security logs, and may allow for associating each successful login with the specific web browser on a specific user's device that was used for authentication, and to subject the user to further identity checks if the user is signing in for the first time from a new web browser (e.g., it is the first time a specific public key is used during the user's authentication process).

Decentralization and the Novel Use of Standard Components and Systems that are Already Widely Available and Used A benefit of embodiments disclosed herein is that they do not require the presence of a specialized identity management platform, as they, for the most part, use standard protocols, systems, and components that are already widely used, and which form the foundation of the world wide web, such as a domain name system, web servers, and web browsers. This allows for swift implementation, a high level of flexibility and interchangeability of its components, and helps to avoid vendor lock-in. As will be further described herein, an authentication provider application running in a web browser on a user's device is used to authenticate the user by signing a challenge provided by a client application. There are multiple web browsers from independent vendors available on the market (e.g., Google Chrome®, Mozilla Firefox®, Microsoft Edge®), and web browsers work on various classes of devices (e.g., desktop computers, laptop computers, tablets, smartphones, smart TVs, and smart watches). This means that a user can potentially use any of such devices to be able to authenticate to client applications. As will be further described herein, a resource record in the domain name system may be used to store the public key. According to the Internet Corporation for Assigned Names (ICANN), there are currently over 2,500 ICANN-accredited registrars throughout the world that provide domain name registration services. Most of them also provide domain hosting services and allow the creation of TXT resource records in the domain name system. This means that any such registrar and domain hosting provider may be used with the authentication scheme disclosed herein, and they can be easily changed one for another with the help of domain name transfers and DNS zone transfers. Also, as will be further described herein, an authentication provider application may be a part of a static web page that is available under an authentication endpoint web address through the web browser. There are many web hosting providers on the Internet and most of them provide an ability to host static web pages. This means that any such web hosting provider may be potentially used to host an authentication provider application for the purpose of the authentication scheme disclosed herein. Since the private key may be stored by the authentication provider application on the client-side within the web browser, the web hosting providers may be easily switched, if needed. The freedom of the user to choose any web browser on any device, any domain name hosting provider, and any website hosting provider, allows for a high degree of decentralization and makes the infrastructure needed to implement the authentication scheme ubiquitous.

Ability of Users to Use their Own Domain Name for Authentication

A benefit of embodiments disclosed herein is that they allow users to manage and prove identities using any domain names that they own or control. With embodiments, the control over resource records of a domain name may become an ultimate proof of identity for the purpose of authentication, and the user is free to choose and use any identity handles that are compatible with the domain names that the user owns or controls. For example, an individual user may purchase the domain name "me.example" and use identity handles such as "john@me.example," "j@me.example," etc. Similarly, an organization may own a domain name (e.g., "company.example") and issue identity handles to their employees that are related to such domain name (e.g., "john@company.example," "jane@company.example," etc.). Such human-friendly identity handles may then be displayed in the user interface of client applications and/or third-party applications to uniquely identify the user.

Ability to Obtain Additional Information about a User

A benefit of embodiments disclosed herein is that they allow for associating additional information about the user with the user's identity handle such as the user's name, initials, and avatar image, which can then be displayed in the user interface of client applications and/or third-party applications. As will be further described herein, such information may be published as a part of the identity records in the domain name system that are associated with the identity handle.

Redundancy, Fault-Tolerance, and Scalability

A benefit of embodiments disclosed herein is that they provide high redundancy, fault-tolerance, and scalability. The domain name system typically has more than one name server which is responsible for serving resource records for a given domain name. Also, multiple address resource records (e.g., A or AAAA records) may be used to point a domain name at a collection of web servers that serve the same web application. During normal operation, the load is usually spread evenly across such web servers through the use of a round-robin algorithm or similar load balancing algorithm. If one of the servers fail, the domain name resolver or web browser will typically perform an automatic fail-over and retry the request with a different server. With such feature, the authentication scheme disclosed herein can be implemented in a redundant environment with no single point of failure that can scale horizontally with the demand.

Protection Against Offline Attacks

A benefit of embodiments disclosed herein is that they provide protection against offline attacks. As will be further described herein, the private key material that is used to sign a challenge may be stored entirely on the client-side within the user's web browser and may be non-extractable. When such web browser is not available (e.g., due to the user's device being powered off or offline), it cannot be used to authenticate the user to the client applications. This limits the potential attack surface and protects the user at times when the user may not be able to swiftly react to security breaches (e.g., at night or during transit).

Ability to Work Over Insecure Communication Channels

A benefit of embodiments disclosed herein is that they use a zero-knowledge proof to perform authentication, in which no details about the private key are disclosed to the client application or any other third-party. As will be further described herein, the authentication provider application may perform a zero-knowledge proof that it is able to use the appropriate private key by signing the challenge provided by the client application. This makes the authentication scheme immune to man-in-the-middle attacks and safe to operate over insecure communication channels (e.g., through the Hypertext Transfer Protocol (HTTP) protocol). It may also prevent the client application from stealing or otherwise deriving the private key material from the information that it receives during authentication. Also, the client application may include additional data in the challenge (e.g., a cryptographic nonce, name of the client, and/or a time limit within which authentication must be performed) that helps make the authentication scheme even more secure.

Ability of Fine-Grained Control Over Authorized Client Applications

A benefit of embodiments disclosed herein is that split-horizon DNS may be used to allow authentication of given identity handles only to client applications on or over certain computer networks. A split-horizon DNS uses a domain name server that responds with different sets of resource records depending on the source of the query. As will be further described herein, a client application may access the domain name system to obtain the public key that is used to verify a received digital signature and authenticate the user. In some embodiments, the name server of a domain name system may be operating in a split-horizon mode, allowing for fine-grained control over the allowed locations and/or networks on which the client application may reside. In an embodiment, resource records are used to store user details (e.g., cryptographic keys, name, and/or initials), and the domain name server may be configured in a split-horizon mode to return a different set of records for queries originating from an internal network and queries originating from an external network (e.g., the Internet). This may be used, for example, to present a different name of the authenticated user to the intranet and extranet client applications and/or third-party applications and/or to block visibility of certain user details and/or public keys depending on the location of the user, client applications, and/or third-party applications, offering domain administrators the ability to setup adaptive and fine-grained access and authentication control.

Ability to Relay the Authentication

A benefit of embodiments disclosed herein is that they allow the client application to authenticate on behalf of the user with third-party applications and services. This allows the client application to integrate with third-party applications and seamlessly access the user's data that is stored with such third-party applications, without the need to use application programming interface (API) tokens, OAuth protocol, or other specialized authentication methods. This may allow the client application to use remote storage services and connect with APIs of various other service providers on behalf of the authenticated user.

Ability to Sign Messages on Behalf of the Authenticated User

A benefit of embodiments disclosed herein is that the client application is able to digitally sign any message on behalf of the user and such digital signature may be independently verified by third parties that receive such signed message. This may be particularly useful for distributed applications that accept user input (e.g., a social media feed application which an authenticated user is using to post a status update). For example, an application may digitally sign a message as originating from the user and distribute it between peers (e.g., social media feed applications installed on other computing devices). Each peer may be able to independently verify the origin, integrity, and authenticity of the message, and display the verified identity handle of the user from which the message originated in its user interface.

Ability to Prove Identity for the Purpose of Establishing an End-to-End Encrypted Communication Channels A benefit of embodiments disclosed herein is that they allow for proving the identity of a communication endpoint and help in establishing an end-to-end encrypted communication channel between two client applications or between a client application and a third-party application. This property may be useful when client applications that are peers of a distributed system are communicating with each other over an insecure communication channel, and need to securely prove and verify their respective identities (e.g., the identities of the users on behalf of which they are communicating) to establish an end-to-end encryption that is immune to eavesdropping and man-in-the-middle attacks. As an example, such feature may be used by distributed messaging applications to establish secure end-to-end encrypted peer-to-peer links.

Ability to Work with Limited Connectivity and in Offline Mode

A benefit of embodiments disclosed herein is that an authentication provider application may be served using a Service Worker installed in a web browser that intercepts the requests related to the authentication endpoint web address and serves the authentication provider application directly from within the web browser (e.g., using the web browser's Cache API), without a need to communicate with any web servers. This allows the authentication provider application to work and be able to authenticate and sign messages on behalf of the user even when the web browser has limited connectivity to the Internet, is in offline mode, or a potential web server that was used to serve the authentication provider application is down. This may be particularly useful to desktop, command line, client-side, and other types of applications that are running on the user's device and use the authentication provider application to authenticate or sign messages on behalf of the user, as such applications may continue to work even when the user's device is offline.

Ability to Work as a Plugin

A benefit of embodiments disclosed herein is that the authentication provider application may be served by a plugin installed in a web browser that intercepts the requests related to the authentication endpoint web address and serves the authentication provider application directly from within the web browser. Such web browser plugin may be used to turn any website and its related web address into an authentication endpoint in the user's web browser, while still allowing the user to access and use the original website. For example, a website (e.g., a company or personal website) may already be served at some domain name (e.g., "domain.example") and a plugin installed in the user's web browser may intercept requests related to the domain name (e.g., with "https://domain.example" origin) and may allow the user to access both the original website (e.g., by passing through the web requests) and to use the same domain name as an authentication endpoint web address (e.g., by detecting a certain combination of request parameters in the intercepted request and serving the authentication provider application).

Ability to Provide Multi-Factor Authentication

A benefit of embodiments disclosed herein is that multiple digital signatures may be provided by the authentication provider application, each generated using a different private key, for which a matching public key may be obtained through identity records associated with the user's identity handle. This allows the authentication provider application to use one or more methods and related cryptographic keys to cryptographically sign the challenge (e.g., the challenge may be signed using a non-extractable private key stored on the client-side in the web browser running on a user's device, additionally signed using an encrypted private key stored on the client-side in the web browser on a user's device that requires a user-provided passphrase in order to be decrypted and used for signing, and additionally signed using a private key of a security device such as a fingerprint reader), thus allowing the herein discussed authentication scheme to support multi-factor authentication (i.e., authentication that requires multiple factors such as for example a web browser on a user's device (something that the user has), a passphrase (something that the user knows), and a fingerprint scan (something that the user is)). Depending on the information placed in the identity records associated with the user's identity handle, one or more of such factors and related digital signatures may be required to authenticate the user with client applications or perform other tasks (e.g., signing a message on the user's behalf).

Ability to Provide Multi-Party Authentication

A benefit of embodiments disclosed herein is that some of digital signatures may be generated and provided by external sources and/or services that are communicating with the authentication provider application, each generated using a different private key, for which a matching public key may be obtained through identity records associated with the user's identity handle. Such multi-party authentication may allow multiple parties to take a part in authenticating a user, thereby increasing the security of authentication process, and may provide the ability to monitor, log and control user's authentication attempts from independent sources, devices or entities, thereby enhancing transparency, security, and oversight, and allowing for real-time detection of unauthorized access attempts, auditing of authentication activities, and implementation of dynamic security policies.

High Degree of Privacy

A benefit of embodiments disclosed herein is that they provide a high degree of privacy, as the user's login attempts and client applications usage patterns are typically not accessible or made available to third parties. The requests made by the authentication provider application may be easily audited using developer tools that are available inside most modern web browsers to ensure that the user's activity is not tracked.

Ability to Provide Single Logout Functionality

A benefit of embodiments disclosed herein is that a functionality similar to single logout may be offered. As will be further described herein, a client application may periodically check that public keys that were used for authentication are still present in the domain name system. When such public keys are removed, the associated user may be automatically logged out from the client application. In particular, in some embodiments, the time-to-live (TTL) values of domain name system resource records may be used to control the frequency of the check, offering domain administrators the ability to set a balance between performance and security.

Such functionality may also help to ensure that user sessions are properly terminated across all applications and services when the user's device is lost or stolen, the user leaves the organization, or the user's access to client applications needs to be limited or revoked for any other reason.

Ability to Define Roles and Groups for the Purpose of Granular Access Control

A benefit of embodiments disclosed herein is that the user as identified by identity handle may be assigned any number of roles and/or groups for the purpose of granular access control done by client applications and third-party applications. The roles and/or groups of the user may be stored in the user's identity records, and be read and used by client applications to provide adequate permissions to the user in the client application. This may be particularly useful in environments that use principles of zero trust, as it allows the permissions of the user in client applications to be granted and controlled in a granular manner from one central place (the user's identity records published in the domain name system).

Encryption of User's Data

A benefit of embodiments disclosed herein is that a client application may be able to encrypt the user's data (e.g., files or database entries related to the user) in such a way that it may be decrypted only through the use of combined information stored in a storage location by the client application and any of the authentication provider applications running on the user's devices.

For example, a client application may be a Saas (Software as a Service) web application that needs to store the user's data in an encrypted format and due to regulatory or other reasons is not allowed to store the decryption key.

Typically, such an application would generate an encryption key and force the user to store and re-enter it upon each login. With embodiments, the client application can automatically derive the encryption key for the authenticated user through the use of a key agreement algorithm performed by the authentication provider application that is running in a web browser on the user's device.

Also, the client application may be able to independently provision access key for all of the user's devices that are set up for authentication and for which public keys are available in the user's identity records, without a need to communicate with any of such devices.

Encryption of Data for a Group of Users

Similarly, as will be further described herein, in an embodiment, client applications may store encrypted data in a public storage location for a group of users in such a way that it can only be decrypted through the use of combined information stored by the client application in the storage location and an authentication provider application running on any of the users' devices.

For example, a client application may be a secure group messaging application that stores all of its data in a public database, and yet may be able to guarantee that the stored data is encrypted and can only be decrypted by the members of the group that use the client application together with authentication provider applications running on their respective devices. The members of the group may be able to add and/or remove other members to the group without a need to communicate or exchange any information with any of the other member's devices. Such functionality may be particularly useful for Database as a service (DBaaS) providers and distributed client applications.

Embodiments disclosed herein may provide any number of the benefits mentioned above. While certain benefits are mentioned above, those skilled in the art will appreciate in view of the present disclosure that embodiments can provide other benefits not specifically mentioned above.

Terms

For the sake of simplicity, it may be assumed in some of the embodiments described herein that a user device only has one web browser installed. It will be appreciated by one skilled in the art that multiple web browsers may be installed on a single device, that web browsers may work in multiple modes (e.g., normal and incognito mode), and additional sandboxing techniques may be used (e.g., containers, virtual machines). Each such instance of a web browser may have access to logically separate data and thus may be seen as operating on a separate device for the purpose of the authentication scheme disclosed herein.

It will be appreciated by one skilled in art that a domain name system may be queried by a client-side web application through the use of DNS-over-HTTPS (DoH) or similar protocol.

It will be appreciated by one skilled in art that the servers of a domain name system may use User Datagram Protocol (UDP) and/or Transfer Control Protocol (TCP) to respond to queries. These protocols are not inherently secure and may be susceptible to, among others, man-in-the middle attacks (e.g., the attacker may be able to intercept and modify the response returned by the name server to the client application). It will also be appreciated that to overcome such issue, certain mechanisms such as Domain Name System Security Extensions (DNSSEC) and/or DNS over TLS (DOT) may be used by DNS servers and DNS resolvers to provide cryptographic authentication of resource records data and/or prevent eavesdropping and manipulation of DNS data, and that DNS-over-HTTPS (DoH) protocol may be used by client-side web applications to securely communicate with such DNS resolvers.

As will be appreciated by those skilled in the art, a web browser may be described herein as performing certain operations, but it may actually be code (e.g., a JavaScript code) of an application (e.g., authentication provider application or client application) that is being executed by the web browser that results in the performance of such operations. In particular, as will be further described herein, the code of an authentication provider application may be executed by the web browser on a user's device, and be responsible for authenticating the user by signing a challenge.

The present disclosure utilizes a variety of terms to describe features and benefits of the presented authentication scheme. Additional detail is now provided regarding the meaning of these terms.

As used herein the term "authentication" may refer to authentication as used in computer science, in particular to a method of proving ownership or control over an identity handle.

As used herein, the term "identity handle" refers to any string (a sequence of characters) used as a unique identifier of a user for the purpose of authentication, authorization, and/or encryption. A typical example of an identity handle that is commonly used for authentication in other authentication schemes is an email address. An email address may be authenticated by the ability of a user to receive and view emails at the given email address. Another example is a username on some specific computer system, which may be authenticated by the user knowing and entering a password that is associated with the username in such computer system.

As used herein the term "client application" may refer to any type of computer application such as a client-side web application, a server-side web application, a desktop application, a command line application, or other application that may initiate or require authentication in order to obtain and/or verify a user's identity.

As used herein the term "domain name system" and/or DNS may refer to a hierarchical and/or distributed database and naming system for resources on computer networks such as the one described in the request for comments (RFC) documents 1034 and 1035 published by the Internet Engineering Task Force (IETF) or any other similar system. It will be appreciated by one skilled in art that although the current description focuses on the use of a traditional domain name system, other suitable decentralized databases (e.g., a blockchain-based decentralized naming system like Handshake) may be used in place of the traditional domain name system.

The terms "record of domain name system" and "resource record" may be used interchangeably herein and may refer to resource records of a domain name system such as those specified in RFC 1034 or similar records. A domain name may have zero or more resource records associated with it. Each resource record may have a type (e.g., A, MX, CNAME, or TXT), class (e.g., IN, CH, or HS), time to live value (TTL), and type-specific data (e.g., an IP address for A records, a domain name for CNAME records, or text for TXT records). TXT resource records may be used to associate any textual data with a domain name and are commonly used for the purpose of domain ownership verification (e.g., for the purpose of secure sockets layer (SSL) certificate issuance), email sender verification (e.g., as in the Sender Policy Framework), or email integrity verification (e.g., as with DMARC (Domain-based Message Authentication, Reporting, and Conformance) or OpenPGP (Open Pretty Good Privacy)). A domain name system may be queried through a resolver using a reference that includes a domain name and a record type (e.g., "TXT records of domain.example") and such query may result in a list of matching resource records. In the present disclosure, a format similar to the output format of the "dig" utility program may be used to present resource records. Such format may present resource records on separate lines, each consisting of a domain name, a record class, a record type, and the record value (e.g., "domain.name IN A 127.0.0.1"). For the sake of readability the values of TxT records may be presented herein as enclosed inside a variety of types of quotation marks (e.g., ') and it will be appreciated by one skilled in art that ordinarily double quotation marks with ASCII code 34 (i.e., ") are the standard notation for enclosing the values of DNS TXT records. It will be appreciated by one skilled in art that although the current description focuses on the use of a resource records of the traditional domain name system, other storage mechanisms and data structures analogous to the traditional DNS resource records (e.g., as stored on the blockchain with Handshake protocol) may be used.

As used herein the term "address record" and "address resource record" may refer to resource records that may be used to identify the correct web server that is responsible for handling web requests for web addresses related to the domain name. For example, this could be the resource records of the A and AAA type, and/or resource records of CNAME or ALIAS type when they may be resolved into a domain name that has A or AAA resource records.

As used herein, the term "identity record" may refer to a resource record in the domain name system that is used to store information related to an identity handle such as a public key of an asymmetric cryptography algorithm, a user's name, a user's initials, and/or a user's avatar picture. Embodiments disclosed herein may use identity records to store public keys of an asymmetric cryptography algorithm that may be used for authentication. It will be appreciated by one skilled in art that such information may be stored in textual form in resource records of the TXT type, but that other types of resource records can also be used for such purpose (e.g., a CERT (certificate) resource record type may be used to store encryption keys) and that a new resource record type dedicated for such type of data may be introduced in the future.

As used herein, the term "reference to a resource record" and "reference to an identity record" may refer to a value that enables a computer program to indirectly access one or more resource/identity records of a domain name in the domain name system. Such reference may be composed of a domain name and the resource record type (e.g., "TXT records of domain.example domain") and is typically used with a domain name system resolver to obtain data of referenced resource record types for the referenced domain.

As used herein, the term "derived from" or "derived based on" should be interpreted as having its plain and ordinary meaning (i.e., the common English meaning of "to come from something" or "to get something from something else"), unless the context indicates otherwise. As will be further described herein, according to some embodiments, a reference to identity records may be derived based on an identity handle using an algorithm that performs text substitution. Also, according to some embodiments, an authentication endpoint web address may be derived based on the identity handle using an algorithm that may require interacting with and obtaining information from external sources or databases, such as the domain name system. The particular algorithm that is used may vary depending on the embodiment.

As used herein, the phrase "identity records associated with identity handle" and similar phrases may refer to identity records in a domain name system for which a reference thereto may be derived from the identity handle.

As used herein, the term "asymmetric cryptography key pair" may refer to a pair of related keys of an asymmetric cryptography algorithm, which typically consists of a key referred to as a "public key" and a key referred to as a "private key." The public key and the private key of a key pair may be considered to be cryptographically matching to each other. For example, in digital signature algorithms, a signature that was generated with the use of a private key may be verified with the use of a public key of the same key pair. Similarly, in asymmetric encryption algorithms, data encrypted with a public key may be decrypted with a private key of the same key pair. A valid digital signature acts as a zero-knowledge proof that the signing party is able to sign data using a private key that cryptographically matches the public key used to verify the signature, without revealing the private key itself. When a digital signature is found to be valid for a given public key, it may be said that such digital signature and the public key cryptographically match to each other. As will be further described herein, by signing a challenge provided by the client application, an authentication provider application running in a web browser may provide a zero-knowledge proof to the client application that it is able to use a private key that cryptographically matches a public key that was independently obtained by the client application from the data of at least one resource record in the domain name system, to which a reference may be derived from the identity handle that is being authenticated. It will be appreciated by a one skilled in art that certain asymmetric encryption algorithms and key agreement algorithms may be used with public keys and/or private keys to establish a secure communication channel that offers the same guarantees of authenticity and integrity of transferred messages as digital signatures. For the sake of simplicity, such messages may be treated as being digitally signed using the respective keys that were used to set up such communication channel.

As used herein, the term "signed challenge" may refer to a challenge of a challenge-response authentication protocol, in which the challenge or any part thereof is cryptographically signed using at least one private key of a digital signature algorithm, and where the resulting one or more digital signatures may act as a response to the challenge. It will be appreciated by one skilled in art that the challenge may be modified prior to signing if needed (e.g., to include additional data provided by the signing party), and that the challenge or portions thereof (e.g., values of certain attributes obtained after de-serializing the challenge) may be independently signed using one or more private keys, resulting in a signed challenge that includes one or more digital signatures. It will also be appreciated by one skilled in art that the signed challenge may or may not include the challenge itself. For example, when the challenge is not modified prior to signing, the party that provided the challenge may already have a copy of the challenge available, and thus may only need to receive one or more digital signatures as a signed challenge. If a challenge was modified prior to signing, a copy of the modified challenge may be included as a part of the signed challenge to allow the digital signature to be correctly verified. In an embodiment, a challenge may be modified in a specific way prior to being signed with a specific private key (e.g., in multi-factor authentication, an API of an external device may require a challenge to be provided in a certain format in order to be signed). For the sake of simplicity, such group of modified challenges and their associated digital signatures may also be referred to as a signed challenge. Similarly, a collection of digital signatures may also be referred to simply as a digital signature.

As used herein, the term "key agreement algorithm" may refer to an algorithm that allows one or more parties to derive the same key of an symmetric cryptography algorithm using different pieces of information. For example, given a first public-private key pair that consists of a first public key and a first private key and a second public-private key pair that consist of a second public key and a second private key, a key agreement algorithm may be independently used to derive a shared symmetric encryption key through the use of combined information from the first public key and a second private key or combined information from the first private key and the second public key. An example of a key agreement algorithm is the Diffie-Hellman (DH) or Elliptic-curve Diffie-Hellman (ECDH) algorithm. As will be further described herein, a key agreement algorithm may be used with a private key of a generated key pair and a public key published in identity records to obtain a symmetric encryption key. Such symmetric encryption key may also be independently obtained through the use of the key agreement algorithm with a public key of the generated key pair and a private key stored by the authentication provider application that cryptographically matches the public key published in identity records.

As used herein, the term "wrapped key" may refer to a cryptographic key that has been encrypted using another key. The "wrapped key" may be a "data encryption key" that has been encrypted using a symmetric encryption algorithm using a "key encryption key."

As used herein, the term "web application" may refer to an application that is accessed by a user through a web browser through an endpoint such as a Uniform Resource Locator (URL). A typical web application that is based on a client-server model is served from a web server and consists of one or more web pages. A web application may consist of a server-side, which may be formed by the data stored and/or code executed on the web server (e.g., a data stored in a MySQL database and PHP (PHP: Hypertext Preprocessor) code), and a client-side, which may be formed by the data stored and/or code executed by and within the web browser (e.g., a data stored in IndexedDB and JavaScript code). Web applications may also be installed into web browsers (e.g., Progressive Web Applications, or through the use of client-side storage and Service Workers API) and be accessible inside a web browser without the need to contact any web servers and/or consist only of the client side.

As used herein, the term "identity public key" may refer to one or more public keys of an asymmetric cryptography algorithm that are placed in identity records.

As used herein, the term "client-side storage" may refer to a group of technologies and methods used to store data on a user's device, which includes any storage mechanism that is available to web applications running inside a web browser that stores data within the storage structures managed by the web browser (e.g., an IndexedDB API, Cache API, or localStorage).

As used herein, the term "authentication endpoint web address" may refer to a web address (e.g., a URL) under which an authentication provider application may be accessed by the user through a web browser running on a user's device (e.g., "https://auth.domain.example"). When the authentication provider application is served by a web server, a domain name component of the web address may be associated with an address resource record (e.g., A, AAA, or CNAME record) in a domain name system that points at the web server that serves the authentication provider application. When the authentication provider application is a web application that has been installed into a web browser (e.g., a Progressive Web Application) or is provided by a plugin installed in the web browser, the authentication provider application may be available inside the web browser at the authentication endpoint web address, even when appropriate address resource records are not present in the domain name system (e.g., it may be served directly by a Service Worker inside the web browser or by a plugin through the chrome.webRequest API) or are unavailable (e.g., due to the browser being in offline mode). The authentication provider application may be available through any number of authentication endpoint web addresses, as multiple web servers may be used to serve the authentication provider application and/or the web server or browser's plugin may be configured to serve the authentication provider application on multiple or any domain names (e.g., through the use of a catch-all configuration). For example, the web server may be a static website host that responds with the same static web page that includes the authentication provider application code to any request that is made at the server's Internet Protocol (IP) address. This allows content delivery networks and static hosting providers to be used as hosts for the authentication provider application and allows the user to choose the provider of the authentication provider application by pointing the appropriate address resource records at the web server managed by the provider of their choosing.

As will be appreciated by one skilled in the art, web browsers may provide a logically separate client-side storage depending on the origin (e.g., a combination of protocol, hostname, and port number) of the authentication endpoint web address that was used to access the authentication provider application. As such, an authentication provider application running under one origin (e.g., "https://domain.example/") in a web browser on the user's device will typically not be able to access the client-side data stored by an authentication provider application or any other web application that is running under a different origin (e.g., "https://otherdomain.example/").

For the sake of simplicity, a web browser may be described as being set up to be able to authenticate the user to the client and third-party applications. It will be appreciated by one skilled in art that a web browser may store through one of the client-side storage mechanisms cryptographic keys and/or other data that may be used for authentication and that the actual authentication may be performed by an application that is running in the web browser (e.g., an authentication provider application) that has access to such cryptographic keys and/or other data (e.g., it is running under a web address that has the same origin as the origin associated with the stored data).

Thus, the origin of the authentication endpoint web address may act as a security boundary for many of the client-side storage and communication mechanisms provided by the web browser. This may allow secure storage of the private key by the authentication provider application on the client side (inside the user's web browser (e.g., through an IndexedDB API)), as websites and web applications that are accessible through other origins will not be able to access the stored data.

For the sake of simplicity, where a domain name of an authentication provider application is mentioned, it will be appreciated by one skilled in the art that a web address may be obtained using such domain name by using it as a hostname part of the URL with an "http" or "https" scheme. For example, the domain name "example.com" may be converted to the web address of "https://example.com/".

As used herein the phrase "X includes Y" means that X includes Y and nothing else (i.e., X is the same as Y) or that X includes Y and something else. For example, the phrase "the challenge includes a third-party challenge" means that the challenge can be the same as the third-party challenge or that the challenge includes the third-party challenge and additional information.

As used herein the phrase "X has access to a private key" or similar phrase does not necessarily mean that X is able to obtain or know the actual key material but may mean that X is able to use the private key for purposes of performing cryptographic/signature algorithms (e.g., generate digital signatures using the private key).

FIG. 1 is a diagram showing an overview of entities and their relationships, according to some embodiments.

User 110

A user 110 may be an end user that may be authenticated to client applications 160 through an authentication provider application 140 accessed under an authentication endpoint web address 130 on a web browser installed on the user's device 120. The authentication provider application 140 may allow the client applications 160 to sign in to third-party applications 170, sign messages, and/or establish end-to-end encrypted communications channel with client applications of other users or third-party applications 170 on the user's 110 behalf.

As will be further described herein, the user 110 may own one or more devices on which web browsers 120 can be installed. An authentication provider application 140 may be accessible to the user 110 and/or client applications 160 through the web browser 120 using an authentication endpoint web address 130. As will be further described herein, each such web browser 120 on each user's device, when set up for authentication, may be used to authenticate the user 110 with client applications 160 through the use of authentication provider application 140.

As will be further described herein, the user 110 may have access to a control panel of one or more domain names in a domain name system 150 and have the ability to publish records in the domain name system 150 for those domain names (and their sub-domains, if necessary). For example, the user 110 may publish identity records in the domain name system 150 under a domain name (e.g., "john._at_domain.example") that is derivable from a user-selected identity handle (e.g., "john@domain.example"). The user 110 may point the domain name (e.g., "domain.example") related to the authentication endpoint web address 130, which is derivable from the identity handle, at the web server that serves the authentication provider application 140 (e.g., through the use of address records).

As will be further described herein, the user 110 may access one or more client applications 160, in which the user may be able to authenticate with the identity handle. The client applications 160 may be seen as clients of the authentication provider application 140 that is accessible in the web browser 120 running on the user's device. The client applications 160 are typically web applications that are being accessed by the user 110 and are running in the same web browser 120 as the authentication provider application 140, but may alternatively be any other types of computer applications such as web applications running in other web browsers, desktop applications, and/or command line applications.

Web Browsers on User's Devices 120

One or more web browsers 120 may be installed on one or more of user's devices (e.g., laptop, smartphone, desktop, etc.), and through each of such web browsers, an authentication provider application 140 may be independently accessed under an authentication endpoint web address 130 that may be derived from the user's 110 identity handle.

As will be further described herein, each such web browser 120 may store a unique private key of an asymmetric cryptography key pair in a client-side storage location that is associated with the origin of the authentication endpoint web address 130, making the private key available to the authentication provider application 140 when the authentication provider application 140 is accessed using the authentication endpoint web address 130 through the web browser 120. The authentication provider application 140 may cryptographically sign a challenge provided by one of the client applications 160 using the private key.

As will be further described herein, the authentication provider application 140 may be accessed and used by the user 110 through the web browser 120 under an authentication endpoint web address 130 that is derivable from the user's identity handle to set up the web browser 120 (e.g., by storing cryptographic keys in client-side storage of the web browser) to be able to authenticate the user 110 to client applications 160 using the identity handle, and to approve or reject authentication, and other requests received from client applications 160 or relayed by client applications 160 from third-party applications 170.

As will be further described herein, the authentication provider application 140 running in the web browser 120 may use the API provided by the web browser 120 (e.g., fetch API with DoH resolver, or DNS API) to access the domain name system 150 to query it for identity records that are associated with an identity handle.

As will be further described herein, the authentication provider application 140 running in the web browser 120 may communicate with one or more client applications 160 to authenticate the user 110 as identified by an identity handle to the client application 160, to sign messages provided by client applications 160 on behalf of the authenticated user 110, to authenticate client applications 160 to third-party applications 170 on behalf of user 110, and to assist the client application 160 with setting up end-to-end encryption over a communication channel with third-party applications 170.

Domain Name System 150

Resource records of the domain name system 150 may be used to hold information about the user 110 as identified by an identity handle, and in some embodiments the web address of authentication endpoint 130 for the identity handle. A domain name of such resource records may be derived from the identity handle. The resource records associated with an identity handle may contain public keys that cryptographically match private keys that are accessible to the authentication provider application 140 and/or are stored by the authentication provider application 140 inside the web browsers 120 installed on the user's devices (e.g., using client-side storage mechanisms). The resource records may also contain other data related to the identity handle (e.g., the user's name, initials, a reference to avatar picture, and/or web address of authentication endpoint 130).

As will be further described herein, during web browser 120 setup, the user 110 may publish a public key generated by the authentication provider application 140 inside a resource record of a domain name system 150 that is associated with the identity handle of the user 110 (e.g., a public key for identity handle "john@domain.example" may be published as a TXT record of domain name "john._at_domain.example").

As will be further described herein, during authentication, the client application 160 may obtain identity records associated with the identity handle being authenticated from the domain name system 150, extract public keys from them, and verify that a signed challenge received from the authentication provider application 140 cryptographically matches with at least one of such public keys.

As will be further described herein, multiple digital signatures of a potentially modified challenge may be provided by the authentication provider application 140. Identity records may contain information about combinations or groups of public keys that may be used to verify digital signatures and/or information that would help with identifying what potential modifications of the challenge are acceptable for each of the keys.

As will be further described herein, a third-party application 170 may independently obtain identity records associated with a user's 110 identity handle from the domain name system 150 and use them to verify received digital signatures.

The authentication provider application 140, client applications 160, and third-party applications 170 may query the domain name system 150 for resource records. To further increase availability, security, and to limit dependency upon a single DNS provider, multiple DNS resolver providers and/or DNS resolution protocols (e.g., UDP, TCP, DoH) may be independently used to process the same query, and an intersection of the resource record values returned by them may be used as a reference answer for further processing.

To further increase security, padding records may be placed in the domain name system 150. By default, DNS servers communicate with DNS resolvers using UDP, which is stateless and prone to spoofing and reflection attacks. The purpose of padding records is to extend the size of the expected DNS response above the maximal size that may be transmitted using UDP, forcing the DNS server to set the truncated flag in the response when queried over UDP, and the DNS resolver to retry the query over TCP. For example, to force the use of TCP for the resolution of TxT resource records of the "domain.example" domain name, padding records of the TXT type with random values may be placed under the "domain.example" domain name such that the total size of its TXT resource records exceeds 65,527 bytes.

Client Applications 160

A user 110 may use one or more client applications 160 and authenticate to them using the user's identity handle. A client application 160 may be any application (e.g., a web application, desktop application or a command-line application) that may authenticate the user 110 based on the user's identity handle, sign messages on behalf of the authenticated user 110, authenticate to third-party applications 170 on behalf of the authenticated user 110, establish an end-to-end encryption with third-party applications 170, and/or encrypt and decrypt data for the user 110 through the use of authentication provider application 140 as will be further described herein.

As will be further described herein, a client application 160 may obtain an identity handle from the user 110 that the user wishes to authenticate with, derive a reference to identity records in the domain name system 150 based on the identity handle, and also derive an authentication endpoint web address 130 based on the identity handle. Once authentication is successful, the client application 160 may sign in the user 110 to the client application 160 and use the user's identity handle as a reference (e.g., as a value of "user_id" field) in its internal databases.

As will be further described herein, a client application 160 may access the domain name system 150 to obtain the values of identity records for which a reference thereto is derivable from the user-provided identity handle, and use the obtained values to obtain a list of public keys that may be used to confirm the user's 110 identity and possibly obtain additional details about the user (e.g., the user's name and/or initials).

As will be further described herein, a client application 160 may derive an authentication endpoint web address 130 from the user-provided identity handle and communicate with an authentication provider application 140 running in a web browser on a user's device 120 under the authentication endpoint web address 130.

In an embodiment, client applications 160 are run on the same user's device as the web browser 120, and may communicate with the authentication provider application 140. For example, the client application may be a web application that is accessed/run in the same web browser on the user's device as the authentication provider application 140, and may use any interface provided by the web browser to communicate with it (e.g., cross-origin communication mechanisms such as window.postMessage API, window.location interface, window.open interface, or HTTP requests). In an embodiment, client applications 160 are not run on the same user's device as the web browser 120, and may communicate with the authentication provider application 140 by providing textual instructions to the user 110, or through any other means.

As will be further described herein, a client application 160 may send a challenge to the authentication provider application 140 using the authentication endpoint web address 130 and obtain a digitally signed challenge as a response. The digital signature included in the digitally signed challenge may be validated using one or more public keys obtained from identity records associated with the identity handle in the domain name system 150.

As will be further described herein, the client application 160 may communicate with, authenticate to, and/or establish end-to-end encryption with third-party applications 170 on behalf of an authenticated user 110 through the use of authentication provider application 140.

Third-Party Applications 170

Any number of third-party applications 170 may be involved, and each of them may not be able to directly communicate with the user's web browser 120, yet may still accept authentication requests from the client applications 160 done on behalf of the user, verify messages received from client applications 160 or other third-party applications 170 as originating from the user 110, and/or take part in establishing an end-to-end encrypted communication channel with client applications 160.

As will be further described herein, a third-party application 170 may communicate with the client application 160 and be accessed by the client application 160 on the user's 110 behalf.

As will be further described herein, a third-party application 170 may query the domain name system 150 to obtain identity records (for which a reference thereto is derivable from the user's 110 identity handle) that can be used to independently verify received authentication requests and digital signatures as originating from the user 110.

While the diagram shows a particular arrangement of components, one of ordinary skill in the art will appreciate in view of the present disclosure that some embodiments may use a different arrangement of components to implement the features described herein.

Figure 2:
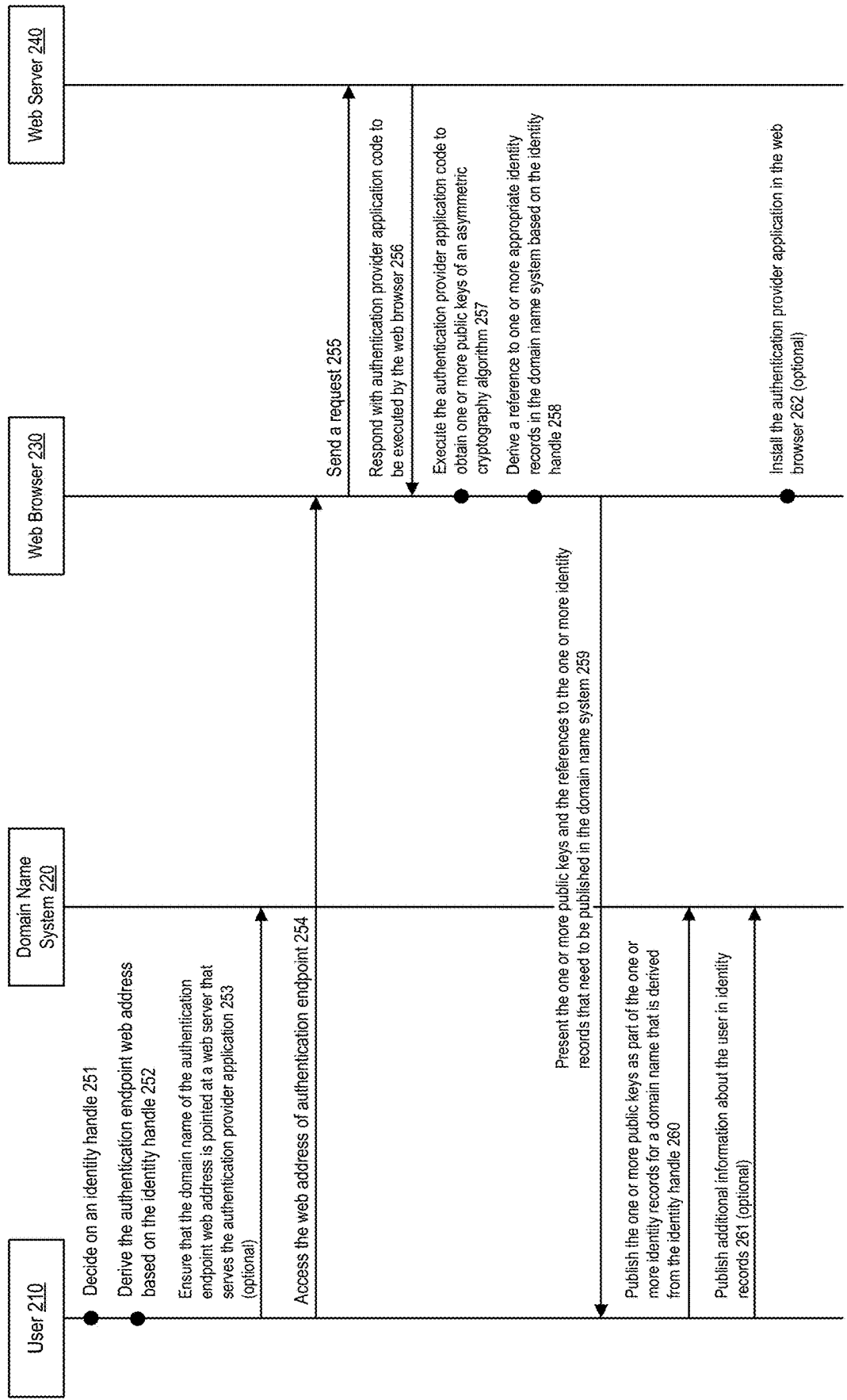
FIG. 2 illustrates a schematic diagram of a sequence of operations performed when a web browser on a user's device is being initially setup by the user to be able to authenticate the user-selected identity handle, according to some embodiments.

FIG. 2 is a diagram showing operations for initially setting up a web browser installed on a user's device to be able to authenticate a user-selected identity handle, according to some embodiments. In an embodiment such set up is performed with a web browser before an authentication provider application running in the web browser may be used to authenticate the user 210, as identified by the identity handle, to client applications.

While the diagrams show a particular order of operations, it should be appreciated that such order is provided as an example to illustrate an embodiment and is not intended to be limiting (e.g., alternative embodiments may perform the operations in a different order, combine certain operations, overlap certain operations, etc.).

Decide on an Identity Handle 251

At operation 251, the user 210 may decide on the identity handle that the user wants to associate with the web browser 230 on the user's device. An identity handle may be a string (a sequence of characters), and the user 210 may choose to use any identity handle for which the user 210 will be able to successfully complete the setup procedure, which may involve publishing an identity record in a domain name system 220 from which a public key can be obtained, and/or other resource records, as described herein.

In an embodiment, the user 210 is allowed to use an identity handle that the user is already using with some other web browser on the same or other device or the user may create a new identity handle.

In an embodiment, the identity handle is a string that contains a username that can be composed of letters, numbers, and a dash, that is followed by a "@" character, that is followed by a domain name (e.g., "john@domain.example").

In an embodiment, the identity handle is a string from which at least an authentication endpoint web address and one or more references to one or more resource records in a domain name system 220 can be derived through the use of some algorithm (which may be implementation-specific). For example, such algorithm may take an identity handle such as "domain.example #john [TXT:^KEY]" and derive an authentication endpoint web address based on the identity handle such as "https://domain.example/" and also derive a reference to a TXT record of a "john._at_domain.example" domain name, which value starts with "KEY." Similarly, a different algorithm may take the same identity handle and derive a reference to a TXT record of the "domain.example" domain name, which value starts with "john." It will be appreciated by one skilled in art that any other algorithms may be used to derive a reference to a one or more resource records in a domain name system and/or the authentication endpoint web address based on an identity handle, and that any of such algorithms may work with embodiments as long as it is consistently used by the parties that participate in the authentication scheme.

Derive the Authentication Endpoint Web Address Based on the Identity Handle 252

At operation 252, the user 210 may derive an authentication endpoint web address based on the identity handle. As will be further described herein, the authentication endpoint web address is an address which may be used to access the authentication provider application for the given identity handle through the web browser 230. The way in which the authentication endpoint web address is derived based on an identity handle may depend on the implementation.

In an embodiment, an authentication endpoint web address is derived from the identity handle by extracting the part of the string occurring after the "@" sign from the identity handle and using that as a hostname component of URL. For example, for the identity handle "john@domain.example," the authentication endpoint web address may be "https://domain.example/".

In an embodiment, the authentication endpoint web address is derived using a multi-step procedure through some algorithm (which can be implementation-specific), which may involve obtaining information from the domain name system 220 or other external sources. For example, in the first step, a reference to a resource record in a domain name system may be derived from the identity handle. In the second step, the domain name system 220 may be queried for a value of such resource record and the obtained value may contain information about the authentication endpoint web address. For example, a reference to TXT resource records of a domain name "john._at_domain.example" or "domain.example" that begins with keyword "auth" may be derived from the identity handle "john@domain.example" by such algorithm. In such case, when the resource records "john_at_domain.example IN TXT 'auth gateway.domain.example'" and/or "domain.example IN TXT 'auth gateway.domain.example'" are present in the domain name system 220, a value of "https://gateway.domain.example/" may be derived as the authentication endpoint web address for the identity handle. A benefit of such implementation is that the authentication endpoint web address may be controlled and changed by modifying resource records in the domain name system and is decoupled from the identity handle (e.g., the identity handle does not need to be replaced or updated when a new web address is used to host the authentication provider application).

In an embodiment, a helper application may be provided to users that takes the identity handle as an input and that can derive and present the value of the appropriate authentication endpoint web address to the user 210. The helper application may query external services and/or databases to derive the appropriate authentication endpoint web address.

Other techniques such as those that will be described with reference to operation 355 of FIG. 3 and/or operation 1130 of FIG. 11 may be used to derive the authentication endpoint web address from the identity handle.

Optionally Ensure that the Domain Name of the Authentication Endpoint Web Address is Pointed at a Web Server that Serves the Authentication Provider Application 253

At operation 253, the user 210 may optionally ensure that the address record for the domain name of the authentication endpoint web address points at the web server 240 that serves the authentication provider application. The domain name may already point at such web server 240 if a different web browser was previously set up with the same or similar identity handle. The domain name may not need to be pointed at such web server if the authentication provider application is served by a Service Worker, browser plugin, or other mechanism directly within the web browser 230.

The user 210 may verify that the domain name of the authentication endpoint web address is pointed at a web server 240 that is known to serve the authentication provider application (e.g., in a domain name system 220 control panel for the respective domain as provided by the domain hosting provider, by using a "dig," "host," or "nslookup" command line utilities or other similar utilities) using a DNS address resource records (e.g., A, AAA, ALIAS or CNAME resource record types). If the domain name is not pointed at the web server 240, the user 210 may point it at such web server through the DNS address resource records.

In an embodiment, the user 210 points the domain name of the authentication endpoint web address (e.g., "domain.example") at an address of a web server 240 that is known to serve the authentication provider application through the use of address record in the domain name system 220, for example, by adding such address record through the appropriate domain hosting provider's domain control panel.

In an embodiment, the domain name of the authentication endpoint web address does not need to point at the web server, and the authentication provider application may be provided in the user's web browser under the authentication endpoint web address through other means (e.g., through a Service Worker or plugin installed in the web browser that intercepts requests made for the domain name of the authentication endpoint web address).

Access the Web Address of Authentication Endpoint 254

At operation 254, the user 210 may access a URL corresponding to the authentication endpoint web address (e.g., "https://domain.example") through the web browser 230.

In an embodiment, the user 210 manually enters the authentication endpoint web address into the address bar of the web browser 230.

Send a Request 255

At operation 255, the web browser 230 may optionally send a request to the web server 240 that hosts and serves the authentication provider application.

In an embodiment, the host component of the URL entered by the user 210 is a domain name that is pointed at the web server 240 that serves the authentication provider application. The web browser 230 may resolve the domain name of the entered authentication endpoint web address and send a HTTP GET request to the web server 240 that hosts and serves the authentication provider application.

In an embodiment, the web server 240 is not used, and a plugin or Service Worker is installed in the web browser 230 that intercepts requests to the authentication endpoint web address and serves the authentication provider application code directly from within the web browser 230.

Respond with Authentication Provider Application Code to be Executed by the Web Browser 256

At operation 256, the web browser 230 may receive the authentication provider application code which is then executed by the web browser 230. The application code may be received through a variety of means. For example, the application code may be embedded in a webpage returned by the web server 240, be provided via a reference to an external resource (e.g., through a "<script src=' . . . '></script>" HTML tag), or obtained by the web browser 230 after following a HTTP redirect.

In an embodiment, the application code is included directly inside the webpage received from the web server 240, a browser plugin, or a Service Worker (e.g., inside the "<script> . . . </script>" HTML tag).

In an embodiment, the application code is referenced (e.g., through a "<script src=' . . . '></script>" HTML tag) from the webpage received from the web server 240, a browser plugin, or a Service Worker, and is then loaded and executed by the web browser 230 from the referenced source.

In an embodiment, the application code is received directly from a plugin or Service Worker installed in the web browser 230 without a need for the web server 240 to be present.

Execute the Authentication Provider Application Code to Obtain One or More Public Keys of an Asymmetric Cryptography Algorithm 257

At operation 257, the web browser 230 may execute the received authentication provider application code. The authentication provider application code may receive the user-provided identity handle and may obtain (e.g., by generating by its own or from an external source) one or more public keys of an asymmetric cryptography algorithm, for which the authentication provider application is able to generate cryptographically matching digital signatures (e.g., by generating and storing a new asymmetric cryptography key pair for the user-provided identity handle that can be used for digitally signing or by querying an external device such as a fingerprint reader for its public key).

In an embodiment, the authentication provider application code asks the user for the identity handle that the users wishes to set up with this web browser 230 through the user interface of the web browser 230.

In an embodiment, a public key is obtained from a key pair of cryptography algorithm (e.g., Elliptic Curve Digital Signature Algorithm (ECDSA)) cryptographic keys that are generated by the authentication provider application executing in the web browser 230 (e.g., using a custom JavaScript function or the web browser's built-in Web Crypto API), with the private key being optionally marked as non-extractable. When a Web Crypto API or other similar web browser API is used to generate a key pair, a private key from the generated key pair may be marked as non-extractable, and as such it may be protected by the web browser 230 and cannot be extracted through any interface, making it immune to various attacks, and making the raw key material inaccessible to the authentication provider application code itself.

In an embodiment, at least a private key of the generated key pair or a reference thereto is stored using the web browser's 230 built-in client-side storage mechanism (e.g., IndexedDB API) on the user's 210 device that the web browser 230 is installed on, preferentially in a storage location that is logically associated with the user-provided identity handle.

In an embodiment, the authentication provider application encrypts the generated private key with a passphrase (e.g., as automatically generated or obtained from the user) or encryption key, and stores the encrypted private key in the client-side storage (e.g., through the IndexedDB API) of the web browser 230 or in some remote location such as a web server 240 that hosts the authentication provider application or a remote database service (e.g., DynamoDB®, Amazon RDS®, or Firebase®). The authentication provider application may store the passphrase or encryption key that was used to encrypt the private key in a client-side storage (e.g. through the IndexedDB API or localStorage) within the web browser 230 or may not store the passphrase or encryption key and require the user to provide it each time when such private key is used for signing.

In an embodiment, a public key of an attached authentication device (e.g., a fingerprint reader) or an additional authentication method is obtained (e.g., using a Web Authentication API), and the respective device or method is later used by the authentication provider application running within the web browser 230 to sign challenges, possibly without a need for the web browser 230 to have direct access to the cryptographically matching private key.

In an embodiment, a public key from an external source or service is obtained (e.g., using the fetch API, from DNS resource records, or is hard-coded into the authentication provider application), and the respective external source or service may be later used by authentication provider application running within the web browser 230 to obtain digital signatures of the challenge or parts of thereof for the purpose of multi-party authentication.

In an embodiment, any combination of the methods discussed above may be used to obtain a plurality of public keys, which may be used for multi-factor and/or multi-party authentication.

Derive a Reference to One or More Appropriate Identity Records in the Domain Name System Based on the Identity Handle 258

At operation 258, the authentication provider application may derive a reference to one or more resource records in the domain name system 220 based on the user-provided identity handle. As it will be further described herein, it is expected that such one or more resource records will be published in the domain name system 220 and act as identity records holding information about the one or more obtained public keys.

In an embodiment, a reference to resource record is derived from the identity handle by substituting the "@" character with "._at_" and using such transformed handle as a domain name of a resource record (e.g., TXT record) in the domain name system 220. For example, for the identity handle "username@example.com," a reference to TXT resource records of "username._at_.example.com" domain name may be derived. As will be described in further detail herein, it is expected that information about the one or more obtained public keys will be published in the domain name system 220 somewhere inside such TXT records.

Other techniques such as those that will be described with reference to operation 352 of FIG. 3, and/or operation 1120 of FIG. 11 may be used to derive a reference to identity records from the identity handle.

Present the One or More Public Keys and the Reference to One or More Identity Records that Need to be Published in the Domain Name System 259

At operation 259, the authentication provider application that is executing in a web browser 230 installed on user's device may present to the user 210 each of the previously obtained public keys in a human-readable format. For each of the obtained public keys, it may also present information about an identity record that needs to be published in the domain name system 220 that is to include information about the obtained public key.

In an embodiment, each of the obtained public keys is exported to a base64 encoded format and presented to the user 210, together with textual instructions on how to publish it as a part of an identity record in the domain name system 220 through a user interface presented in the web browser 230. For example, the instructions may state: "To authorize this web browser to authenticate you as john@domain.example to client applications please login to the 'domain.example' domain control panel and add a TXT resource record for the 'john._at_domain.example'subdomain with a value of 'key BFUHfngwsKRZZN8gx-zIIy4DLFaZbsZrk4R3CrnEpBqhWrdQi805VsMAftZ3Ds-cXIpK3V+F8 x7qQV+PaJPz8yUUI='".

In an embodiment, any number of the obtained public keys is sent to an external service (e.g., a domain name hosting provider or a web hosting provider) by the authentication provider application executing in the web browser 230 to be automatically published in the domain name system 220 or to be included as a part of an online document, which location is referenced in the relevant resource record of the domain name system 220, as will be further described herein.

Publish the One or More Public Keys as a Part of the One or More Identity Records for a Domain Name that is Derived from the Identity Handle 260

At operation 260, the user 210 may publish the one or more obtained public keys as part of identity records in the domain name system 220 for a domain name that is derived from the user's 210 identity handle.

In an embodiment, the user 210 signs in to the domain name system 220 control panel (e.g., through a domain hosting provider) for the appropriate domain name (e.g., a domain control panel of the "domain.example" domain name) and creates a new TXT resource record that includes the single obtained public key. For example, the user 210 may create the following resource record in the domain name system 220: "john._at_domain.example IN TXT 'key BFUHfngwsKRZZN8gxzIIy4DLFaZbsZrk4R3CrnEpBqh-WrdQi805VsMAftZ3DscXIpK3V+F8 x7qQV+PaJPz8y-UUI=',"

This example resource record contains a base64 encoded ECDSA public key and may act as an identity record for the "john@domain.example" identity handle. This resource record may allow the web browser 230 to authenticate the user using a single cryptographically matching private key. When two or more public keys were obtained, the user 210 may publish them inside a single identity record (e.g., by separating them with a whitespace or other delimiter) or split them over multiple identity records that may be later identified as relating to a single group of public keys (e.g., by adding a unique group identifier or label to the values of the records). In such case, as will be further described herein, the authentication provider application may need to be able to provide matching digital signatures for all public keys from such group in order to authenticate the user 210.

In an embodiment, the identity record may contain a URL pointing to an online resource that includes the obtained one or more public keys. For example, such record may look as follows:

"john._at_domain.example IN TXT 'key https://domain.example/users.json'"

The JavaScript Object Notation (JSON) document available at the "https://domain.example/users.json" URL may look as follows:

"{'john@domain.example':
  'BFUHfngwsKRZZN8gxzIIy4DLFaZbsZrk4R3C-rnEpBqhWrdQi8o5VsMAftZ3DseXIpK3V+F8x7qQV+PaJPz8yUUI='}."

The user may then be able to edit such document either directly or through some dedicated service so that it includes the obtained one or more public keys.

In an embodiment, the identity record published in the domain name system 220 contains additional information about the identity handle for which it is valid, and may be published alongside identity records associated with other identity handles under the same domain name. For example, a reference to identity records derived from the "john@domain.example" identity handle may be TXT records of the "domain.example" domain name, and the following identity record may be created under this domain name alongside identity records associated with other identity handles of other users: "domain.example IN TXT 'key BFUHfngwsKRZZN8gxzIIy4DLFaZbsZrk4R3CrnEpBq-hWrdQi805VsMAftZ3DscXIpK3V+F8x7qQV+PaJPz8yUUI=id=john@domain.example'."

In an embodiment, the public key is sent by the authentication provider application to an external service that is responsible for publishing it in the domain name system 220 or including it as a part of an online resource, and the user 210 does not need to perform any further action.

Optionally Publish Additional Information about the User in Identity Records 261

At operation 261, the user 210 may optionally publish additional information about the user 210 that should be associated with the user's identity handle (e.g., user's name, initials, and/or a reference to a profile image/avatar) inside the identity records to which a reference may be derived from the user's 210 identity handle.

In an embodiment, the user 210 publishes the user's name, initials, and/or a URL of the user's avatar image as part of identity records in the domain name system 220 associated with the user's identity handle, unless they are already published (e.g., they were published by the user when the user was setting up some other web browser to be able to authenticate the identity handle or on some other occasion). To do this, the user may publish resource records in the domain name system 220 associated with the domain name that was derived from the user's identity handle that contains the additional information. For example, a user with the identity handle "john@domain.example," may publish the following resource records:

john._at_.domain.example IN TXT "initials JD"
john._at_.domain.example IN TXT "name John Doe"
john._at_.domain.example IN TXT "avatar https://domain.example/users/john.png"

Optionally Install the Authentication Provider Application in the Web Browser 262

At operation 262, which may be performed by the web browser 230 at any point after receiving the authentication provider application code from the web server at operation 256, the authentication provider application code may be installed inside the web browser 230 and be made available at the authentication endpoint web address to the user 210 of the web browser 230 without a need to contact any web servers (e.g., so the user 210 will be able to access the authentication provider application using the authentication endpoint web address even when the web browser 230 is in offline mode).

In an embodiment, the authentication provider application code contains instructions to obtain a manifest file that includes a complete list of application files, download and store the files in a client-side storage location (e.g., through the Fetch API and IndexedDB API) inside the web browser 230, and register a mechanism to serve one or more of the files upon request (e.g., a Service Worker) from the client-side storage location within the web browser 230 under the origin associated with the authentication endpoint web address, without a need to contact any web servers.

Once the setup procedure has been completed, one or more identity records associated with the identity handle of the user are published in the domain name system 220 and these one or more identity records contain one or more of the obtained public keys or a reference thereto. Also, one or more cryptographically matching private keys are available to the authentication provider application when it is accessed under the authentication endpoint web address in the web browser 230 on the user's 210 device. Some of the private keys may be stored within the web browser 230 itself using a client-side storage mechanism (e.g., IndexedDB) that makes the private key inaccessible to web applications that are accessed using other web addresses (e.g., other origins) through this web browser 230. The stored private keys may be non-extractable even to the authenticator provider application itself (e.g., the private key may be a CryptoKey object from the Web Crypto API with the extractable property set to false). Thus, the authentication provider application may use such private keys for signing and/or encryption, but the authentication provider application may not be able to extract the actual key material.

As will be further described herein, completing the web browser setup may allow the authentication provider application running in the particular web browser 230 on a user's 210 device, that is accessed through the authentication endpoint web address, to prove the user's 210 identity as denoted by the identity handle to client applications for the purpose of authentication.

Figure 3:
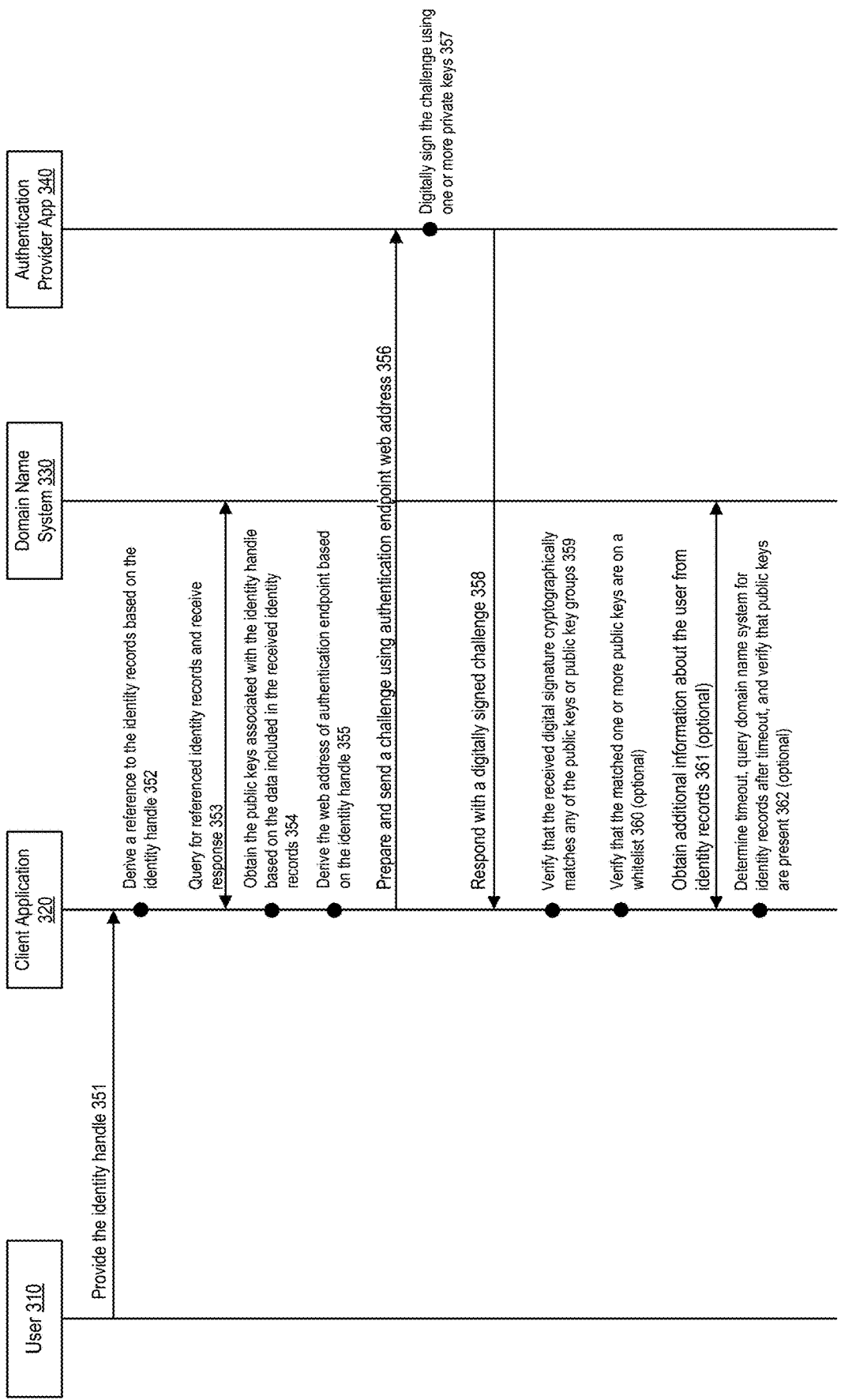
FIG. 3 illustrates a schematic diagram of a sequence of operations performed when an authentication provider application that may be accessed through the authentication endpoint web address on a web browser on a user's device is being used to authenticate the user's identity handle to a client application, according to some embodiments.

FIG. 3 is a diagram showing operations for authenticating a user's identity handle to a client application, according to some embodiments. In an embodiment, the web browser within which the authentication provider application 340 is running was set up to be able to authenticate the user-selected identity handle as shown in FIG. 2. In an embodiment, the client application 320 is a web application that is accessed/running within the same web browser as the authentication provider application 340. It should be appreciated, however, that other configurations of the client application and the authentication provider application 340 are possible, as described elsewhere herein.

Provide the Identity Handle 351

At operation 351, the user 310 may provide the identity handle that the user wishes to use to authenticate to the client application 320.

In an embodiment, the client application 320 presents a dialog box in its user interface to the user 310 (e.g., a popup box with a text input field is presented after the user clicks on the "Log In" button), asking the user to enter the user's identity handle. The user 310 may then enter the identity handle via the user interface. For example, the user may enter the following string as the identity handle: "john@domain.example."

In an embodiment, a list of potential identity handles (e.g., recently used, whitelisted, or shortlisted identity handles, which can be used with the given client application 320) is shown in a drop-down list in the user interface of the client application 320, and the user 310 is allowed to select which identity handle to use to login to the client application 320.

In an embodiment, the client application 320 obtains a hint about the expected identity handle from another source such as through a document loaded in a parent or child frame, through an external network request, through received parameters, through the use of inter-process communication, or for the case where the client application 320 is a web application, through a browser-based communication channel (e.g., a postMessage function call, Fetch API, Channel Messaging API or Broadcast Channel API). In such case, the client application 320 may present the obtained identity handle to the user for confirmation or simply proceed to use the identity handle for authentication without having to receive further input from the user 310.

Derive a Reference to the Identity Records Based on the Identity Handle 352

At operation 352, once the identity handle is obtained from the user 310, the client application 320 may derive one or more references to the identity records in a domain name system 330 based on the identity handle.

In an embodiment, a reference to the identity records is derived by the client application 320 based on the user's 310 identity handle by substituting the "@" character in the identity handle with "._at_." text and using such transformed handle as a domain name to build a reference to resource records of TXT type in the domain name system 330. For example, from the identity handle "username@example.com," a reference to TXT resource records of the "username._at_.example.com" domain name may be derived.

In an embodiment, the user's 310 identity handle is split into a username part and a hostname part by splitting the string at the "@" character. The username part is then hashed using a cryptographic hash function (e.g., MD5 (a message digest algorithm) or SHA (secure hash algorithm)) and concatenated with the hostname part to produce a domain name that is used as a reference to resource records in the domain name system 330. For example, from the identity handle "username@example.com," a reference to resource records of a domain name "14c4b06b824ec593239-362517f538b29.example.com" may be derived through the use of a MD5 cryptographic hash function on the username part.

In an embodiment, the user's 310 identity handle is similarly split into a username part and a hostname part, and the hostname part is used directly as a domain name to produce a reference to identity records in the domain name system 330. For example, from the identity handle "username@example.com," a reference to TXT resource records of the "example.com" domain name may be derived. As previously described, in such case, the values of resource records may contain information for which identity handles they are valid.

In an embodiment, a reference to identity records in the domain name system 330 is obtained using a multi-step procedure through some algorithm (which may be implementation-specific) that may involve obtaining information from a domain name system or other external sources. For example, in a first step, a reference to a resource record in a domain name system 330 may be derived from the identity handle. In a second step, the domain name system may be queried for a value of such resource record and the obtained value may contain information that will help the algorithm to produce a reference to identity records. For example, the following resource record may be published in the domain name system 330: "domain.example IN TXT 'identity-namespace._users_.'", and from the identity handle "john@domain.example," a reference to TXT records of the domain name "john._users_example" may be produced by such example algorithm. Other techniques such as those described with reference to operation 258 of FIG. 2, and/or operation 1120 of FIG. 11 may be used to derive a reference to identity records from the identity handle.

Query for Referenced Identity Records and Receive Response 353

At operation 353, the client application 320 may query the domain name system 330 for referenced identity records and obtain the values of the referenced identity records from the domain name system 330.

In an embodiment, the client application 320 is a client-side web application, and uses DNS over HTTPS (DoH) protocol to resolve the referenced identity records via the HTTPS protocol (e.g., by querying the DoH resolver through the Fetch API).

In an embodiment, the client application 320 is a server-side web application, desktop application, or command line application, and uses the domain name system 330 resolver provided by the operating system (e.g., systemd-resolved) or a command-line utility (e.g. dig, host, or nslookup) to resolve the referenced identity records.

Obtain the Public Keys Associated with the Identity Handle Based on the Data Included in the Received Identity Records 354

At operation 354, the client application 320 may obtain a list of public keys that are associated with the identity handle based on the data included in the identity records received from the domain name system 330.

In an embodiment, the client application 320 looks at the received list of TXT resource records looking for records that match a regular expression (e.g., "/^key (.+) $/"), and may use a capture group of such regular expression to extract an encoded (e.g., base64-encoded) public key of an asymmetric cryptography algorithm (e.g., ECDSA) from each matching record into a list (e.g., an array). It may then proceed to decode (e.g. with base64-decode) the values and convert the resulting raw data into cryptographic key objects (e.g., by using the "window.crypto.subtle.importKey" function). For example, the following two records may be received as a response to a query for identity records:

john._at_domain.example IN TXT "key BFUHfngwsKRZZN8gxzIIy4DLFaZbsZrk4R3Crn-EpBqhWrdQi805VsMAftZ3DscXIpK3V+F8 x7qQV+PaJPz8yUUI="

john._at_domain.example IN TXT "key B195Ozw1IzVJH17KTuT7Wcxe7uNf+bJ97sDXU01CfqHTyk61SCiNqocS+1cZaxvoN41enxKC ju839ZX4vxUIkgo="

The client application 320 may then be able to obtain from such records two ECDSA public keys, which are not associated with any group of keys, and any of which may be independently used to authenticate the identity handle "john@domain.example," as will be further described herein.

In an embodiment, the type of asymmetric cryptography algorithm to be used with the key, the method that was used to encode the key, the identity handle for which the key is valid, the group of keys (that may identify a single web browser) that the key belongs to, the specific factor or API with which the key is used, and/or information regarding whether the key is required or optional forms a part of the resource record value in the domain name system 330. For example, the value of a resource record may be as follows:

john._at_domain.example IN TXT "key BFUHfngwsKRZZN8gxzIIy4DLFaZbsZrk4R3CrnEp-

BqhWrdQi805VsMAftZ3DscXIpK3V+F8 x7qQV+
PaJPz8yUUI=type=ECDSA [P-256] enc=base64
id=john@domain.example group=123
factor=webauth-fingerprint mode=required"

This resource record value indicates that the key is to be used with the ECDSA algorithm with P-256 curve, is encoded using base64, is for the "john@domain.example" identity handle, is a part of group of public keys (e.g., public keys associated with a single web browser) identified as "123," is a public key that was obtained through the Web Authentication API for a fingerprint reader device, and that the cryptographically matching signature is required to authenticate the user. The factor/API information mentioned above may be important for client applications 320, as they may expect the challenge to be modified in a certain way before being signed (e.g., to adapt it to the requirements of an API of a fingerprint reader). Any suitable type of asymmetric cryptography algorithm may be used with the authentication scheme described herein. For example, digital signature algorithms (e.g., ECDSA, RSASSA-PKCS1, RSA-PSS, Schnorr signature algorithm, etc.) or algorithms typically used for encryption (e.g., RSA-OAEP) may be used. It will be appreciated by one skilled in art that any asymmetric cryptography algorithm that can be used for encryption may also be used to act similarly to a digital signature algorithm.

In an embodiment, the identity record value in the domain name system 330 contains a URL pointing to an online resource that may include one or more public keys together with optional information that may aid the client application 320 in validating and parsing the content of the resource. For example, the following resource record may be received from the domain name system 330:

john._at_domain.example IN TXT "key https://domain.example/users.json md5=552e8617d6a3e20-88fa3cb163c8058af se1=keys [0]"

In such case, the client application 320 may initiate a request for an external resource located at the "https://domain.example/users.json" URL, verify the resource integrity by ensuring its MD5 checksum matches the one provided in the resource record, parse it as a JSON document, and extract a first key from the "keys" array. The client application 320 may also use the user's 310 identity handle and any other known information to extract the appropriate one or more keys from the response. For example, for the "john@domain.example" identity handle, the client application 320 may attempt to extract the public key from the JSON document using the following pseudo-code "publicKeys=responseJson ['john@domain.example']. keys".

In an embodiment, the identity record value received from the domain name system 330 contains a reference to a different domain name, forming a redirection which may then be followed by the client application 320 to ultimately resolve to a final identity record that contains a reference to the public key. For example, given the identity record "john._at_domain.example IN TXT 'ref john._at_.otherdomain.example'," it is expected that "john._at_.otherdomain.example" will replace the originally referenced domain name, and the procedure to retrieve the value of resource record and obtain a public key will be repeated with such a new reference.

In an embodiment, a group of public keys associated with a single web browser may be obtained from one or more identity records. As it will be further described herein, it may be expected that the authentication provider application 340 will be able provide a cryptographically matching digital signature for each of such public keys belonging to a single group in order to authenticate the user 310 with the client application 320.

Derive the Web Address of Authentication Endpoint Based on the Identity Handle 355

At operation 355, the client application 320 may derive the authentication endpoint web address based on the user's 310 identity handle.

As previously described, the authentication endpoint web address is an address (e.g., a URL) which may be used by the user 310 that is being authenticated and/or the client application 320 to access the authentication provider application 340 through the web browser on the user's device that may have been previously set up to authenticate the identity handle as described with reference to FIG. 2. The way in which the authentication endpoint web address is derived based on the identity handle may depend on the implementation.

In an embodiment, the reference to the authentication endpoint web address is obtained directly from the user's 310 identity handle, for example, by using the text that appears after the "@" sign in the identity handle as a hostname of a URL with the "https" or "http" protocol. For example, for the identity handle "john@domain.example," the authentication endpoint web address may be "https://domain.example."

In an embodiment, the authentication endpoint web address is derived based on the user's 310 identity handle using some algorithm, which may be implementation-specific, and may require interacting with and obtaining information from external sources or databases, such as the domain name system 330. For example, the identity handle "john@domain.example" may be transformed into "https://john.domain.example/" (e.g., by string substitution), "https://sign-in-here.domain.example/" (e.g., by replacing a fragment of a string with some pre-defined text), or "https://527BD5B5D689E2C32AE974C6229FF785.domain.example/" (e.g., by transforming part of the text into a MD5 hash). The domain name of the identity handle may be also used to perform a DNS query for TXT records, and a value of one of such TXT records may be used to determine the authentication endpoint web address.

Any of the techniques for deriving the authentication endpoint web address described with reference to operation 252 of FIG. 2, and/or operation 1130 of FIG. 11 may be used in this step as well.

Prepare and Send a Challenge Using Authentication Endpoint Web Address 356

At operation 356, the client application may prepare a challenge and send it to the authentication provider application 340 using the authentication endpoint web address (e.g., by opening a new web browser window or iframe pointing at the authentication endpoint web address). The challenge may consist of any data, and may include a cryptographic nonce that would protect against replay attacks. Once the authentication endpoint web address is accessed, the web browser may load and execute the authentication provider application 340, as it is assumed that during the setup either the domain name of the authentication endpoint web address was and continues to be pointed at the web server that serves the authentication provider application 340 or that the authentication provider application 340 is installed inside the user's 310 web browser (e.g., as a Progressive Web Application) and is accessible under the authentication endpoint web address without a need for the web browser to contact any web servers.

In an embodiment, the client application 320 generates a random nonce (e.g., using the Web Crypto API or Math.random function) as a challenge and opens a new browser window (e.g., through a call to window.open function or by spawning a new web browser process) or redirects the current window (e.g., by setting window.location) pointing it at the authentication endpoint web address, with the challenge included inside the URL parameters. For example, when the client application 320 is a web application, this may be achieved by the following client-side pseudo-code:
nonce=self.crypto.randomUUID( );
authenticatorApp=window.open ('https://'+authenticationEndpoint+'?challenge='+nonce)

Similarly, when the client application 320 is a desktop or console application, this may be achieved by the following shell pseudo-code: "nonce=$RANDOM; xdg-open 'https://$authenticationEndpoint?challenge=$RANDOM'".

In an embodiment, the challenge is an object serialized to a string (i.e., a sequence of bytes or characters) in a particular format (e.g., JSON, extensible Markup Language (XML), or Yaml Ain't Markup Language (YAML) format). This allows the client application 320 to pass any arbitrary data to the authentication provider application 340, which may then be used by the authentication provider application 340. For example, a challenge may be a JavaScript object serialized to the following JSON string "{sub: 'john@domain.example', aud:'client-application.example', expires:'2023 Jan. 1', nonce:'1234', message:'Please authenticate', rememberToken:'abc', permissions:'sign', callbackUrl:'https://client-application.example/callback'}." The authentication provider application 340 may then be able to de-serialize the received challenge from the JSON format into a JavaScript object and verify that, for example, the value of the "sub" attribute matches the identity handle for which a private key is available to the authentication provider application 340, that the value of the "aud" attribute matches the domain name of the client application 320 (e.g., as obtained from the window.referer attribute), that the value of the "expires" attribute is not greater than the current date and time (e.g., to limit the validity of the request and prevent replay attacks), display the value of the "message" attribute to the user 310 during authentication, use the value of the "permissions" attribute to extract, store, and present to the user a list of other operations that the client application 320 may request from authentication provider application 340 (e.g., the client application 320 may designate that it will want the client application 320 to sign messages on the user's 310 behalf), use the value of the "callbackUrl" attribute to determine the URL to which response should be sent and/or user should be redirected after successful authentication, and use the value of the "rememberToken" attribute to store information about whether the user has approved or declined authentication so that the same choice can be automatically applied by the authentication provider application 340 in the future for requests containing the same value of the "rememberToken" attribute and to allow the client application 320 to perform message signing requests without a need for user interaction, as will be further described herein.

In an embodiment, the challenge is an object serialized to a string and the object contains a unique value (e.g., a random universally unique identifier (UUID) number under the "rememberToken" attribute) that may be used by the client application 320 in further communications with the authentication provider application 340 (e.g., when performing another authentication or establishing an end-to-end encryption channel) that will allow the authentication provider application 340 to identify the particular instance of the client application 320 and, for example, decide whether an additional confirmation from the user 310 is required or not to perform a particular operation requested by the client application 320.

In an embodiment, the challenge contains a cryptographic key that identifies the client application 320, and/or a digital signature of the challenge is made by the client application 320 and sent to the authentication provider application 340, that may allow the authentication provider application 340 to verify the authenticity and/or integrity of the received challenge.

In an embodiment, instead of opening a window, a frame or iframe element is loaded with the source attribute pointing at the authentication endpoint web address. For example, when the client application 320 is a client-side web application, it may attach an iframe element to the Document Object Model (DOM) using the following pseudo-code:
iframe=document.createElement ("iframe");
iframe.src="https://"+authenticationEndpointDomain+"?challenge="+nonce;document.body.appendChild (iframe);

In an embodiment, the challenge is passed through a browser-based cross-window communication mechanism such as a window.postMessage call, a MessageChannel API, or a BroadcastChannel API.

In an embodiment, the client application 320 is a web application and the authentication endpoint web address (e.g., a URL) together with challenge as a parameter is passed inside the Location header of a HTTP Redirect response issued by the client application 320. For example, when the client application 320 is a server-side web application, it may respond to a HTTP request with the "302 Found" HTTP code and include a "Location" header pointing at the authentication endpoint web address in the response using the following pseudo-code: "response.headers['Location']='https://'+authenticationEndpoint+'?challenge='+nonce."

In an embodiment, the client application 320 presents the challenge and the authentication endpoint web address through its user interface, from which the user 310 can copy them and enter them into the web browser on the user's 310 device, thereby accessing the authentication provider application 340 and providing the authentication provider application 340 with the challenge.

Digitally Sign the Challenge Using One or More Private Keys 357

At operation 357, the authentication provider application 340 may receive the challenge from the client application 320, optionally confirm the authentication attempt with the user 310, and sign the challenge using one or more private keys that are accessible to the authentication provider application 340 for signing (e.g., private keys that were previously generated and stored during the setup procedure as described with reference to FIG. 2). The challenge may be received through a variety of means, which may be implementation-specific. The authentication provider application 340 may optionally present a screen to the user 310 asking whether the user 310 would like to authenticate to the client application 320. Presenting such screen would allow the user 310 to decide whether the user wants to continue and authenticate to the client application 320 or decline such request and terminate the authentication procedure at this point. The authentication provider application 340 may then use the private key of an asymmetric cryptography key pair that was stored, preferentially in the client-side storage (e.g., IndexedDB or localStorage) during the setup procedure as previously described with reference to FIG. 2, to digitally sign the challenge, or obtain the digital signature from external sources. The authentication provider application 340 may modify the challenge prior to signing (e.g., to adapt it to specific requirements of an external API that is used to sign it) and/or use a variety of other signing keys and methods that are available to the authentication provider application 340 and were previously setup to be used with the user's 310 identity handle, to obtain one or more digital signatures for each potentially modified challenge or a part thereof. Such one or more digital signatures may act as a zero-knowledge proof that the authentication provider application 340, which may be running in a web browser on a user's device, is able to use the one or more private keys that cryptographically match the one or more of the public keys obtained by the client application 320 for the given identity handle from the domain name system 330. This digital signature can also be later independently verified by the client application 320 or any third party, without a need to access the authentication provider application 340 (e.g., using a public key obtained from identity records). As used herein, the phrase "digitally sign the challenge" may mean that the challenge in its entirety is digitally signed, a portion of the challenge is signed, or a modified version of the challenge (that is modified in a known/acceptable way) is digitally signed.

In an embodiment, the authentication provider application 340 receives the challenge through URL parameters or HTTP request body.

In an embodiment, the authentication provider application 340 receives the challenge through a cross-window communication mechanism (e.g., through window.postMessage call, MessageChannel API or BroadcastChannel API).

In an embodiment, the authentication provider application 340 obtains information about the client application 320 (e.g., through the window.opener, window.parent, document.referrer, or from the data received as part of the challenge) and presents the information to the user 310 for verification. The authentication provider application 340 may also present a checkbox such as a "remember the choice" checkbox that, if checked, would make the authentication provider application 340 remember the choice made by the user 310 for the particular client application 320 and automatically apply such decision the next time authentication is performed. If the user 310 denies the authentication request, the window may be closed (e.g., through the call to the window.close function) and the authentication process may terminate.

In an embodiment, the authentication provider application 340 de-serializes and uses the data obtained from the client application 320 as part of the challenge to perform further verification and checks such as verifying that the client application 320 is whitelisted or is not blacklisted or that the expiry time has not passed.

In an embodiment, the authentication provider application 340 obtains a digital signature of the challenge or any part of thereof from the client application 320, downloads a web manifest file associated with the client application 320, extracts a public key of the client application from the web manifest file, and verifies that the digital signature of the challenge cryptographically matches with the public key of client application 320. For example, a client application may include its unique identifier or origin URL as a part of the challenge (e.g., a value "client-application.example" may be provided as a value of "aud" attribute in a JSON serialized challenge), and the authentication provider application may derive an address of web application manifest file from such unique identifier or origin URL (e.g., "https://client-application.example/manifest.json"), download and parse the manifest file, extract a public key of the client application from it, and use the public key to verify the received signature of the challenge.

In an embodiment, the authentication provider application 340 modifies the received challenge to include additional data. For example, the authentication provider application 340 may de-serialize the received challenge into an object, and then remove, modify, or add one or more attributes to the object (e.g., the authentication endpoint web address), and then serialize the object to obtain a modified challenge that may be subsequently used in place of the received challenge (e.g., when a challenge needs to be adapted to be used with an API of a fingerprint reader or some external service).

In an embodiment, the authentication provider application 340 retrieves the private key of an asymmetric cryptography algorithm (e.g., a ECDSA private key) or a reference thereto from the client-side storage (e.g., IndexedDB or localStorage), which was placed in the client-side storage during the setup process previously described with reference to FIG. 2, and uses an asymmetric cryptography function (e.g., a custom JavaScript function, a function from a Web Crypto API, or the Subtle Crypto's sign function) to digitally sign the received challenge using this private key. For example, the authentication provider application 340 may obtain a previously-stored reference to a non-extractable private key from IndexedDB and use such reference with the window.crypto.subtle.sign function, which allows it to use a key which cannot be directly accessed, copied, or exported outside of the web browser, thereby offering protection against key duplication attacks.

In an embodiment, the authentication provider application 340 has stored an encrypted private key in the client-side storage (e.g., Indexed DB or localStorage) and retrieves a passphrase or decryption key from the user 310 (e.g., by presenting the user with a passphrase prompt), from a web server which hosts the authentication provider application 340, or other source to decrypt the private key and use it to digitally sign the received challenge.

In an embodiment, the authentication provider application 340 retrieves the private key or a digital signature from some non-local source such as from a web server that hosts the authentication provider application 340 or a managed database service (e.g., DynamoDB® or Amazon RDS®). The received private key may be encrypted, and thus the authentication provider application 340 may retrieve the encryption passphrase or key from its client-side storage (e.g. IndexedDB) or from the user (e.g., through the user interface) in order to decrypt it and use it to digitally sign the received challenge.

In an embodiment, the private key is not stored in client-side storage (e.g., not stored within the web browser) of the authentication provider application 340, the authentication provider application 340 forwards the challenge to an external source such as a web server that hosts the authentication provider application 340 or some external service (e.g., a web service), and receives a digitally signed challenge back as a response. In such case, the authentication provider application 340 may store on the client-side (in a browser-based storage such as IndexedDB or as a cookie) an access token that it uses to authenticate to such external source, or use the herein described authentication method with one or more other public keys to authenticate to the external source.

In an embodiment, when the web browser in which the authentication provider application 340 is running was not setup for authentication as described in reference to FIG. 2, the authentication provider application 340 may forward the challenge to a different instance of authentication provider application that is running in a web browser on one of the other user's devices that was setup for authentication as described with reference to FIG. 2 (e.g., by using a WebSocket or WebRTC connection), and receive one or more digital signatures.

In an embodiment, the authentication provider application 340 has been set up to use external service to obtain any number of digital signatures, and such service, through the logging of its operations and/or issued digital signatures, may act as a central point for the purpose of providing unified access and session audit trail. For example, an organization that the user 310 belongs to may require that identity records of each of its member users contain a specific public key, for which a cryptographically matching private key is available to some centralized service (e.g., a web service). Such centralized service may be then contacted by the authentication provider application 340 running in a web browser on user's device (e.g., using the API provided by the centralized service) to obtain a digital signature of the challenge that is cryptographically matching to the specific public key. Upon issuance of a digital signature, the centralized service may log such operation, and the log may be used by organization's administrators to audit the authentication requests initiated by its users and to provide a global overview of authentication related activity for the whole organization.

In an embodiment, the authentication provider application 340 uses an attached authentication device (e.g., a fingerprint reader) or other authentication method (e.g., Web Authentication API) to obtain the digitally signed challenge without a need to directly access the private key.

In an embodiment, the authentication provider application 340 only digitally signs a part of the challenge (e.g., a single attribute of the de-serialized challenge) or modifies the challenge to include a new part that is then digitally signed (e.g., by adding an attribute to the de-serialized challenge, signing the value of such attribute, and serializing the challenge back to the original format).

As previously described, a digitally signed challenge may include one or more digital signatures and any number of modified challenges for which, or for parts of which, the respective digital signatures were generated. In an embodiment, the authentication provider application 340 has been set up to provide multi-factor authentication and/or multi-party authentication and uses a combination of the above-described techniques to obtain one or more digital signatures that may then be included in the digitally signed challenge and verified against a group of public keys (e.g., keys associated with a single web browser) obtained from identity records.

Respond with a Digitally Signed Challenge 358

At operation 358, the authentication provider application 340 may send the digitally signed challenge back to the client application 320 or provide the digitally signed challenge to the user 310 so that it can be manually transferred back to the client application 320.

In an embodiment, the digitally signed challenge is included inside a query or fragment component of a URL that points at the address of the client application 320 or at an address provided by the client application 320 as a part of the challenge. The authentication provider application 340 may then send to the browser a HTTP redirect response with a "Location" header pointing to such URL or redirect the browser through any other means (e.g., by using the window.location property, sending a web form, or following a link).

In an embodiment, the signed challenge is sent back to the client application 320 using a cross-window communication mechanism (e.g., through the postMessage call or MessageChannel API).

In an embodiment, the digitally signed challenge is sent as a part of a network request (e.g., a POST request) that is sent to the client application 320 or to the network address provided by the client application 320 as a part of the challenge.

In an embodiment, the digitally signed challenge is presented in the user interface of the authentication provider application 340, and the user 310 may copy it and manually provide it to the client application 320.

Verify that the Received Digital Signature Cryptographically Matches any of the Public Keys or Public Key Groups 359

At operation 359, the client application 320 may receive the digitally signed challenge from the authentication provider application 340. When one digital signature is provided as a part of the digitally signed challenge, the client application 320 may verify that the digital signature cryptographically matches to at least one of the public keys that are associated with the given identity handle (that were previously obtained based on identity records associated with the identity handle, as described with reference to operation 354) that are not part of, or are a single member of any group of public keys. If multiple digital signatures are provided in the digitally signed challenge, the client application 320 may verify that each of these digital signatures cryptographically match a public key from the same group of public keys (that were previously obtained based on identity records associated with the identity handle as described with reference to operation 354), and that all of the keys from such group were matched. The client application 320 may then also verify that each potentially modified challenge that was received as a part of the digitally signed challenge is the same as the challenge that was previously sent in the request to the authentication provider application 340 (e.g., at operation 356) or has modifications which are considered valid. The verification of the challenge may protect against replay attacks, while the verification of the digital signatures may provide proof that the user 310 is in control of such identity handle (and thus may be successfully authenticated with it).

In an embodiment, the client application 320 is a web application, and the signed challenge is received through the use of a cross-window communication mechanism (e.g., through the window.addEventListener ("message", . . . ) function or MessageChannel API).

In an embodiment, the digitally signed challenge is received by the client application 320 as a part of a web request or other network request (e.g., as a parameter included in a URL, in headers of the request, or in the body of the request).

In an embodiment, the digitally signed challenge is received through the user interface of the client application 320 (e.g., through a prompt or dialog window).

In an embodiment, if the digitally signed challenge includes one or more potentially modified challenges for which digital signatures were generated, the client application 320 verifies that each of the potentially modified challenges is the same as the original challenge that was previously prepared by the client application 320 or that the modifications made to the original challenge by the authentication provider application 340 are valid and acceptable (e.g., that the nonce has not been changed or that the changes were a result of the challenge being adapted to the requirements of some specific API).

In an embodiment the digital signature that constitutes the received digitally signed challenge or that is provided as a part of the received digitally signed challenge is verified by the client application 320 through the use of an asymmetric key cryptography verification function (e.g., the Web Crypto API, Subtle Crypto's verify function, or a custom function) against a previously obtained list of public keys associated with the identity handle, looking for a match. When multiple digital signatures are present in the digitally signed challenge, the client application 320 may iterate over a previously obtained list of public key groups, and perform the above method, ensuring that each of the public keys in the group cryptographically matches to at least one of the digital signatures. If a cryptographically matching public key or cryptographically matching group of public keys is found, the authentication succeeds, otherwise it fails.

Optionally Verify that the Matched One or More Public Keys are on a Whitelist 360

At operation 360, the client application 320 may optionally compare each of the public keys that was successfully matched to the digital signature with a list of public keys that were previously used to authenticate the given identity handle with the client application 320. If the matched public key is not included in such list, the client application 320 may decide to subject the user 310 to some further identity checks (e.g., by requesting a two-factor authentication code, short messaging service (SMS) code verification, or approval of the login attempt from some other already trusted web browser), particularly when there are already some keys on such list. Such optional mechanism adds another layer of security, as it allows for protecting against situation where an attacker would be able to add the attacker's own public key to the domain name system 330 to impersonate the user, while providing a smooth authentication flow for previously seen and already trusted web browsers on the user's devices.

In an embodiment, the client application 320 is a server-side web application, desktop application, or command line application and stores the list (e.g., whitelist) in a local database (e.g., in a MySQL, MongoDB or PostgreSQL database) or on a remote database (e.g., Amazon RDS®, Azure Cosmos SQL®, or Firebase®).

In an embodiment, the client application 320 is a client-side web application and stores the list through a storage API provided by the web browser (e.g., the IndexedDB API or localStorage API) or on a remote database that can be accessed from the web browser (e.g., Firebase®).

In an embodiment, if there are some entries on such list, and the public key that was successfully cryptographically matched to the digital signature is not included on such list, the client application 320 presents a screen asking the user 310 to perform additional authentication step, for example, enter a verification code (e.g., SMS (short message service) verification code, email address verification code), or sign in again from a different web browser that was previously used to authenticate the identity handle with the client application 320 and confirm the ability of the current web browser to authenticate the user with the client application 320.

Optionally Obtain Additional Information about the User from Identity Records 361

At operation 361, the client application 320 may optionally query the domain name system 330 for other identity records associated with the user's 310 identity handle and use the data included therein to obtain additional information about the user 310 (e.g., name, initials, roles, groups, and/or avatar image), present the additional information in the user interface of the client application 320, and/or use such information for the purpose of performing role-based access control (RBAC) or group-based access control (GBAC).

In an embodiment, the client application 320 queries the domain name system 330 for identity records associated with the identity handle, looking for records that match a specific pattern (e.g. "/^name (.+) $/") and use such pattern to extract the additional information. For example, for the identity handle "john@domain.example," values of the following identity records may be used to obtain additional information about the name, initials, roles, groups, and avatar image associated with such identity handle:

john._at_domain.example IN TXT "name John Doe"
john._at_domain.example IN TXT "initials JD"
john._at_domain.example IN TXT "role type=admin app=*.app-vendor.example"
john._at_domain.example IN TXT "group management@domain.example"
john._at_domain.example IN TXT "avatar http://domain.example/avatars/john.png"

In an embodiment any number of roles of the user may be stored inside user's identity records, and the values of such identity records may additionally specify an identifier of a certain client application or group of client applications to which such role applies. The client application 320 may use such information to perform role-based access control (RBAC). For example, the user identified by identity handle "john@domain.example" may have following identity record published in the domain name system: "john._at_domain.example IN TXT 'role type=admin app=*.app-vendor.example'". Such identity record may be read by the client application 320, and if the identifier of the client application 320 matches the "*.app-vendor.example" pattern it may cause it to assign an "admin" role to the user identified by "john@domain.example" identity handle for the purpose of performing role-based access control.

In an embodiment any number of groups that the user belongs to may be stored inside user's identity records. The client application 320 may use such information to perform group-based access control (GBAC). The permissions of the specific group may be specified directly in the client application. Alternatively, the client application 320 may process the group identifier similar to the user's identity handle to derive a reference to group identity records and obtain their one or more values from the domain name system. The client application 320 may then obtain a list of roles for the specific group from the group's one or more identity records. For example, the user identified by identity handle "john@domain.example" may have following identity record published in the domain name system: "john._at_domain.example IN TXT 'group management@domain.example'". Such identity record may be read by the client application 320, and the client application 320 may derive a reference to the TXT records of "management._at_domain.example" domain name from it, and use it to query the domain name system to obtain one or more group identity records. One of such group identity records may look as follows: "management._at_domain.example IN TXT 'role type=superuser app=*'", and may cause the client application 320 to apply the "superuser" role to the user identified by the "john@domain.example" identity handle for the purpose of performing role-based access control (RBAC).

Once the authentication procedure is successfully completed, the user 310 as identified by the identity handle is authorized with the client application 320, and the client application 320 may use the identity handle as an internal identifier for the now signed-in user 310, and allow the user to access resources and data dedicated for such identity handle.

Optionally Determine Timeout, Query Domain Name System for Identity Records after Timeout, and Verify that Public Keys are Present 362

At operation 362, the client application 320 may then use the minimal time-to-live (TTL) value from/of the received identity records that contained the matching one or more public keys, or any other value, to determine a timeout after which the client application 320 may again query the domain name system 330 for current identity records (e.g., similar to as described in operation 353) and obtain current public keys associated with the user's identity handle based on the data included in the current identity records (e.g., similar to as described in operation 354). If the matched one or more public keys are no longer present in the current identity records (e.g., were removed from the domain name system 330), the client application 320 may log out the user 310 or require re-authentication. Otherwise, it may use the minimal time-to-live (TTL) value from/of the current identity records that contained the matching one or more public keys, or any other value, to determine a new timeout and after it repeat the aforementioned steps. This may allow the client applications to automatically log out users whose public keys used for authentication were subsequently removed from the domain name system 330 (e.g., revoked due to a device being stolen or a person leaving the company), providing support for functionality similar to single logout. In an embodiment, the client application 320 is a server-side web application, and uses a database to store logged-in users session information that includes the identity handle of the user, the one or more public keys that were used to authenticate the user to the client application 320, the one or more TTL values of the received DNS resource records that contained the one or more public keys, and a timestamp of when the DNS query was last performed. The client application 320 may then perform a periodic job (e.g., a cron job that runs every minute), to check for sessions that need to be refreshed (e.g., for which any of the stored TTL values when added to the timestamp of the respective DNS query is less than the current timestamp). For each of the sessions that need to be refreshed, the client application 320 may extract from the session information the user's identity handle, and the one or more public keys. It may then query the DNS for identity records associated with the user's identity handle to obtain a list of current public keys and/or public key groups associated with the user's identity handle (e.g., similar to as described in operations 352, 353, and 354). The client application 320 may then check that all of the one or more public keys that were used for authentication and stored in the user's session information are still present in the list. If so, the client application 320 may update the one or more TTL values stored in session information to reflect the current respective TTL values as received in response to the domain name system query, and update the timestamp of when the domain name system query was last performed. Otherwise, the client application 320 may terminate the user's session and require the user 310 to re-authenticate to the client application 320 (e.g., by removing the respective session information from the database). In an embodiment, the client application 320 uses DoH protocol and receives from a DoH resolver a response that includes the respective DNS record TTL value for each of identity records. In an embodiment, the client application uses a DNS library (e.g., libresolv) to obtain the identity records together with their respective DNS TTL values. In an embodiment, any value may be used for the timeout (e.g., the timeout may be explicitly specified in the code of the client application 320 or determined using some conditions that do not necessarily involve the DNS record TTL values). In an embodiment, when multiple identity records contain the one or more of the matching public keys, the client application 320 may use the lowest TTL value to determine the timeout. In an embodiment, a similar procedure as described above is used to periodically check the current roles and groups of the user as described with reference to operation 361.

Figure 4:
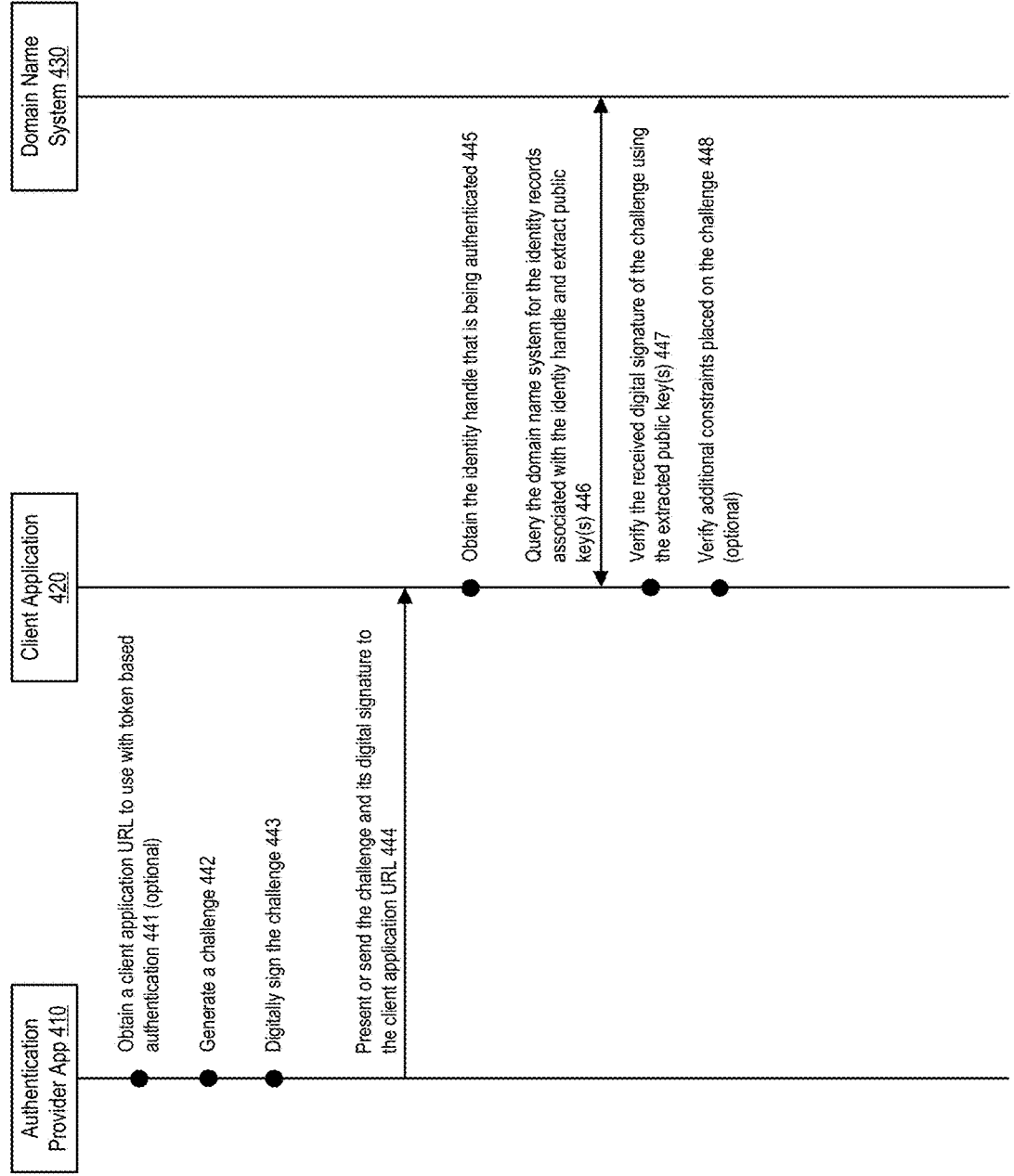
FIG. 4 is a diagram showing operations for a token based authentication method, according to some embodiments.

FIG. 4 is a diagram showing operations for a token based authentication method, according to some embodiments. The authentication provider application 410 may authenticate a user to a client application 420 through the token based authentication method in order to obtain data from the client application 420 or to make it perform specific actions (e.g., grant temporary access to a protected resource, create/remove/update such resource, log the user in, log the user out of all sessions, and/or entirely terminate the user's account in the client application).

The described token based authentication method is different from the previously described user authentication method (e.g., described with reference to FIG. 3) in that a challenge is generated by the authentication provider application 410 on its own (instead of being generated by the client application 420), and together with its digital signature forms a token that can be used to prove the identity of the user (as identified by the identity handle) to client applications 420. Although such token-based authentication may be considered less secure than the user authentication method described with reference to FIG. 3, it may be useful in cases where only a one-way communication channel is available and/or when a simple URL based pre-authentication is considered sufficient to perform actions or to read data from the client application 420.

As will be further described herein, with the use of such token based authentication method, data may be read from the client applications 420 by the authentication provider application 410 in order to be incorporated or aggregated into widgets that are shown in the user interface of the authentication provider application 410, and/or may be used by the authentication provider application 410 to generate pre-authenticated links to certain actions as specified and/or allowed by the client applications 420.

Optionally Obtain a Client Application URL to Use with Token Based Authentication 441

At operation 441, the authentication provider application 410 may optionally obtain a client application URL to use with token based authentication.

In an embodiment, the authentication provider application 410 stores information about client applications 420 it has previously interacted with, and optionally their manifest files. The client application manifest file may be a JSON file that is made available by the client application 420 that contains information about the application (e.g., its name, description, and/or icon).

The client application manifest file may be made available by the client application under a certain URL (e.g., https://myapp.example/manifest.json). Access to it may require a form of authentication (e.g., the herein described token based authentication), and the content of manifest file may be dynamically generated by the client application 420 based on the identity handle of the authenticated user.

The client application manifest file may also specify certain data sources and/or actions that may be performed on the client application 420, and provide the URL addresses for each of them.

Such client applications 420 that the authentication provider application 410 has previously interacted with may be presented in the user interface of the authentication provider application 410 (e.g., as icons), together with data obtained from their data sources (e.g., in the form of widgets or tables) and actions that may be performed on them (e.g., in the context menu that is available under the application icon).

The authentication provider application 410 may obtain from the manifest file and use a URL of a data source when it wishes to refresh the locally stored copy of the data (e.g., to update a widget) and/or a URL which should be fetched to perform certain actions on behalf of the authenticated user in the client application 420.

For example, the user may have previously authenticated to a client application 420 or manually added its URL to the authentication provider application 410 (e.g., "https://mycalendarapp.domain.com/").

The authentication provider application 410 may have read and stored the manifest file of the client application 420 from the URL associated with it (e.g., from "https://mycalendarapp.domain.com/manifest.json") using the herein described token authentication method.

The manifest file may have specified certain data sources and actions that may be performed on the client application 420 (e.g., through the following JSON structure: "{'sources':{'name':'Birthdays', type:'calendar', url:'/cal.ics?id=1'}, 'actions': [{'name':'Mute notifications', 'url':'/mute'}]}"). The authentication provider application 410 may then include a widget (e.g., a calendar widget) in its user interface for which data will be obtained from the client application 420 using the URL associated with the data source specified by the client application 420 (e.g., "https://mycalendarapp.domain.com/cal.ics?id=1") and/or present a menu with actions that may be performed (e.g., "Mute notifications") that are associated with respective URLs specified by the client application 420 (e.g., "https://mycalendarapp.domain.com/mute").

In an embodiment, the obtained URL is derived from the URL that has been previously passed by the client application 420 as a part of the challenge in the challenge-response authentication flow as described with reference to operation 356 of FIG. 3.

In an embodiment, the URL is obtained from the user through the user interface or from another source.

Generate a Challenge 442

At operation 442, the authentication provider application 410 may generate a challenge that may contain the obtained and potentially modified client application URL or its cryptographic hash, current timestamp, a cryptographic nonce, and/or any other information.

In an embodiment, the challenge is a JSON serialized array-like data structure that contains the identity string of the user, obtained URL, a random cryptographic nonce, and a current timestamp (e.g., "['john@domain.example', 'https://mycalendarapp.domain.com/mute', 'a33baf', 1692219395]").

Digitally Sign the Challenge 443

At operation 443, the authentication provider application 410 may digitally sign the challenge using one or more private keys that are available to the authentication provider application 410 for signing (e.g., that were previously generated and stored during the setup procedure as described with reference to FIG. 2), in a similar manner as previously described for the user authentication flow described with reference to operation 357 of FIG. 3.

In an embodiment, the authentication provider application 410 retrieves the private key of an asymmetric cryptography algorithm (e.g., a ECDSA private key) or a reference thereto from the client-side storage (e.g., IndexedDB or localStorage), which was placed in the client-side storage during the setup procedure as previously described with reference to FIG. 2, and uses an asymmetric cryptography function (e.g., a custom JavaScript function, a function from a Web Crypto API, or the Subtle Crypto's sign function) to digitally sign the generated challenge using this private key.

Present or Send the Challenge and its Digital Signature to the Client Application URL 444

At operation 444, the authentication provider application 410 may either present the challenge and its digital signature to the user through the user interface, fetch data, or redirect the user's web browser to the obtained URL of the client application 420, providing it with the challenge and its digital signature.

In an embodiment, the authentication provider application 410 modifies the obtained client application URL to include the challenge and its base64url encoded digital signature inside the query string (e.g., "https://mycalendarapp.domain.com/mute?challenge=% 5B %22john %40domain.example %22% 2C % 20%22https %3A %2F %2Fmycalendarapp.domain.com %2Fmute%22%2C %20%22a33baf % 22%2C %201692219395%5D&signature=EhuC0Xi0InvdEHSvVJt0xgldMxo5sR9HGvN17C 96IGteci6soriVcM51j-jjvAW6JvAKKAXv7sKHDGWeq2yyUQ") and either redirects the user's web browser to such URL (e.g., using window.location API or through a link element) or attempts to retrieve data from such URL (e.g., through the Fetch API). The challenge and its digital signature may then be read by the client application 420 from the URL query parameters.

In an embodiment, the challenge and digital signature are presented in the user interface of the authentication provider application 410 to the user, who may then provide the challenge and the digital signature to a client application 420 through a user interface (e.g., by copying and pasting the challenge and the digital signature into the user interface).

In an embodiment, the authentication provider application 410 does not need to provide the challenge or a part of thereof to the client application 420 if the challenge or a part of thereof can be independently calculated or recovered by the client application 420 itself.

Obtain the Identity Handle that is being Authenticated 445

At operation 445, the client application 420 may obtain the identity handle that is being authenticated.

In an embodiment, the identity handle that is being authenticated is passed as a part of the challenge, and the client application 420 extracts it from the received challenge.

In an embodiment, the identity handle is passed as a separate query parameter or otherwise can be inferred by the client application 420 (e.g., from the previously stored value or the specific resource being accessed).

Query the Domain Name System for the Identity Records Associated with the Identity Handle and Extract Public Key(s) 446

At operation 446, the client application 420 may query the domain name system 430 for identity records associated with the identity handle and extract public key(s) of an asymmetric cryptography algorithm from them, in a similar manner as described with reference to operations 352-354 of FIG. 3.

Verify the Received Digital Signature Using the Extracted Public Key(s) 447

At operation 447, the client application 420 may verify that the received challenge together with its digital signature cryptographically matches with at least one public key or one group of public keys extracted from the identity records.

The client application 420 may use a process similar to the ones described with reference to operation 359 of FIG. 3 to verify the digital signature, with the difference being that that the challenge has been received from the authentication provider application 410 and was not previously generated and/or stored by the client application 420.

Optionally Verify Additional Constraints Placed on the Challenge 448

At operation 448, the client application 420 may optionally verify additional constraints placed on the challenge.

In an embodiment, the client application 420 extracts the timestamp at which the challenge was generated from the challenge and verifies that it is not too far in the past.

In an embodiment, additional data may be included in the challenge (e.g., the identity handle, "valid_until" or "not_valid_before" timestamps) that may be verified against some constraints (e.g., the inclusion of the user's identity handle on a whitelist or the validity of the provided timestamps against the current time).

Once the digital signature of the challenge is verified, and any optional constraints are met, the client application 420 may assume that the request it has received is authenticated by the user as identified by the identity handle, and may continue to process it accordingly.

Figure 5:
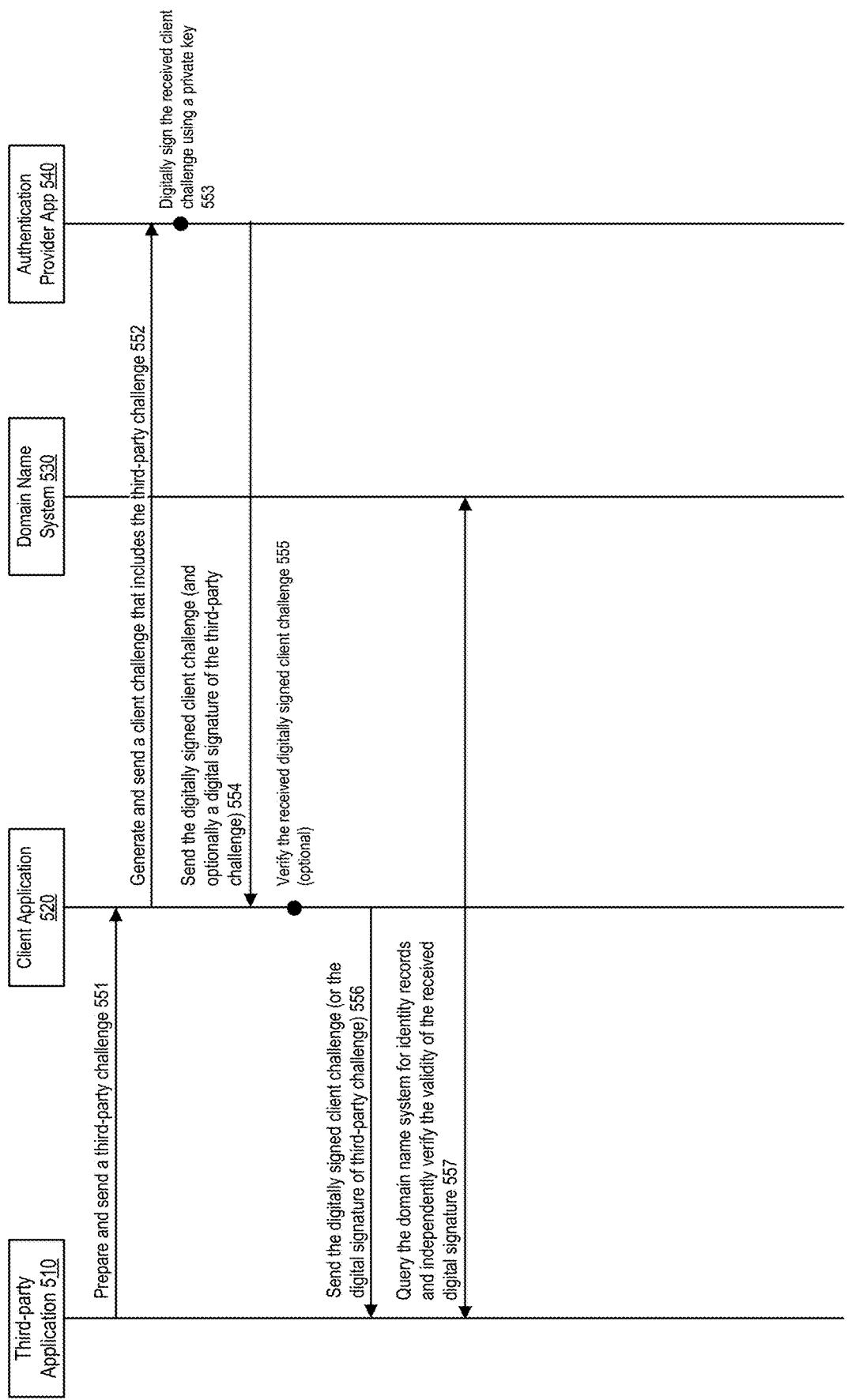
FIG. 5 is a diagram showing operations for authenticating a client application to a third-party application on behalf of the user, according to some embodiments.

FIG. 5 is a diagram showing operations for authenticating a client application to a third-party application on behalf of the user, according to some embodiments. Such authentication flow may enable the client application 520 to perform operations and access resources of a third-party application 510 on behalf of the authenticated user, as identified by the identity handle. It may be similar to the previously described user authentication flow as presented in FIG. 3 and described with reference thereto, except that a third-party application 510 may not be able to communicate directly with the authentication provider application 540, and that a third-party challenge may be provided by the third-party web application 510 to the client application 520, which may then be included in a client challenge sent by the client application 520 to the authentication provider application 540. The digitally signed client challenge may contain the third-party challenge and/or a digital signature of the third-party challenge. The client application 520 may receive the digitally signed client challenge from the authentication provider application 540 and forward it to the third-party application 510 together with information about the identity handle on behalf of which the third-party challenge was digitally signed.

For the sake of clarity, the diagram and its description may focus on an embodiment in which the authentication provider application 540 was initially set up to provide only one digital signature for each challenge (e.g., multi-factor authentication is not used), the digital signature is generated using a private key stored on the client-side in the web browser through which the authentication provider application 540 is accessed, and the client application 520 is a web application that is accessed/running in the same web browser on the same device as the authentication provider application 540. One of ordinary skill in the art, with the previously presented descriptions, will be able to implement appropriate functionality that allows multiple cryptographic keys to be required and used for such authentication (e.g., as in multi-factor or multi-party authentication described above) and/or that allows the authentication provider application 540 to digitally sign challenges with keys that are not stored in the web browser and/or that allows the client application 520 and authentication provider application 540 to communicate across web browsers/devices without undue experimentation.

Prepare and Send a Third-Party Challenge 551

At operation 551, the third-party application 510 may prepare a third-party challenge and send it to the client application 520. The third-party challenge may consist of any data, and may include a cryptographic nonce that would protect it against replay attacks.

In an embodiment, the third-party challenge is sent to the client application 520 that has connected with the third-party application 510 over a computer network (e.g., using a HTTP protocol if the client application 520 is a web application or TCP protocol if the client application 520 is a desktop application).

In an embodiment, the third-party challenge is an object serialized to a string (i.e. a sequence of bytes or characters) in a particular format (e.g., JSON, XML, or YAML format) that includes an attribute specifying the origin of the third-party web application 510 (e.g., its web address) and a cryptographic nonce. The third-party challenge may also contain any other fields or attributes that were previously mentioned.

Generate and Send a Client Challenge that Includes the Third-Party Challenge 552

At operation 552, the client application 520 may generate and send a client challenge that includes the third-party challenge to the authentication provider application 540. The client challenge may be the same as the received third-party challenge or may include the third-party challenge (with other information) and indicate that the authentication is being done for a third party. The client application 520 may then send the client challenge to the authentication provider application 540.

In an embodiment, the client application 520 receives the third-party challenge from the third-party application 510 over the computer network, validates its structure and contents (e.g., by de-serializing its data and checking that the origin declared in the challenge matches the network address or web address of the third-party web application 510 from which the third-party challenge was received), generates a new object representing the client challenge that includes the received third-party challenge as one of its attributes, includes an attribute specifying that the authentication is being done for the third party and an attribute specifying the identity handle of the user that is authenticated with the client application 520, serializes such object (e.g., to a JSON, XML, or YAML format), and sends it to the authentication provider application 540 that is accessible inside the web browser running on a user's device through the authentication endpoint web address (e.g., "https://auth.domain.example") that was previously derived from the identity handle that is authenticated with the client application 520 (e.g., "john@domain.example"), as previously described for the similar step in the authentication process described in FIG. 3 (e.g., by opening a web browser window and including the challenge as a part of the URL or by embedding an iframe pointing at the authentication endpoint web address and using cross-window communication method). For example, the client application 520 may receive the following third-party challenge:

"{origin:'server.third-party.com', nonce: 12345}," and use it to build a client challenge that looks as follows: "{relayedChallenge:'{origin:'server.third-party.com', nonce: 12345}', sub:'john@domain.example', nonce: 3678, expires:'2023 May 4', message:'The client application wants to authenticate to the server.third-party.com on your behalf'}"

The client application 520 may send this third-party challenge to the authentication provider application 540 running in the user's web browser through the authentication endpoint web address (e.g., by including it as a URL parameter or in a request body) that was previously used by the client application 520 to authenticate the user's identity handle with the client application 520, and/or that is derived from the user's identity handle.

Digitally Sign the Received Client Challenge Using a Private Key 553

At operation 553, the authentication provider application 540 may optionally validate the received client challenge, optionally ask for the user's permission, and digitally sign the received client challenge, and optionally digitally sign the third-party challenge using any of the methods that were previously described for a similar step in the authentication process as described with reference to operation 357 of FIG. 3.

In an embodiment, the authentication provider application 540 presents a confirmation dialog in the user interface asking the user whether the user wishes to allow the client application 520 to authenticate to the third-party application 510 on the user's behalf (i.e., through the user's identity handle).

In an embodiment, the authentication provider application 540 uses a private key that was stored on the client-side (e.g., with an IndexedDB API) when the web browser on the user's device was initially set up to be able to authenticate the identity handle, as described with reference to FIG. 2, to cryptographically sign the received client challenge.

In an embodiment, the authentication provider application 540 uses this or other available private key to also independently digitally sign the third-party challenge, which was received as a part of the client challenge.

In an embodiment, the authentication provider application 540 uses one or more private keys to independently digitally sign the client challenge and/or the third-party challenge (e.g., when browser was setup to perform multi-factor or multi-party authentication).

Send the Digitally Signed Client Challenge, and Optionally a Digital Signature of Third-Party Challenge 554

At operation 554, the authentication provider application 540 may send the digitally signed client challenge, and optionally a digital signature of the third-party challenge, back to the client application 520, preferably over the same communication channel or method through which the client challenge was received.

In an embodiment, the client application 520 is a web application loaded in the web browser on a user's device and the authentication provider application 540 is opened in another window or iframe of the same web browser on the user's device, and a cross-window communication method (e.g., postMessage interface, or MessageChannel API) is used to send the digitally signed challenge back to the client application 520.

In an embodiment, a signed client challenge and optionally a digital signature of the third-party challenge is presented in the user interface of authentication provider application 540, and may then be manually transferred (e.g., through copy-paste) by the user to the client application 520.

Optionally Verify the Received Digitally Signed Client Challenge 555

At operation 555, the client application 520 may receive the digitally signed client challenge from the authentication provider application 540, and optionally verify it by checking that the received client challenge is the same as the client challenge that was previously sent to the authentication provider application 540 or has been modified in an acceptable way, and that the digital signature cryptographically matches with at least one of the public keys for the identity handle that were obtained when the identity handle was used to authenticate to the client application 520, as previously described with reference to operation 359 of FIG. 3.

In an embodiment, the client application 520 stores (e.g., in a list) the public keys that are associated with the identity handle and that were obtained during its authentication with the client application at operation 354 of FIG. 3. It may then verify that at least one of such public keys cryptographically matches the key that was used to digitally sign the challenge (e.g., by using the window.crypto.subtle.verify function) and that the received challenge, if included in the digitally signed challenge, is either exactly the same as the one that was sent or has been modified in an acceptable way. When multiple digital signatures are present in the digitally signed challenge, the client application 520 may iterate over a previously obtained list of public keys belonging to a group, and perform the above method, ensuring that each of the public keys in the group cryptographically matches to at least one of the digital signatures.

In an embodiment, the client application 520 also receives the digital signature of the third-party challenge, optionally with a modified third-party challenge (e.g., when the challenge had to be adapted to some specific API prior to signing), and verifies that the digital signature, when used with the third-party challenge or with the modified third-party challenge, cryptographically matches at least one of the stored public keys that is not a member of, or is a single member of any group of public keys. When multiple digital signatures of the third-party challenge are received, the client application 520 may iterate over a previously obtained list of public keys belonging to a group, and perform the above method, ensuring that each of the public keys in the group cryptographically matches to at least one of the digital signatures.

Send the Digitally Signed Client Challenge or the Digital Signature of Third-Party Challenge 556

At operation 556, the client application 520 may send the received digitally signed client challenge or the received one or more digital signatures of the third-party challenge to the third-party application 510 together with optional information about identity handle, preferably over the same communication channel or method through which the third-party challenge was received.

In an embodiment, the digitally signed client challenge is sent to the third-party application 510 from the client application 520 over a computer network (e.g., using a HTTP protocol or cross-window communication method if the third-party application is a web application or a TCP protocol if the client application 520 is a desktop application).

In an embodiment, one or more digital signatures of the third-party challenge are obtained from the response received by the client application 520 from authentication provider application 540, and only such digital signatures, optionally with the respective possibly modified third-party challenge or a part thereof, are sent to the third-party application 510.

In an embodiment, the third-party application 510 is a web application running in the same web browser as the client application 520, and the digitally signed third-party challenge or the digital signature of the third-party challenge is sent using a web redirect (e.g., performed through window.location interface) or cross-window communication mechanism (e.g., through the use of postMessage interface). Query the Domain Name System for Identity Records and Independently Verify the Validity of Received Digital Signature 557

At operation 557, the third-party application 510 may verify that either the received client challenge includes the third-party challenge as it was initially sent by the third-party application 510 or that it has been modified in an acceptable way, and that the digital signature of the client challenge matches to at least one public key that may be obtained from identity records in the domain name system 530, to which reference is derived from the identity handle (e.g., as described with reference to operation 354 of FIG. 3), or that the received digital signature of the third-party challenge together with the potentially modified third-party challenge cryptographically matches at least one of such public keys. When multiple digital signatures have been received from the client application 520, the third-party application 510 may iterate over a list of public keys belonging to a group obtained from identity records in the domain name system 530, and perform the above method, ensuring that each of public keys in the group cryptographically matches to at least one of the digital signatures.

In an embodiment, the third-party application 510 de-serializes the received client challenge into an object (e.g., from a JSON, XML, or YAML format) and verifies that one of the object's attributes contains the third-party challenge as it was initially sent to the client application 520. For example, a client challenge such as "{'relayedChallenge: '{origin:'server.third-party.com', nonce: 12345}'}" can be de-serialized from JSON format and it may be verified that it includes the original third-party challenge "{origin: 'server.third-party.com', nonce: 12345}" as a string in the "relayedChallenge" attribute. Such verification allows the third-party application 510 to ensure that its challenge has not been modified in transit and prevent man-in-the-middle and replay attacks.

In an embodiment, the third-party application 510 verifies that the received client challenge includes the same third-party challenge that was initially sent to the client application 520.

In an embodiment, instead of the digitally signed client challenge, a digital signature of the third-party challenge is received by the third-party application 510. In such case, the third-party application 510 may use such digital signature with the original third-party challenge that it created, or with the received modified third-party challenge, to verify the digital signature against the public key as described below.

In an embodiment, the third-party application 510 receives an identity handle that is being authorized from the client application 520 (e.g., as a part of a client challenge or as part of request parameters), derives a reference to identity records in the domain name system 530 based on the received identity handle through one of the previously described methods (e.g., by replacing the "@" sign with "._at_." and using such transformed handle as a domain name for a TXT resource record lookup), and verifies that the public key obtained from at least one of such identity records cryptographically matches the digital signature of the received digitally signed client challenge or the received digital signature of the third-party challenge. When multiple digital signatures have been received from the client application 520, the third-party application 510 may iterate over a list of public keys belonging to a group obtained from identity records in the domain name system 530 and perform the above method, ensuring that each of public keys in the group cryptographically matches to at least one of the digital signatures.

Once it is verified that the digital signature cryptographically matches at least one public key or one public key group (in the case that multiple signatures were received) of the claimed identity handle and that the third-party challenge has not been modified in transit (in the case that the third-party challenge was included in the client challenge) or has been modified in an acceptable way, the client application 520 may be authenticated with the third-party application 510 using the identity handle.

Once the above described procedure has been successfully completed, the client application 520 may be signed-in and use the third-party application 510 on behalf of the user as identified by the identity handle.

Figure 6:
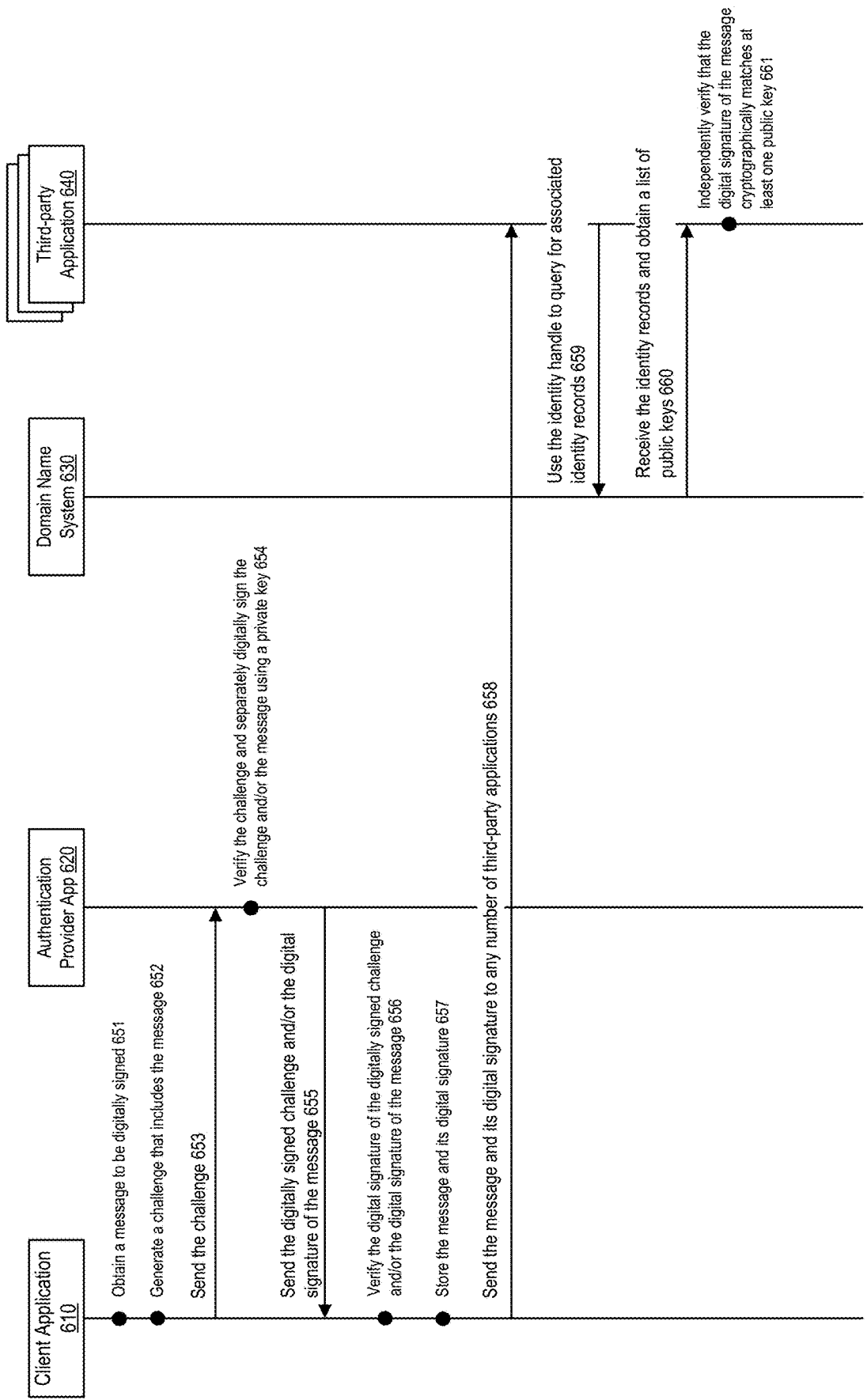
FIG. 6 is a diagram showing operations for a client application to sign a message on behalf of the user through the authentication provider application that is accessible in the web browser running on a user's device, according to some embodiments.

FIG. 6 is a diagram showing operations for a client application to sign a message on behalf of the user through the authentication provider application that is accessible in the web browser running on a user's device, according to some embodiments. A message may consist of any data and the digital signature obtained by the client application 610 may later be used by any third-party application 640 that receives such message to independently verify the authenticity of such message using the public keys obtained from identity records in a domain name system 630 that are associated with the identity handle of the user on whose behalf the message was signed.

The method described here is similar to the previously described authentication flow described with reference to FIG. 3, except that a message to be digitally signed is included as a part of the challenge and may be independently digitally signed by the authentication provider application 620 running in the web browser on the user's device.

For the sake of clarity, the diagram and its description may focus on an embodiment in which the authentication provider application 620 was initially set up to provide only one digital signature for each challenge (e.g., multi-factor authentication is not used), the digital signature is generated using a private key stored on the client-side in the web browser through which the authentication provider application 620 is accessed, and the client application 610 is a web application that is accessed/running in the same web browser on the same device as the authentication provider application 620. One of ordinary skill in the art, with the previously presented descriptions, will be able to implement appropriate functionality that allows the messages to be digitally signed and verified with multiple cryptographic keys (e.g., as in multi-factor or multi-party authentication described above) and/or digitally signed with keys that are not stored in the web browser and/or that allows the client application 610 and authentication provider application 620 to communicate across web browsers/devices without undue experimentation.

Obtain a Message to be Digitally Signed 651

At operation 651, the client application 610 may obtain a message that it wishes to digitally sign to prove that it has originated from the user, as identified by the user's identity handle.

In an embodiment, the message and the user's identity handle are obtained from the user (e.g., through the user interface) or from an external application (e.g., through a network request), and the message may be any kind of a message (e.g., a sequence of bytes, a text of a chat message, or a serialized data structure). In an embodiment, the identity handle is embedded in the message. In an embodiment, the identity handle is known to the client application (e.g., the user has previously authenticated to the client application using the identity handle).

Generate a Challenge that Includes the Message 652

At operation 652, the client application 610 may prepare a challenge that includes the message, and that may include additional data such as a cryptographic nonce.

In an embodiment, the challenge is an object serialized to a string (i.e., a sequence of bytes or characters) in a particular format (e.g., JSON, XML, or YAML format), that includes an attribute that contains the message to be digitally signed, a cryptographic nonce, and an optional value of remember token that was previously established during authentication between the client application 610 and the authentication provider application 620. As will be further described herein, such remember token may enable the authentication provider application 620 to ensure that the user accepted the ability of client application 610 to sign messages on the user's behalf during the authentication process. The challenge may also contain other fields or attributes that were previously described with reference to operation 356 of FIG. 3, when the challenge was constructed by the client application 610 during the authentication.

In an embodiment, the message to be digitally signed is used as a challenge.

Send the Challenge 653

Figure 11:
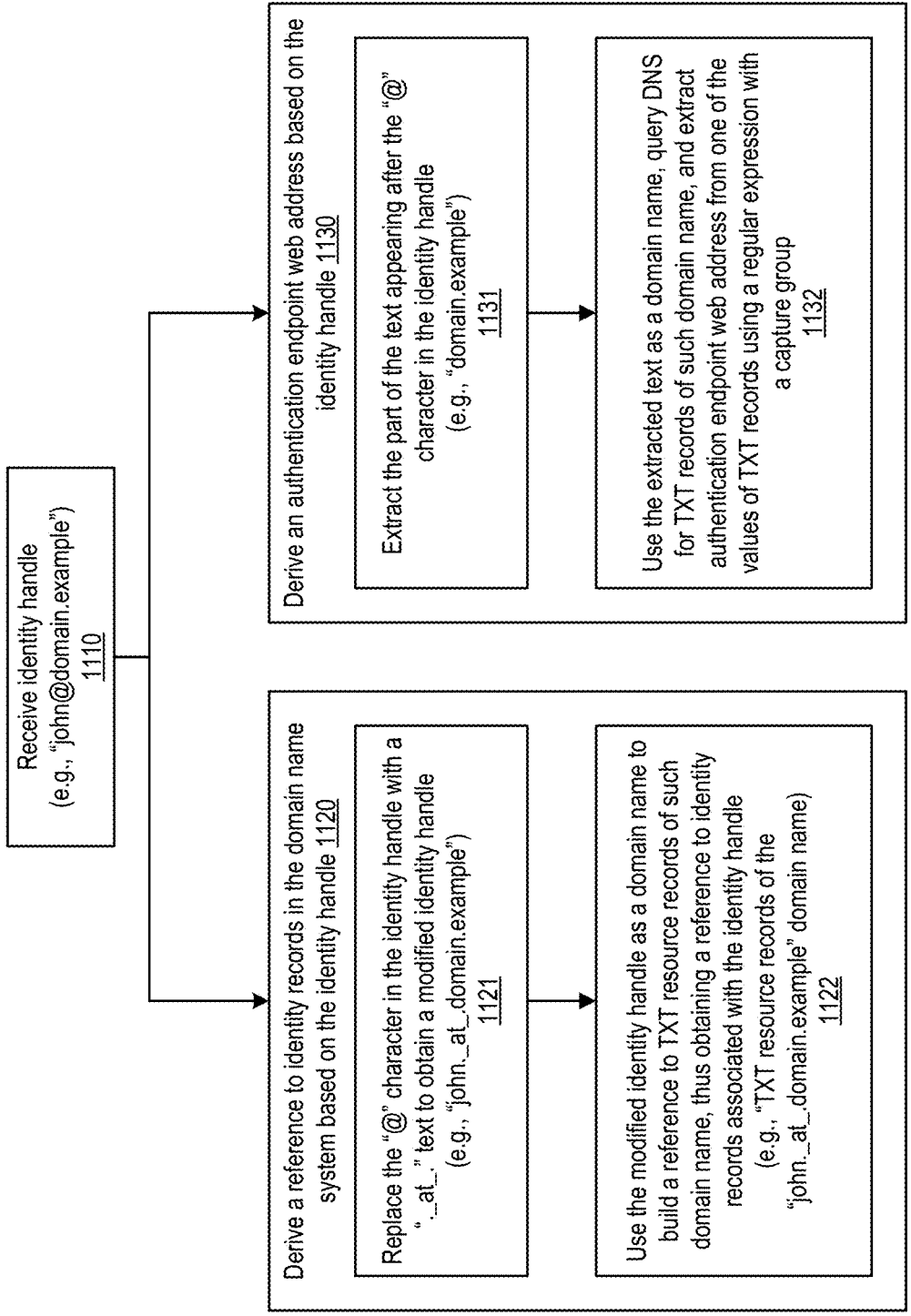
FIG. 11 is a diagram showing an example algorithm for deriving a reference to identity records in the domain name system and an authentication endpoint web address from an identity handle, according to some embodiments.

At operation 653, the client application 610 may send the challenge to the authentication provider application 620 that is operating inside the user's web browser, through the authentication endpoint web address (e.g., "https://auth.domain.example") that is derived from the identity handle of the user on whose behalf the message is being signed, as described with the reference to operation 252 of FIG. 2, operation 355 of FIG. 3, and/or operation 1130 of FIG. 11.

In an embodiment, the client application 610 is a client-side web application and an iframe HTML element is attached to the DOM of its web page, that is pointed at the authentication endpoint web address (e.g., through the use of the src attribute), and that acts as a communication channel between the client application 610 and the authentication provider application 620. The challenge may be then sent using a postMessage interface to the iframe, and received through the onmessage event handler by the authentication provider application 620 that is loaded in the iframe.

In an embodiment, the client application 610 opens a new web browser window or utilizes a previously opened web browser window with the authentication provider application 620 loaded therein (e.g., a window with URL pointing at the authentication endpoint web address), and uses the URL parameters, a request body, or a cross-window communication mechanism to send the challenge to the authentication provider application 620.

Optionally Verify the Challenge and Separately Digitally Sign the Challenge and/or the Message Using a Private Key 654

At operation 654, the authentication provider application 620 may optionally verify the received challenge, extract the message from the challenge, optionally verify the message, and separately digitally sign the extracted message and/or the complete challenge using a private key in a manner similar to as described with reference to operation 357 of FIG. 3.

In an embodiment, when the client application 610 is a web application, the authentication provider application 620 is running inside an iframe HTML element inside the web page of client application 610, and may receive the message through the onmessage event.

In an embodiment, the authentication provider application 620 receives the challenge through the URL parameters, HTTP request body, or through a cross-window communication mechanism.

In an embodiment, the authentication provider application 620 verifies that the received challenge includes a token that has been previously used during authentication of the identity handle by the client application 610, and that the client application 610 has requested permission to digitally sign messages on the user's behalf during the user's authentication. For example, the challenge that was initially used during authentication as discussed with reference to FIG. 3 might have been a serialized object (e.g., using JSON, XML, or YAML format) that included a "rememberToken" attribute whose value was a cryptographically secure pseudo-random number and a "permissions" attribute whose value was a list of permissions required by the client application 610, which included the permission to digitally sign messages on the user's behalf. The authentication provider application 620 may have stored the value of the remember token (e.g., by storing it in memory or through the IndexedDB API) and it now may expect to receive the same value of the token when the client application 610 requests digital signing of a message. Due to this, the authentication provider application 620 may remember the user's choice regarding whether the client application 610 is trusted (e.g., may be used to digitally sign messages on the user's behalf) and ensure that the instance of the client application 610 requesting digital signing of the message is the same instance that was previously used when authenticating the user.

In an embodiment, the authentication provider application 620 also verifies some other properties of the received challenge. For example, the challenge may be a serialized object that includes fields denoting the source or expiry date of the challenge.

In an embodiment, the authentication provider application 620 also receives and verifies the digital signature of the challenge made by the client application 610 in a manner similar to as described with reference to the operation 357 of FIG. 3.

In an embodiment, the authentication provider application 620 extracts the original message that is to be signed from the challenge (e.g., by de-serializing the challenge and reading one of its attributes under which the message is stored).

In an embodiment, the authentication provider application 620 validates the extracted message (e.g., by checking that it conforms to a given format). For example, the extracted message may be a JSON serialized object, and the authentication provider application 620 may validate that the object has a "subject" field that matches the identity handle and an "application" field that matches the name or address of the client application 610 from which it was received.

In an embodiment, the authentication provider application 620 retrieves the private key from a client-side storage mechanism (e.g., IndexedDB) in which the private key was stored when the web browser was initially set up to authenticate the given identity handle as discussed with reference to FIG. 2, and separately digitally signs the challenge and the original message using an asymmetric cryptography algorithm (e.g., ECDSA), thereby producing two digital signatures (one for the challenge and one for the message).

In an embodiment, the message is the challenge, and the two aforementioned digital signatures are the same. In such case, only one digital signature may need to be sent back to the client application 610.

In an embodiment, when multiple keys were set up to be used by the authentication provider application 620 (e.g., for multi-factor or multi-party authentication), the authentication provider application 620 uses each of such keys to separately digitally sign the challenge and the message. For the sake of simplicity, such multiple digital signatures of the message may be collectively referred to simply as a signature of the message.

Send the Digitally Signed Challenge and/or the Digital Signature of the Message 655

At operation 655, the authentication provider application 620 may send the signed challenge and/or the digital signature of the message back to the client application 610, preferably over the same communication channel or method through which the challenge was received.

In an embodiment, the client application 610 is a client-side web application and an iframe was attached to the DOM of its web page that is pointed at the authentication endpoint web address (e.g., through the use of the src attribute). The authentication provider application 620 may then use a postMessage interface (e.g., through the window.parent.postMessage call) or any other suitable communication method (e.g., a MessageBride API) to send the digitally signed challenge and/or the digital signature of the message back to the client application 610, which can receive it using an onmessage handler or other suitable means.

In an embodiment, the digitally signed challenge and/or the digital signature of the message is included in a query or fragment component of a URL that points at the address of the client application 610 or at an address provided by the client application 610 as a part of the challenge. The authentication provider application 620 may then send to the browser a HTTP redirect response with the "Location" header pointing to such URL or redirect the web browser through other means (e.g., by using the window.location property, sending a web form, or following a link).

In an embodiment, the digitally signed challenge and/or the digital signature of the message is sent as a part of a network request (e.g., a POST request) that is sent to the client application 610 or to the network address provided by the client application 610 as a part of the challenge.

Verify the Digital Signature of the Digitally Signed Challenge and/or the Digital Signature of the Message 656

At operation 656, the client application 610 may receive the digitally signed challenge from the authentication provider application 620, and may verify that the received challenge is the same as the one that was previously sent (at operation 653) to the authentication provider application 620 or has been modified in an acceptable way, and that the digital signature of the challenge and/or the digital signature of the message cryptographically match with at least one of the public keys or one group of public keys associated with the identity handle that were obtained when the identity handle was used to authenticate to the client application 610, as previously described with reference to operation 354 of FIG. 3, or that are now obtained using a similar process.

In an embodiment, the client application 610 stores (e.g., in a list) the public keys that are associated with the identity handle and that were obtained during its authentication with the client application 610, as described with reference to operation 354 of FIG. 3, or obtains them again. The client application 610 may then verify that at least one of such keys cryptographically matches with the key that was used to digitally sign the challenge and the message (e.g., by using the window.crypto.subtle.verify function), and that the received challenge is either the same as the one that was sent or has been modified in an acceptable way. If the digital signature matches, the client application 610 may store or transfer the message and the received digital signature of the message to any third-party application 640.

Optionally Store the Message and its Digital Signature 657

At operation 657, the client application 610 may optionally store the message and its digital signature in a storage location that is accessible to the client application 610.

In an embodiment, the client application 610 is a web application that is running in the web browser on user's device, and stores such message through a client-side storage mechanism (e.g., IndexedDB API or localStorage interface).

In an embodiment, the client application 610 is a server-side web application, a desktop application, or a command line application, and stores the message and received signature in a local or remote database (e.g., MySQL or Firebase).

Optionally Send the Message and its Digital Signature to any Number of Third-Party Applications 658

At operation 658 the client application 610 may optionally send the message and its digital signature to any number of third-party applications 640, and each of the third-party applications 640 may be able to independently verify the authenticity of the digital signature, as being made on behalf of the user identified by the identity handle.

In an embodiment, the client application 610 sends the message and its digital signature to a third-party application 640 over a network connection.

In an embodiment, the client application 610 sends the message and its digital signature to a third-party application 640 over email or other one-way communication method.

Use the Identity Handle to Query for Associated Identity Records 659

At operation 659, the third-party application 640 may use the identity handle associated with the message to query the domain name system 630 for identity records to which a reference may be derived from such identity handle.

In an embodiment, the third-party application 640 receives information about the identity handle that was used to digitally sign the message as a part of the message or as part of communication from the client application 610 (e.g., inside URL parameters or request body).

In an embodiment, the third-party application 640 derives from the identity handle one or more references to identity records in the domain name system 630, in a similar manner as described for client applications with reference to operation 352 of FIG. 3 and/or operation 1120 of FIG. 11. For example, the third-party application 640 may replace the "@" sign of the identity handle with "._at_" text and use such transformed identity handle as a domain name for a TXT resource record lookup.

Receive the Identity Records and Obtain a List of Public Keys 660

At operation 660, the third-party application 640 may receive the identity records from the domain name system 630 and use the data included therein to obtain a list of public keys associated with the identity handle, in a similar manner as previously described for client applications with reference to operation 354 of FIG. 3.

In an embodiment, the values of identity records associated with the identity handle are scanned using a regular expression (e.g., "/key (.+)$") and a capture group is used to extract the value of base64-encoded public key of asymmetric cryptography algorithm (e.g., ECDSA).

Independently Verify that the Digital Signature of the Message Cryptographically Matches to at Least One Public Key 661

At operation 661, the third-party application 640 may independently verify the digital signature of the message by ensuring that it cryptographically matches to at least one of the obtained public keys, in a similar manner as previously described for client applications with reference to operation 359 of FIG. 3.

In an embodiment, the previously obtained list of public keys associated with the identity handle is searched for at least one entry that cryptographically matches the digital signature of the message (e.g., by using the window.crypto.subtle.verify function with the candidate public key, message, and the message's digital signature). When multiple digital signatures have been received for the message, the third-party application 640 may iterate over a list of public keys belonging to a group obtained from identity records in the domain name system 630, and perform the above method, ensuring that each of public keys in the group cryptographically matches to at least one of the digital signatures.

The third-party application 640 may receive the message and its digital signature from any source, which is not limited to client application(s) 610, and be able to independently derive a reference to identity records associated with the identity handle that was used to digitally sign the message and verify the authenticity and integrity of the message (e.g., that the message was digitally signed on behalf of the user identified by the identity handle and was not later modified) by verifying that the digital signature cryptographically matches at least one public key or a group of public keys (when multiple signatures are present) obtained from such identity records. This allows applications to exchange digitally signed messages with each other and other third parties, where each party is able to independently verify the authenticity and integrity of such messages, which is particularly useful in distributed applications.

Figure 7:
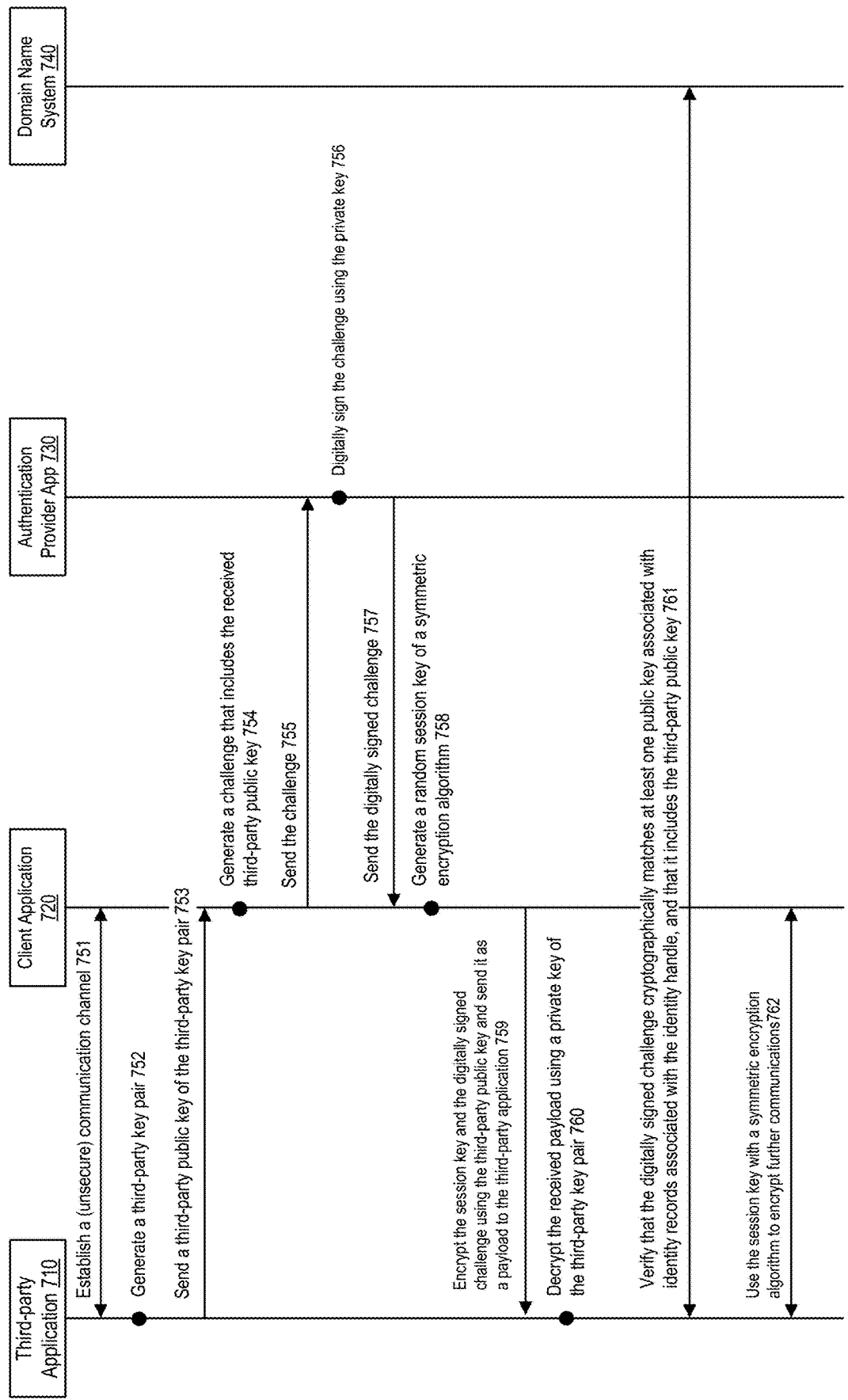
FIG. 7 is a diagram showing operations for establishing an end-to-end encrypted communications channel between a client application and a third-party application on behalf of the user, according to some embodiments.

FIG. 7 is a diagram showing operations for establishing an end-to-end encrypted communications channel between a client application and a third-party application on behalf of the user, according to some embodiments. Such end-to-end encrypted communication channel may be used to securely transfer messages and data between the client application 720 and a third-party application 710, offering protection against eavesdropping, alternation of messages and data while in transit, and man-in-the-middle attacks. For example, such method of establishing end-to-end encrypted communication channels may be useful in distributed applications in which peers need to be able to authenticate and communicate with each other in a secure manner.

For the sake of clarity, the diagram and its description focus on an embodiment in which authentication provider application 730 was initially set up to provide only one digital signature for each challenge (e.g., multi-factor authentication is not used), the digital signature is generated using a private key stored on the client-side in the web browser through which the authentication provider application 730 is accessed, and the client application 720 is a web application that is accessed/running in the same web browser on the same device as the authentication provider application 730. One of ordinary skill in the art, with the previously presented descriptions, will be able to implement appropriate functionality that allows multiple cryptographic keys to be required and used to confirm the identity handle on behalf of which the end-to-end encrypted channel is being established (e.g., as in multi-factor or multi-party authentication discussed above) and/or that allows the authentication provider application 730 to digitally sign challenges with keys that are not stored in the web browser and/or that allows the client application 720 and authentication provider application 730 to communicate across web browsers/devices without undue experimentation.

Establish an Unsecure Communication Channel 751

At operation 751, the third-party application 710 and client application may establish an unsecure communication channel with each other. The way in which the unsecure communication channel is established does not matter, as long as the client application 720 and the third-party application 710 are able to exchange messages and/or data over such communication channel.

In an embodiment, the client application 720 is a web application and connects to the third-party application 710 over a bi-directional websocket connection.

Generate a Third-Party Key Pair 752

At operation 752, the third-party application 710 may generate a third-party key pair of an asymmetric cryptography algorithm.

In an embodiment, a cryptographic key pair that can be used with Rivest-Shamir-Adleman (RSA) algorithm or other asymmetric encryption algorithm is generated by the third-party application 710 using any suitable means (e.g., through the use of a Web Crypto API or other cryptographic interfaces or libraries).

Send a Third-Party Public Key of the Third-Party Key Pair 753

At operation 753, the third-party application 710 may send to the client application 720 a third-party public key of the generated third-party key pair of the asymmetric cryptography algorithm over the unsecure communication channel.

In an embodiment, the public key of the previously generated third-party key pair is sent by the third-party application 710 to the client application 720 through a websocket connection.

Generate a Challenge that Includes the Received Third-Party Public Key 754

At operation 754, the client application 720 may generate a challenge that includes the received third-party public key, and that may include additional data such as a cryptographic nonce.

In an embodiment, the challenge is a an object serialized to a string (i.e. a sequence of bytes or characters) in a particular format (e.g., JSON, XML, or YAML format) that includes an attribute that contains the received third-party public key, a cryptographic nonce, and an attribute that contains the identity handle of the user that is authenticated with the client application 720, on behalf of which the end-to-end encrypted communications channel is being established. The challenge may also contain other fields or attributes that were previously described, for example with reference to operation 356 of FIG. 3.

In an embodiment, the third-party public key is used as a challenge.

Send the Challenge 755

At operation 755, the client application 720 may send the challenge to the authentication provider application 730 that is running in the user's web browser, through the authentication endpoint web address (e.g., "https://auth.domain.example") that was previously derived from the identity handle that is authenticated with the client application 720 (e.g., "john@domain.example"), as described with reference to operation 252 of FIG. 2, operation 355 of FIG. 3, and/or operation 1130 of FIG. 11.

In an embodiment, the client application 720 is a client-side web application that is loaded in a web browser on the user's device and an iframe is attached to the DOM of its web page, and is pointed at the authentication endpoint web address (e.g., through the use of the src attribute), and acts as a communication channel between the client application 720 and the authentication provider application 730. The challenge is then sent using a cross-window communication mechanism (e.g., a postMessage interface) to the iframe and received (e.g., through the onmessage event handler) by the authentication provider application 730 that is loaded in the iframe.

Digitally Sign the Challenge Using the Private Key 756

At operation 756, the authentication provider application 730 may digitally sign the received challenge using one or more private keys in a similar manner as described with reference to operation 357 of FIG. 3.

In an embodiment, the authentication provider application 730 uses a private key of an asymmetric cryptography algorithm that was stored on the client side (e.g., with an IndexedDB API) in the web browser installed on the user's device and is accessible to the authentication provider application 730 when accessed through the authentication endpoint web address, to digitally sign the received challenge (e.g., using ECDSA).

In an embodiment, any number of keys that are available to the authentication provider application 730 may be used to independently digitally sign the received challenge.

Send the Digitally Signed Challenge 757

At operation 757 the authentication provider application 730 may send the digitally signed challenge back to the client application 720, preferably over the same communication channel or method through which it was received.

In an embodiment, the digitally signed challenge is sent to the client application 720 using a postMessage interface.

Generate a Random Session Key of a Symmetric Encryption Algorithm 758

At operation 758, the client application 720 may generate a random session key of a symmetric encryption algorithm, which will be later be used to encrypt and decrypt messages transferred over the communication channel between the client application 720 and the third-party application 710.

In an embodiment, a random key that can be used with the Advanced Encryption Standard (AES) algorithm is generated as a session key (e.g., using the window.crypto.subtle.generateKey method).

Encrypt the Session Key and the Digitally Signed Challenge Using Third-Party Public Key and Send it as a Payload to the Third-Party Application 759

At operation 759, the client application 720 may encrypt the generated symmetric encryption session key and the digitally signed challenge using an asymmetric encryption algorithm with the third-party public key and send it to the third-party application 710, preferably over the same communication channel or method through which the third-party public key was received from the third-party application 710.

In an embodiment, the client application 720 uses the RSA algorithm to encrypt using the third-party public key a payload that is a JSON serialized object, which contains the digitally signed challenge and the session key.

In an embodiment, the encrypted payload is transferred from the client application 720 to the third-party application 710 using a websocket connection.

Decrypt the Received Payload Using a Private Key of the Third-Party Key Pair 760

At operation 760, the third-party application 710 may receive the encrypted payload and decrypt it using a third-party private key of the previously generated third-party key pair into the respective digitally signed challenge and the session key.

In an embodiment, the third-party application 710 uses an RSA algorithm together with the private key of the third-party key pair that it has initially generated to decrypt the received payload (e.g., using the window.crypto.subtle.decrypt method) and de-serializes it into an object (e.g., from JSON format) from which the digitally signed challenge and the session key may be obtained.

Verify that the Digitally Signed Challenge Cryptographically Matches at Least One Public Key Associated with Identity Records Associated with the Identity Handle, and that it Includes the Third-Party Public Key 761

At operation 761, the third-party application 710 may verify that the decrypted digitally signed challenge includes the public key of the initially generated third-party key pair (i.e., generated at operation 752), and that the digital signature of the challenge cryptographically matches to at least one public key or a group of public keys that may be obtained from the identity records published in a domain name system 740 to which a reference may be derived from the identity handle of the user on behalf of which the end-to-end encrypted communication channel is being established, in a manner similar to as described with reference to operations 352-354 and 359 of FIG. 3.

In an embodiment, the third-party application 710 de-serializes the digitally signed challenge into an object (e.g., from JSON, XML, or YAML format) and verifies that the resulting object contains an attribute that contains the initially generated third-party public key. A benefit of including the third-party public key in the challenge is that it may act as a nonce to prevent replay attacks. Also, the digital signature of such challenge (that includes the third-party public key) protects against man-in-the middle attacks and rouge clients.

In an embodiment, the third-party application 710 obtains an identity handle of the user on behalf of which the end-to-end encrypted communication channel is being established from the de-serialized digitally signed challenge, derives a reference to identity records in domain name system 740 based on the identity handle through the one of previously discussed methods (e.g., by replacing the "@" sign with "._at_" and using such transformed handle as a domain name for a TXT resource record lookup), and verifies that the public key obtained from at least one of such identity records cryptographically matches the digital signature of the received digitally signed challenge.

Use the Session Key with a Symmetric Encryption Algorithm to Encrypt Further Communications 762

If the verification succeeds, the third-party application 710 and the client application 720 may use a symmetric encryption algorithm (e.g., AES algorithm) with the session key to encrypt and decrypt messages that are being transferred through the communication channel, thus establishing an end-to-end encryption.

Once the end-to-end encrypted communication channel is established, the client application 720 and a third-party application 710 may use it to securely communicate with each other, even when the communication is performed over an unsecure medium or over a public relay server (e.g., a public websockets server).

Figure 8:
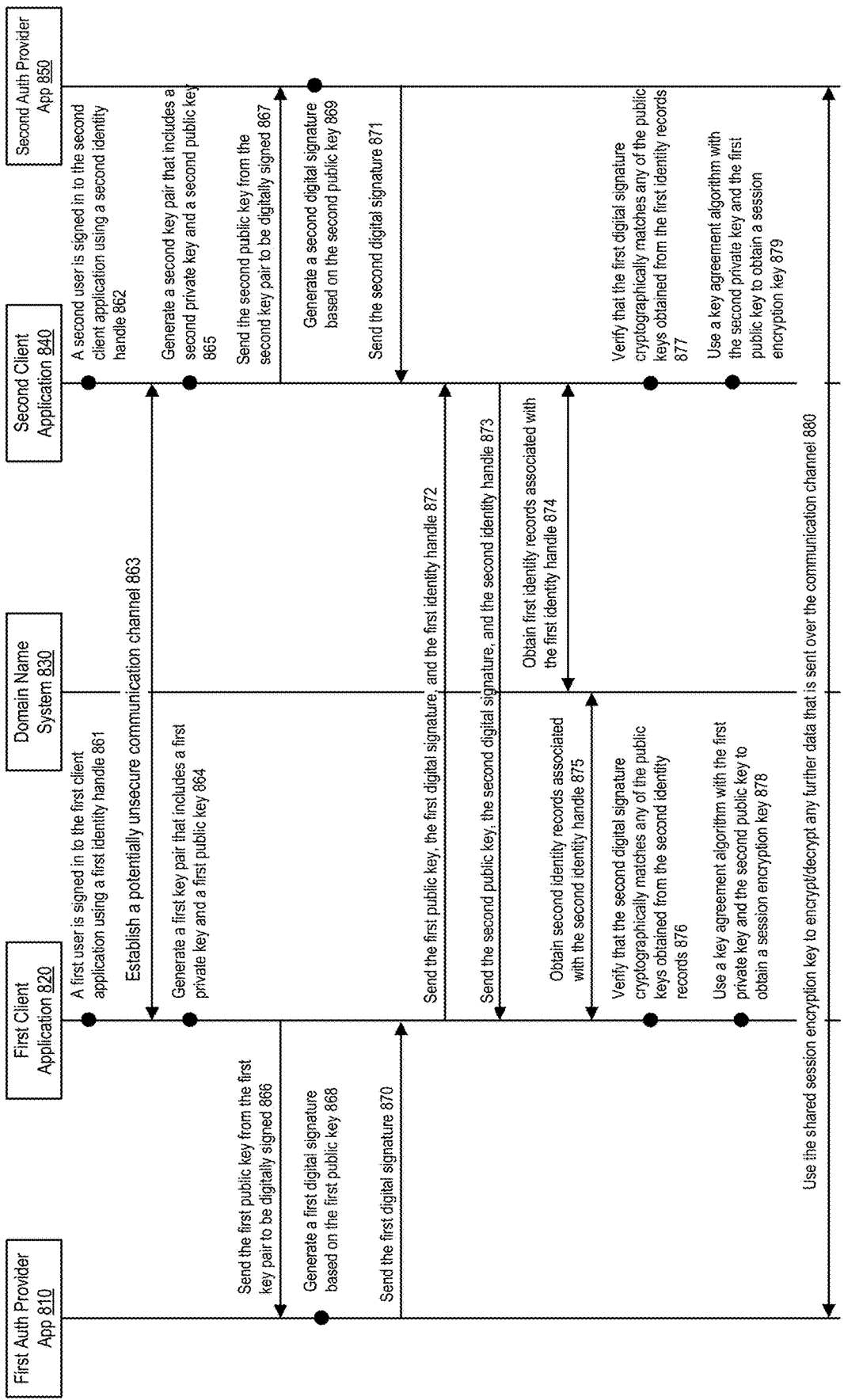
FIG. 8 is a diagram showing operations for allowing two client applications to use message signing flow together with a key agreement algorithm to cross-verify the identities of their users and establish an end-to-end encrypted communication over a potentially insecure communication channel between them, according to some embodiments.

FIG. 8 is a diagram showing operations for allowing two client applications to use message signing flow together with a key agreement algorithm to cross-verify the identities of their users and establish an end-to-end encrypted communication over a potentially insecure communication channel between them, according to some embodiments. Such end-to-end encrypted communication channel may then be used to securely transfer data between two client applications with the guarantees of secrecy, integrity, and authentication of the transferred data.

A First User is Signed-In to the First Client Application Using a First Identity Handle 861

At operation 861, it is assumed that a first user is signed in to the first client application 820 using a first identity handle or that the first client application 820 otherwise knows the first user's identity handle.

In an embodiment, the first user may sign in to the first client application 820 using the method described with reference to FIG. 3.

In an embodiment, the first client application 820 knows (e.g., stores or is able to obtain) the first identity handle and does not require the first user to sign in.

A Second User is Signed-In to the Second Client Application Using a Second Identity Handle 862

At operation 862, it is assumed that a second user is signed in to the second client application 840 using a second identity handle or that the second client application 840 otherwise knows the second user's identity handle.

In an embodiment, the second user may sign in to the second client application 840 using the method described with reference to FIG. 3.

In an embodiment, the second client application 840 knows (e.g., stores or is able to obtain) the second identity handle and does not require the second user to sign in.

Establish a Potentially Unsecure Communication Channel 863

At operation 863, the first client application 820 and the second client application 840 may establish a potentially unsecure communication channel. The way in which the communication channel is established does not matter, as long as both client applications are able to exchange messages and/or data over such channel. In an embodiment, the first client application 820 and the second client application 840 are client-side web applications that communicate using websockets protocol and a server that relays messages between them.

Generate a First Key Pair that Includes a First Private Key and a First Public Key 864

At operation 864, the first client application 820 may generate a first key pair that consists of a first private key and a first public key.

In an embodiment, the first client application 820 generates a first elliptic-curve public-private key pair that is suitable for the use with the ECDH key agreement algorithm.

In other embodiments, other types of public-private key pairs and key agreement algorithms may be used.

Generate a Second Key Pair that Includes a Second Private Key and a Second Public Key 865

At operation 865, the second client application 840 may generate a second key pair that consists of a second private key and a second public key.

In an embodiment, the second client application 830 generates a second elliptic-curve public-private key pair that is suitable for the use with the ECDH key agreement algorithm.

In other embodiments, other types of public-private key pairs and key agreement algorithms may be used.

Send a First Public Key from the First Key Pair to be Digitally Signed 866

At operation 866, the first client application 820 may send a first public key from the first key pair to the first authentication provider application 810 to be digitally signed on behalf of the first user as identified by the first identity handle. The first client application 820 may use a method similar to the method previously described with reference to FIG. 6 (message signing flow-particularly operation 651-655) to perform this operation by sending the first public key as a message to be digitally signed.

In an embodiment, the first client application 820 is a client-side web application and derives the authentication endpoint web address based on the first identity handle. The first client application 820 may then open a new web browser window pointing at the authentication endpoint web address (e.g., through window.open API or through an embedded iframe element) and establish a cross-window communication channel (e.g., through a postMessage interface or Channel Messaging API) with the first authentication provider application 810. The first client application 820 may then use such communication channel to pass the first public key as a message to be digitally signed.

Send a Second Public Key from the Second Key Pair to be Digitally Signed 867

At operation 867, the second client application 840 may send a second public key from the second key pair to the second authentication provider application 850 to be digitally signed on behalf of the second user as identified by the second identity handle. The second client application 840 may use a method similar to the method previously described with reference to FIG. 6 (message signing flow-particularly operations 651-655) to perform this operation by sending the second public key as a message to be digitally signed.

In an embodiment, the second client application 840 is a client-side web application and derives the authentication endpoint web address based on the second identity handle. The second client application 840 may then open a new web browser window pointing at the authentication endpoint web address (e.g., through window.open API or through an embedded iframe element) and establish a cross-window communication channel (e.g., through a postMessage interface or Channel Messaging API) with the second authentication provider application 850. The second client application 840 may then use such communication channel to pass the second public key as a message to be digitally signed.

Generate a First Digital Signature Based on the First Public Key 868

At operation 868, the first authentication provider application 810 may generate a first digital signature based on the received first public key. The first authentication provider application 810 may use a method previously described with reference to FIG. 6 (e.g., operation 654) to perform this operation.

In an embodiment, the first authentication provider application 810 uses a locally stored private key, for which a corresponding public key is published as a part of identity records for the first identity handle, and the received first public key with a digital signature algorithm (e.g., ECDSA) to obtain the first digital signature.

Generate a Second Digital Signature Based on the Second Public Key 869

At operation 869, the second authentication provider application 850 may generate a second digital signature based on the received second public key. The second authentication provider application 850 may use a method previously described with reference to FIG. 6 (e.g., operation 654) to perform this operation.

In an embodiment, the second authentication provider application 850 uses a locally stored private key, for which a corresponding public key is published as a part of identity records for the second identity handle, and the second first public key with a digital signature algorithm (e.g., ECDSA) to obtain the second digital signature.

Send the First Digital Signature 870

At operation 870, the first authentication provider application 810 may send and the first client application 820 may receive a first digital signature of the first public key, which is made on behalf of the first user as identified by the first identity handle.

The first authentication provider application 810 may use any method, including ones previously described with reference to FIG. 6 (e.g., operation 655) to perform this operation.

In an embodiment, the first authentication provider application 810 is loaded and executed inside a window of a web browser (e.g., a standalone window, a tab, or an iframe) and uses a cross-window communication channel (e.g., a postMessage interface or Channel Messaging API) to send the first digital signature to the first client application 820.

Send the Second Digital Signature 871

At operation 871, the second authentication provider application 850 may send and the second client application 840 may receive a second digital signature of the second public key, which is made on behalf of the second user as identified by the second identity handle.

The second authentication provider application 850 may use any method, including ones previously described with reference to FIG. 6 (e.g., operation 655) to perform this operation.

In an embodiment, the second authentication provider application 850 is loaded and executed inside a window of a web browser (e.g., a standalone window, a tab, or an iframe) and uses a cross-window communication channel (e.g., a postMessage interface or Channel Messaging API) to send the second digital signature to the second client application 840.

Send the First Public Key, the First Digital Signature, and the First Identity Handle 872

At operation 872, the first client application 820 may send the first public key, the first digital signature, and the first identity handle to the second client application 840 over the communication channel.

In an embodiment, the first client application 820 uses a websocket protocol to send the first public key, the first digital signature, and the first identity handle to the second client application 840.

In an embodiment, the first identity handle does not need to be sent as it may be inferred by the second client application 840.

Send the Second Public Key, the Second Digital Signature, and the Second Identity Handle 873

At operation 873, the second client application 840 may send the second public key, the second signature, and the second identity handle to the first client application 820 over the communication channel.

In an embodiment, the second client application 840 uses a websocket protocol to send the second public key, the second digital signature, and the second identity handle to the first client application 820.

In an embodiment, the second identity handle does not need to be sent as it may be inferred by the first client application 820.

Obtain First Identity Records Associated with the First Identity Handle 874

At operation 874, the second client application 840 may obtain first identity records of the received first identity handle and extract a first list of cryptographic keys from them. For this operation, a method similar to the ones described with reference to FIG. 3 (e.g., operations 352-354) may be used.

Obtain Second Identity Records Associated with the Second Identity Handle 875

At operation 875, the first client application 820 may obtain second identity records of the received second identity handle and extract a second list of cryptographic keys from them. For this operation, a method similar to the ones described with reference to FIG. 3 (e.g., operation 352-354) may be used.

Verify that the Second Digital Signature Cryptographically Match any of the Public Keys Obtained from the Second Identity Records 876

At operation 876, the first client application 820 may verify that the received second public key is included in a list of one or more public keys obtained from the second identity records and that the received second digital signature cryptographically matches the second public key. For this a method similar to the ones described with reference to FIG. 3 (e.g., operation 359) may be used.

Verify that the First Digital Signature Cryptographically Match any of the Public Keys Obtained from the First Identity Records 877

At operation 877, the second client application 840 may verify that the received first public key is included in a list of one or more public keys obtained from the first identity records and that the received first digital signature cryptographically matches the first public key. For this a method similar to the ones described with reference to FIG. 3 (e.g., operation 359) may be used.

Use a Key Agreement Algorithm with the First Private Key and the Second Public Key to Obtain a Session Encryption Key 878

At operation 878, if the signature verification is successful, the first client application 820 may use a key agreement algorithm (e.g., a ECDH algorithm) with the first private key and the obtained second public key to derive a symmetric session encryption key that can be used to encrypt and decrypt data transferred over the communication channel. In an embodiment, the first client application is a client-side web application and uses a function of Web Cryptography API to derive the symmetric session key from the first private key and the obtained second public key (e.g., through the use of the deriveKey method with EcdhKeyDeriveParams).

Use a Key Agreement Algorithm with the Second Private Key and the First Public Key to obtain a session encryption key 879

At operation 879, if the signature verification is successful, the second client application 840 may use a key agreement algorithm (e.g., a ECDH algorithm) with the second private key and the obtained first public key to derive a symmetric session encryption key that can be used to encrypt and decrypt data transferred over the communication channel. In an embodiment, the second client application is a client-side web application and uses a function of Web Cryptography API to derive the symmetric session key from the second private key and the obtained first public key (e.g., through the use of the deriveKey method with EcdhKeyDeriveParams).

Use the Shared Session Encryption Key to Encrypt/Decrypt any Further Data that is Sent Over the Communication Channel 880

At operation 880, both the first client application 820 and the second client application 840 may now share the same symmetric encryption key that can be used to encrypt and/or decrypt any further data that is transferred over the communication channel, providing end-to-end encryption with the guarantees of secrecy, integrity, and authentication of the transferred data. In an embodiment, both first and second client applications 820, 840 are client-side web applications and use the derived symmetric session key (e.g., AES key) to encrypt and/or decrypt further data that is transferred over the communication channel through the use of functions from the Web Cryptography API (e.g., the encrypt and/or decrypt methods).

A data storage scheme and operations are described herein for storing, for a group of users, encrypted data items that may be decrypted by client applications through the use of combined information accessible to the client applications and authentication provider applications on any of the group member's devices.

The data storage scheme and related operations described herein may be based on the following observations: (1) given two public-private key pairs, a first key pair consisting of a first public key and a first private key and a second key pair consisting of a second public key and a second private key, certain key agreement algorithms (e.g., an ECDH algorithm) may be independently used with either a combination of the first public key and the second private key or the first private key and the second public key to derive the same symmetric encryption key; (2) the first key pair may be generated by an application that is storing the data; (3) identity records may contain the second public key for a user as identified by identity handle, for which the cryptographically matching second private key is accessible to the authentication provider application when running in a web browser on the user's device; (4) the application that is storing the data may obtain the second public key from the identity records and use it with the first private key to derive a symmetric encryption key through a key agreement algorithm; (5) the application that is storing the data may use the derived symmetric encryption key to encrypt the data; (6) the application that is storing the data may subsequently remove/forget the first private key and the derived symmetric encryption key rendering it unable to decrypt the data or recover the data encryption key on its own, and store the first public key along with the encrypted data; and (7) the user as identified by identity handle may then use a client application to retrieve the encrypted data and the first public key, next the client application may communicate with the authentication provider application on the user's device, providing it with the first public key, and the authentication provider application may use the same key agreement algorithm with the first public key and the second private key to derive/recover the same symmetric encryption key and send it to the client application, enabling it to use the recovered symmetric encryption key to decrypt the encrypted data.

Figure 9:
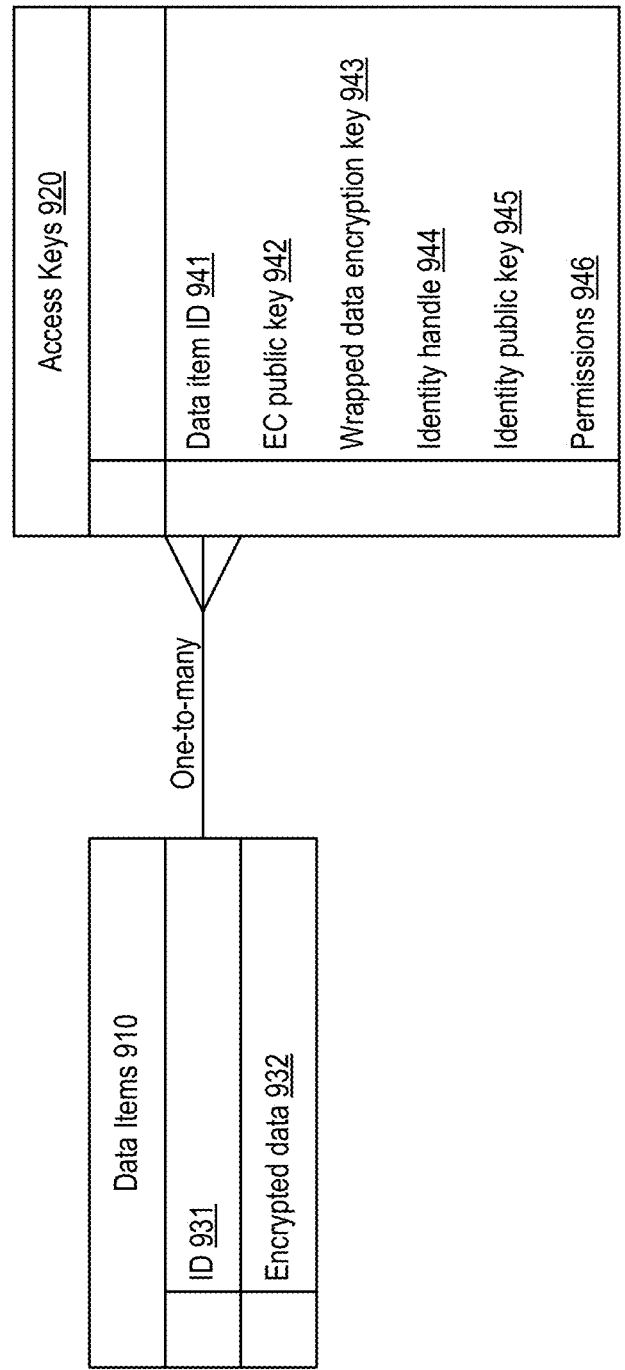
FIG. 9 is a diagram showing a possible data storage scheme that may be used to store, for a group of users, encrypted data that may be decrypted by a client application through the use of combined information stored as part of this data storage scheme and by an authentication provider application on any of the group member's devices, according to some embodiments.

FIG. 9 is a diagram showing a possible data storage scheme that may be used to store, for a group of users, encrypted data that may be decrypted by a client application through the use of combined information stored as part of this data storage scheme and by an authentication provider application on any of the group member's devices, according to some embodiments.

In an embodiment, the data storage scheme uses two main tables: a data items table 910 table and an access keys 920 table.

The data items table 910 may include an ID column 931 and an encrypted data column 932. The data items table 910 may hold rows with the actual data that is encrypted using a data-item-specific data encryption key. The data encryption key itself is not stored.

The access keys 920 table may include a data item id column 941, EC public key column 942, wrapped data encryption key column 943, identity handle column 944, identity public key column 945 and permissions column 946. The access keys 920 table may hold rows that contain a wrapped data-item-specific data encryption key for each identity public key associated with identity handles of users that should have access and ability to decrypt the actual data.

There may be a one-to-many relationship between the rows in the data items table 910 and the rows in the access keys table 920, as the values in the data item ID column 941 of the access keys table 920 may reference specific IDs 931 of data items stored in the data items table 910.

Each row of a table may represent a specific object or entity that is characterized by the data specified by the table's columns. Additional detail regarding the data that may be stored in the columns of these tables is now described. For sake of illustration, the data items and access keys are shown and described as being stored in database tables with columns and rows. One of ordinary skill in the art will appreciate that the data items and access keys can be stored using a different format/organization.
ID 931

The ID column 931 may contain a unique primary key of the specific data item. It will be appreciated by one of ordinary skill in art that any combination of data or attributes that yield unique values may be used as a primary key.

In an embodiment, a growing sequence of numbers is used as values of the ID column.
Encrypted Data 932

The encrypted data 932 column may contain data that is encrypted using a data encryption key. As will be further described herein, the data encryption key is stored in a wrapped form in the one or more rows of the access keys table 920 that references the specific data item, and the wrapped data encryption key may be decrypted with a key obtained using a key agreement algorithm (e.g., ECDH algorithm).

In an embodiment, the encrypted data 932 is encrypted using an AES (Advanced Encryption Standard) algorithm.
Data Item ID 941

For each row of the access keys table 920, the data item ID column 941 may contain a reference to the unique ID 931 of a specific data item that is associated with the specific row of the access keys 920 table.

In an embodiment, the data item ID column 941 stores a numeric value that is the same as a value stored in the ID column 931 of one of the rows of the data items table 910.
EC Public Key 942

The EC public key column 942 may contain a public key of an asymmetric cryptography algorithm. As will be further described herein, the EC public key may be used with a key agreement algorithm to obtain a key encrypting key, and the key encrypting key may be used to decrypt the wrapped encryption key. As will be further described herein, an application may generate an EC key pair, store the EC public key, and discard the cryptographically matching EC private key shortly after provisioning a new access key.

In an embodiment, the EC public key column 942 contains an elliptic-curve public key that can be used with an Elliptic-curve Diffie-Hellman (ECDH) algorithm, which may have been generated by the application when provisioning the access key for the specific identity handle and/or identity public key.
Wrapped Data Encryption Key 943

The wrapped data encryption key column 943 may contain the data-item-specific data encryption key that is encrypted using a key encryption key. The data encryption key may be used to decrypt the encrypted data of a referenced data item. As will be further described herein, the key encryption key may be obtained as a result of an authentication provider application using a key agreement algorithm with the EC public key 942 and an identity private key stored by the authentication provider application (or otherwise accessible to the authentication provider application).

In an embodiment, the wrapped data encryption key column 943 contains an AES encrypted data-item-specific data encryption key.
Identity Handle 944

The identity handle column 944 may contain the identity handle of user who through the use of a client application, authentication provider application, and information contained in the access key 920 should be able to access/decrypt the encrypted data 932, as will be further described herein (e.g., the identity handle may be "john@domain.example").
Identity Public Key 945

The optional identity public key column 945 may contain a copy of a public key as found in the identity records of the identity handle stored in the identity handle column 944. As will be further described herein, the identity public key may be used to generate a key encrypting key when a new access key is provisioned. As will be further described herein, a private key that cryptographically matches the identity public key may be available to the authentication provider application of a given identity handle. The authentication provider application may use the matching private key together with the EC public key as inputs to a key agreement algorithm (e.g., ECDH algorithm) to restore the key encrypting key. The key encrypting key may be used to decrypt the wrapped data encryption key. The value contained in the identity public key column 945 may be sent to the authentication provider application by the client application and act as a hint in selecting the appropriate private key for the performance of key agreement algorithm.
Permissions 946

The optional permissions column 946 may contain a list of permissions that a user as identified by the identity handle 944 and/or identity public key 945 has over the data item. Such column may be useful when the storage is done by a dedicated service or data store (e.g., a database as a service provider) that may be able to authenticate the user and that may allow or deny certain operations based on the value stored in the permissions column 946.

In an embodiment, the storage location is provided as a separate service to which client applications authenticate to using identity handles of their users (e.g., using the third-party authentication as previously described with reference to FIG. 5). The service may provide an API that can be used by client applications to perform operations on the stored data. Such storage service may not have access to or any visibility of the decrypted data or data encryption keys but may use the permissions column 946 to determine whether certain operations are allowed to be performed on the data by the authenticated client application. The permissions column 946 in such case may contain values such as "read" if the client application should be able to read the encrypted data and access keys related to the user's identity handle, "write" if the client application should be able to overwrite the encrypted data with a new value, and "manage" if the client application should be able to create, edit, or remove access keys related to the data item.

Figure 10:
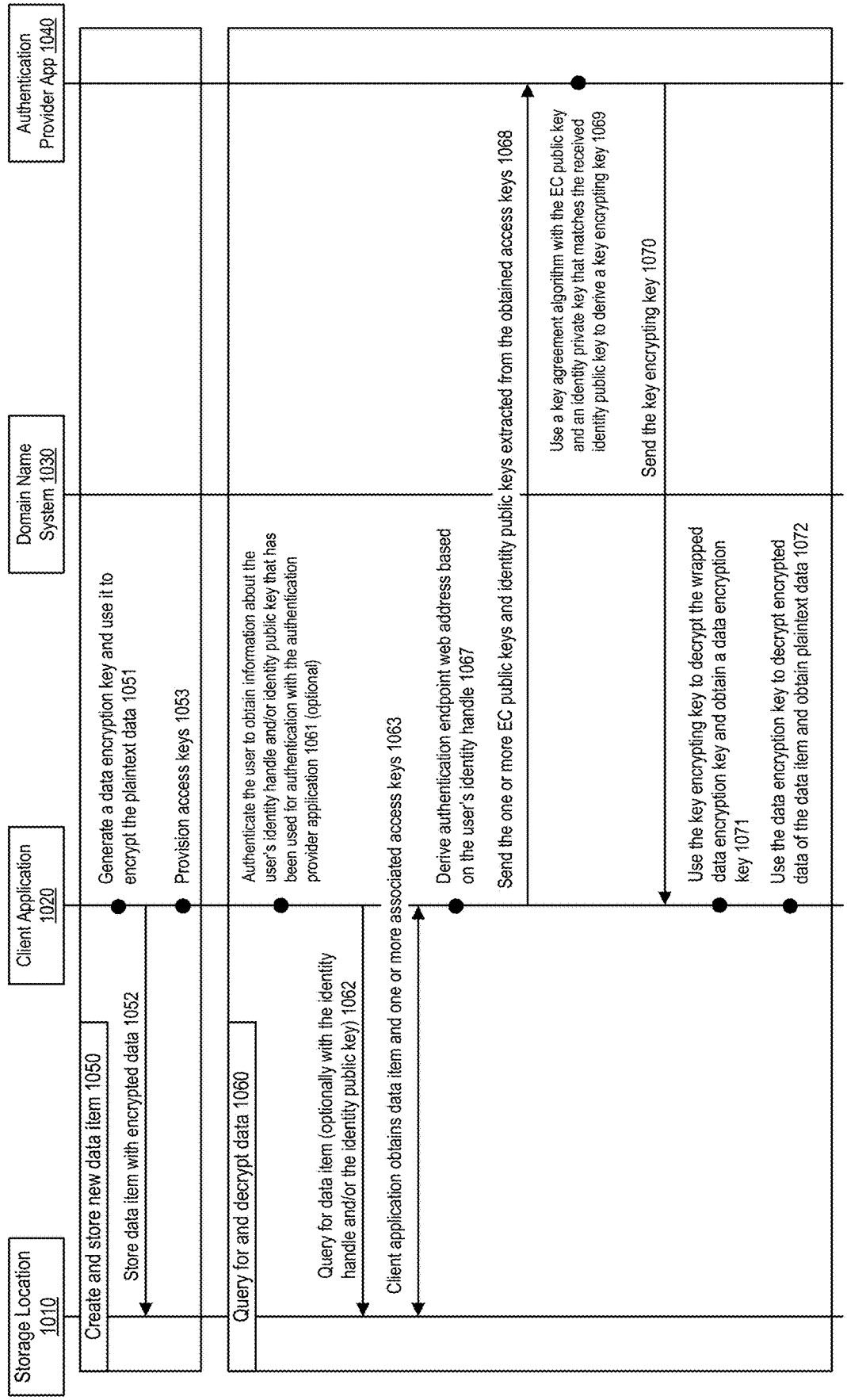
FIG. 10 is a diagram showing operations for an encrypted data storage scheme, according to some embodiments.

FIG. 10 is a diagram showing operations for an encrypted data storage scheme, according to some embodiments. The operations may be performed when a client application 1020 wishes to store encrypted data in a storage location 1010 in such a way that the use of combined information stored by the client application 1020 in the storage location 1010 and the information accessible to authentication provider applications 1040 running on devices of users who should be able to access the plaintext data allows the client application 1020 to decrypt the encrypted data to obtain plaintext data. For sake of simplicity and illustration, the operations 1050 (create and store new data item), 1060 (query for and decrypt data), 1080 (modify data item), 1090 (provision access keys), and 10A0 (revoke access keys) may be shown and described as being performed by a single client application 1020. One of ordinary skill in the art will appreciate that they may be performed independently by different client applications and/or on behalf of different users. Additionally, it will be appreciated by one skilled in art that operations 1050 (create and store new data item), 1080 (modify data item), 1090 (provision access keys), and 10A0 (revoke access keys) do not require interaction or communication with the authentication provider application 1040, and thus are not limited to client applications (as described elsewhere herein), and may be performed by any type of application (e.g., a third-party application, or any other computer application).

In an embodiment, the storage location 1010 is a database as a service (DBaaS) platform that offers storage of encrypted data without the DBaaS platform having the ability to decrypt or visibility into the respective plaintext data. The client application 1020 may be a client-side web application that is executed in a web browser on a user's device. The client application 1020 may store data in the storage location 1010 through the use of an API provided by the DBaaS platform, communicate with an authentication provider application 1040 in the same web browser through a cross-window communication interface, and query the domain name system 1030 through the DoH protocol.

In an embodiment, the storage location 1010 is a local or remote storage that is available to the client application 1020 through various APIs (e.g., filesystem API, database connector API, IndexedDB API) and the client application 1020 is any type of application as previously described (e.g., a command-line, desktop, or web application).

In an embodiment, the storage location 1010 and the client application 1020 use the data storage scheme as presented in the FIG. 9. In an embodiment, all of the data stored in the storage location is public, and yet through the use of the described scheme, client applications may be able to maintain confidentiality and integrity of such data.

Create and Store New Data Item 1050

Operation 1050 includes operations for creating and storing data items that contain encrypted data in the storage location 1010.

Generate a Data Encryption Key and Use it to Encrypt the Plaintext Data 1051

At operation 1051, the client application 1020 may generate a data encryption key and use it to encrypt plaintext data.

In an embodiment, the client application 1020 generates a new data encryption key that may be used with a symmetric encryption algorithm (e.g., DES, AES, etc.) and uses such encryption algorithm with the generated data encryption key to encrypt the plaintext data (e.g., the plain text data may be obtained from the user or any other source) to obtain encrypted data.

Store Data Item with Encrypted Data 1052

At operation 1052, the client application 1020 may store a data item with the encrypted data in the storage location 1010. The data item may contain the encrypted data and any number of values for non-encrypted fields (e.g., ID field, index fields, etc.).

In an embodiment, the client application 1020 uses an API provided by the storage location 1010 to store the data item.

Provision Access Keys 1053

At operation 1053, the client application 1020 may use the data encryption key with other operations that will be described further herein (e.g., operation 1090) to provision access keys for the stored data. Provisioning access keys may allow members of a specified group of users, as identified by their identity handles, to decrypt and access the stored data through the combined use of the client application with authentication provider application accessed through the authentication endpoint web address (derived from member's identity handle) using a web browser on the member's device.

In an embodiment, the client application 1020 is a client-side web application (e.g., a Progressive Web Application) and such provisioning of access keys allows other users, as specified by their identity handles, to have access to the data through the client applications installed on and/or running in the web browsers on their devices.

Query for and Decrypt Data 1060

Operation 1060 includes operations for querying and decrypting data stored in the storage location 1010 with the help of an authentication provider application 1040. Operation 1060 may be performed by a client application running on a device of a user that has the ability to access/decrypt a data item, which may be different from the client application that stored the data item and provisioned access keys for the data item.

Optionally Authenticate the User to Obtain Information about the User's Identity Handle and/or Identity Public Key that has been Used for Authentication with the Authentication Provider Application 1061

At operation 1061, the client application 1020 may optionally authenticate the user to obtain information about user's identity handle and/or identity public key that has been used with the authentication provider application 1040. Having knowledge of the identity handle and/or the identity public key may be useful to the client application 1020 as it may allow it to query the storage location for specific access keys that reference the identity handle and/or the identity public key. The identity handle and/or the identity public key may also be obtained from any other sources.

In an embodiment, the client application 1020 uses the challenge-response authentication method as described with reference to the FIG. 3 with the authentication provider application 1040 to authenticate the user's identity handle. Through this process, the client application 1020 may obtain an identity public key that cryptographically matches the signature generated by the authentication provider application 1040 during authentication. The cryptographically matching private key may be available to the authentication provider application 1040 on the user's device.

Query for the Data Item, Optionally with the Identity Handle and/or the Identity Public Key 1062

At operation 1062, the client application 1020 may query the storage location 1010 for one or more data items. The query may include information about the previously-obtained identity handle and/or identity public key.

In an embodiment, the client application 1020 uses an API provided by the storage location 1010 to send a query that includes a unique identifier of the data item being queried, together with information about the identity handle and/or identity public key.

Obtain Data Item and One or More Associated Access Keys 1063

At operation 1063, the client application 1020 may obtain the requested data item that includes encrypted data together with one or more associated access keys that each include a wrapped data encryption key and an EC public key.

In an embodiment, the processor at storage location 1010 finds and loads the required data item 910 and all associated access keys. It may then optionally check that an access key associated with the identity handle and/or identity public key provided by the client application 1020 exists and that the access key has a "read" permission in the permissions column 946. The processor at the storage location 1010 may then send the data item and one or more access keys that match to the identity handle and/or identity public key provided by the client application 1020 to the client application 1020. If no identity handle and no identity public key were passed to the processor at the storage location 1010, the processor at the storage location 1010 may send all access keys that are associated with the data item to the client application 1020.

In an embodiment, the storage location 1010 may be a public storage space that stores data items and access keys in one or more files that are publicly available to everyone on the network (e.g., which could even be the entire Internet), and the whole file, including the data items and access keys that are stored therein, is sent to the client application 1020.

Derive Authentication Endpoint Web Address Based on the User's Identity Handle 1067

At operation 1067, the client application 1020 may derive the authentication endpoint web address (i.e., the web address of the authentication provider application 1040) from the user's identity handle. The client application 1020 may use any of the methods described herein to derive the address of the authentication provider application based on the identity handle, in particular embodiments discussed with reference to operation 252 of FIG. 2, operation 355 of FIG. 3, and/or operation 1130 of FIG. 11.

In an embodiment, the user authenticates to the client application 1020 with an identity handle, or otherwise makes the identity handle available to the client application 1020, and the client application 1020 uses the domain name of the user's identity handle as the authentication endpoint web address (or derives the authentication endpoint web address from such domain name).

Send the One or More EC Public Keys and Identity Public Keys Extracted from the Obtained Access Keys 1068

At operation 1068, the client application 1020 extracts one or more EC public keys and identity public keys from the obtained access keys and sends them to the authentication provider application 1040 through the authentication endpoint web address.

In an embodiment, a list of pairs, each consisting of an EC public key and the accompanying identity public key, is extracted from the obtained access keys.

In an embodiment, the list is then serialized (e.g., to a JSON format), appended as a URL parameter to the web address of the authentication endpoint web address derived from the user's identity handle, and a new web browser window is opened to load such web address (e.g., a separate window, a new tab, or an iframe element).

In an embodiment, the list is sent through a cross-window communication channel to the authentication provider application 1040 using the obtained authentication endpoint web address. For example, an iframe element may be loaded that points at the authentication endpoint web address, and a postMessage API may be used with such iframe element to send the list to the authentication provider application 1040. In an embodiment, only the one or more EC public keys are extracted and sent without information about the identity public keys.

Use a Key Agreement Algorithm with the EC Public Key and an Identity Private Key that Matches the Received Identity Public Key to Derive a Key Encrypting Key 1069

At operation 1069, the authentication provider application 1040 running in a web browser on a user's device may use a key agreement algorithm with the EC public key and an identity private key that is accessible to the authentication provider application 1040 and that cryptographically matches the received identity public key to derive a key encrypting key of a symmetric encryption algorithm.

In an embodiment, the authentication provider application 1040 receives the one or more pairs of EC public key and identity public key from the client application 1020, and selects the pair for which it has access to an identity private key that cryptographically matches the received identity public key. Such key may have been generated and stored by the authentication provider application 1040 during a setup process as described in FIG. 2. The authentication provider application 1040 may then use a key agreement algorithm (e.g., ECDH algorithm) with the EC public key from the selected pair and the identity private key to derive (e.g., through the use of deriveKey method of Web Crypto API) a key encrypting key (e.g., which may be an Advanced Encryption Standard (AES) key). As will be described in further detail herein, the client application 1020 may then use the key encrypting key to decrypt a wrapped data encryption key. In an embodiment, only the one or more EC public keys are received without the information about the associated identity public keys, and the authentication provider application performs a key agreement algorithm with each of them to obtain a list of potential key encrypting keys.

In an alternative embodiment, the EC public key is not used, and the authentication provider application receives from the client application a wrapped data encryption key and uses an asymmetric cryptography algorithm to decrypt the wrapped data encryption key using one or more of identity private keys that are accessible to the authentication provider application to obtain the data encryption key.

Send the Key Encrypting Key 1070

At operation 1070, the authentication provider application 1040 may send the key encrypting key to the client application 1020.

In an embodiment, the authentication provider application 1040 uses the same communication channel and/or method that was previously used by the client application 1020 to communicate with the authentication provider application 1040 to send the derived key encrypting key to the client application. For example, a URL redirection or cross-window communication method may be used.

In an embodiment, the authentication provider application 1040 also sends additional information about which of the previously received EC public key and identity public key pairs was selected and used to derive the key encrypting key (e.g., by sending an index of such pair or the identity public key of such pair).

In an embodiment, the authentication provider application 1040 sends a list of potential key encrypting keys to the client application 1020.

In an alternative embodiment, the authentication provider application instead of the key encrypting key sends to the client application the previously obtained data encryption key.

Use the Key Encrypting Key to Decrypt the Wrapped Data Encryption Key and Obtain a Data Encryption Key 1071

At operation 1071, the client application 1020 may use the received key encrypting key to decrypt the wrapped data encryption key from the access key and obtain a data encryption key.

In an embodiment, the client application 1020 selects an access key from the previously obtained one or more access keys (e.g., using the additional information sent by the authentication provider application 1040). The client application 1020 may then use an AES algorithm or similar algorithm to decrypt the wrapped data encryption key of the selected access key using the key encrypting key received from the authentication provider application 1040 to obtain a data encryption key.

In an embodiment, the client application 1020 tries to use each of the received potential key encrypting keys to decrypt the wrapped data encryption key stored in one or more access keys. If decryption is successful, the client application 1020 may then use the decrypted value as a data encryption key.

In an alternative embodiment, the client application 1020 has already received the data encryption key from the authentication provider application 1040.

Use the Data Encryption Key to Decrypt Encrypted Data of the Data Item and Obtain Plaintext Data 1072

At operation 1072, the client application 1020 may use the data encryption key to decrypt the encrypted data of the previously obtained data item.

In an embodiment, the client application 1020 uses an AES algorithm or similar algorithm to decrypt the encrypted data 932 of the data item 910 (e.g., as previously described with reference to FIG. 9) (that was previously received from the storage location in operation 1063) using the data encryption key to obtain the plaintext data of the data item.

Modify Data Item 1080

Operation 1080 includes operations for modifying the data stored in a data item.

Obtain Data Item, its Plaintext Data, and Associated Data Encryption Key 1081

At operation 1081, the client application 1020 may obtain a data item, its plaintext data, and associated data encryption key.

In an embodiment, the client application 1020 uses the operations of operation 1050 to create a new data item or the operations of operation 1060 to query for an existing data item. Through the use of those operations, the client application 1020 may be able to obtain a reference to the data item, the plaintext data that is stored in the data item, and the data encryption key for the data item.

Update the Plaintext Data 1082

At operation 1082, the client application 1020 may update the plaintext data of the data item.

In an embodiment, the client application 1020 modifies the plaintext data in any way that is desired by the client application (e.g., by appending or replacing text).

Use the Data Encryption Key to Encrypt the Updated Plaintext Data 1083

At operation 1083, the client application 1020 may use the data encryption key to encrypt the updated plaintext data and thus obtain updated encrypted data.

In an embodiment, the client application 1020 uses an AES algorithm or similar algorithm to encrypt the plaintext data using the previously obtained data encryption key (e.g., through the use of an encrypt function of the Web Crypto API).

Store the Data Item with the Updated Encrypted Data 1084

At operation 1084, the client application 1020 may store the data item with the updated encrypted data in the storage location 1010.

In an embodiment, the client application 1020 uses an API provided by the storage location 1010 to store the updated encrypted data for the referenced data item.

Provision Access Keys 1090

Operation 1090 includes operations for provisioning and storing access keys 920. The access keys may allow a selected group of users, as identified by their identity handles, through the use of client applications to independently access and decrypt the (encrypted) data stored in a data item at the storage location 1010 through the combined use of the information stored in the respective access key for the given user and information stored by authentication provider application 1040 on the user's device.

Obtain Data Encryption Key and Identity Handles of Users Who should be Given the Ability to Access/Decrypt the Data Item 1091

At operation 1091, the client application 1020 obtains the identity handles of users who should be given the ability to access/decrypt the data item, and the data encryption key. The data encryption key may be obtained as described with reference to operations 1050 or 1060, or in any other way. As used herein, the ability to access/decrypt a data item or ability to access a decrypted form of a data item may refer to the ability to access the decrypted form of encrypted data stored in the data item.

In an embodiment, the client application 1020 uses the access keys associated with the data item, as received from the storage location 1010, to extract identity handles 944 from them and constructs a list of unique identity handles that should have access and ability to decrypt the data item. It may then present such list in a user interface, giving the user the ability to manage the list by adding new identity handles and/or removing existing identity handles.

In an embodiment, the data encryption key was previously generated and is known to the client application 1020, as described with reference to operation 1050 (Create and store new data item). In an embodiment, the data encryption key is obtained with the help of an authentication provider application 1040 performing a key agreement algorithm as described with reference to operation 1060 (Query for and decrypt data). In an alternative embodiment, the data encryption key is obtained by an authentication provider application 1040 by decrypting the wrapped key encryption key using asymmetric encryption algorithm, which is sent to the client application 1020, as also described with reference to operation 1060 (Query for and decrypt data).

Obtain a List of Identity Public Keys from Identity Records Associated with the Identity Handles 1092

At operation 1092, the client application 1020 may obtain a list of identity public keys from identity records of the identity handles. Some of the methods that may be used for obtaining identity public keys have been previously described and thus are not described here again for sake of brevity.

In an embodiment, the client application 1020 iterates over the list of unique identity handles that should have an ability to access/decrypt the data, and for each identity handle the client application 1020 performs the following: derives a reference to its identity records; uses the reference to query the domain name system and obtain identity records associated with the identity handle; and extract the public keys from the received identity records. For example, given a list of identity handles (e.g., "john@domain.example" and "jane@domain.example"), the client application 1020 may replace the "@" symbol with "._at_." text in the identity handles to obtain references to domains that hold identity records (e.g., "john._at_domain.example" and "jane._at.domain.example"), and query the domain name system for TXT records of such domains. The client application 1020 may then process the DNS response to filter for records that are supposed to contain identity public keys (e.g., TXT records with a value starting with "key") and extract the cryptographic key material from them (e.g., by extracting the text after the "key" prefix and base64url decoding it into raw key data).

Operations to Perform for Each Identity Public Key 1093

Operation 1093 includes operations that are to be performed for each identity public key to create a corresponding access key. The access key may allow an authentication provider application 1040 that has access to an identity private key that cryptographically matches an identity public key to derive the key encrypting key that is needed to decrypt the wrapped data encryption key and access the plaintext data.

Optionally Verify that an Access Key for the Data Item with the Identity Public Key does not Already Exist 1094

At operation 1094, the client application 1020 may optionally verify that an access key for data item with the identity public key of the current iteration does not already exist. If the access key already exists, the client application 1020 may decide to skip to the next iteration of the loop 1093.

In an embodiment, the client application 1020 communicates with the storage location 1010 using an API provided by the storage location 1010, to query for the existence of an access key that references the data item and has the given identity public key.

In an embodiment, the client application 1020 has already received information regarding all existing access keys for the data item, and thus may perform the check locally.

Generate a New EC Key Pair that Includes an EC Private Key and an EC Public Key 1095

At operation 1095, the client application 1020 may generate a new EC key pair that consists of an EC private key and a cryptographically matching EC public key.

In an embodiment, the client application 1020 uses a key generation algorithm to generate a new elliptic curve key pair that may be later used with an ECDH algorithm (e.g., by using the generateKey method of Web Crypto API with a EcKeyGenParams object as a parameter).

In an alternative embodiment, the client application 1020 does not need to generate a new EC key pair, and may use the identity public key as a key encrypting key.

Use a Key Agreement Algorithm with the EC Private Key and the Identity Public Key to Obtain a Key Encrypting Key 1096

At operation 1096, the client application 1020 may use a key agreement algorithm with the EC private key and the identity public key to obtain a key encrypting key.

In an embodiment, the client application 1020 uses a key derivation function based on the Diffie-Hellman algorithm with the private key of the generated EC key pair and the identity public key of the current iteration to obtain a key encrypting key that may be used with a symmetric encryption algorithm (e.g., the AES algorithm through the use of the deriveKey method of the Web Crypto API with the EcdhKeyDeriveParams and AesKeyGenParams objects passed as arguments).

In an alternative embodiment, the client application 1020 uses the identity public key as a key encrypting key that may be used with an asymmetric encryption algorithm (e.g., RSA).

In yet another embodiment, the client application 1020 sends the identity public key (of the user for whom the access key is provisioned (i.e., the user who is being given the ability to access/decrypt the data item)) to an authentication provider application (of the user who is provisioning the access key) using the authentication endpoint web address that is derived from the identity handle of the user who is provisioning the access key, and the authentication provider application is to perform a key agreement algorithm with the identity public key (of the user for whom the access key is provisioned) and an identity private key (of the user who is provisioning the key) to obtain the data encryption key. In such case, an identity public key (of the user who is provisioning the key) that is cryptographically matching to the used identity private key may be stored as a part of the access key and used in place of the EC public key by client applications (e.g., when performing operation 1060). A benefit of such embodiment is that the identity of the user who provisioned the access key (as identified by the user's identity handle) may be later verified by client applications (of the user(s) for whom the access key was provisioned) by querying the DNS and ensuring that the identity public key (of the user who provisioned the access key) stored as a part of the access key is present in the identity records (associated with the identity handle of the user who provisioned the access key).

Encrypt the Data Encryption Key with the Key Encrypting Key to Obtain a Wrapped Data Encryption Key 1097

At operation 1097, the client application 1020 may encrypt the data encryption key with the key encrypting key to obtain a wrapped data encryption key.

In an embodiment, the client application 1020 uses a symmetric algorithm (e.g., an AES algorithm or similar algorithm) to encrypt the data encryption key for the data item using the derived key encryption key to obtain a wrapped data encryption key.

In an alternative embodiment, the client application 1020 uses an asymmetric algorithm (e.g., RSA) to encrypt the data encryption key for the data item using the key encryption key to obtain a wrapped data encryption key.

Store the Wrapped Data Encryption Key, the EC Public Key, and an Optional Reference to the Identity Public Key and/or Identity Handle as a New Access Key that References the Data Item 1098

At operation 1098, the client application 1020 may store, in the storage location 1010, the wrapped data encryption key, the generated EC public key, and an optional reference to the identity public key and/or identity handle as a new access key that references the data item. Such access key may be later used by client applications and respective authentication provider applications of users who should be able to access the plaintext data to decrypt the encrypted data through operations such as the operation 1060 (query for and decrypt data).

In an embodiment, the client application 1020 builds a new data structure that consists of the wrapped data encryption key, the generated EC public key, the identity handle, and the identity public key from the current loop iteration. The client application 1020 may then pass such data structure through the API provided by the storage location 1010 to be stored in the storage location 1010.

Revoke Access Keys 10A0

Operation 10A0 includes operations for revoking access keys.

Obtain Identity Handles of Users Who should No Longer have an Ability to Access/Decrypt the Data Item 10A1

At operation 10A1, the client application 1020 may obtain the identity handles of users that should no longer have an ability to access/decrypt the data item.

In an embodiment, such list may be constructed by the client application 1020 based on interactions with the user through the user interface.

For Each Identity Handle and/or Associated Identity Public Keys, Remove the Associated Access Keys of the Data Item 10A2

At operation 10A2, for each identity handle and/or associated identity public keys, the client application 1020 may remove the associated access key of the data item from the storage location 1010.

In an embodiment, the client application 1020 uses an API provided by the storage location 1010 to remove any access keys 920 that reference the data item and match the identity handle and/or the identity public key, including the wrapped data encryption key 943 and EC public key 942 included in the access key.

In an embodiment, once the access key is removed from the storage location 1010, the client application 1020 may perform operations to generate a new data encryption key, re-encrypt the plaintext data of the data item using the new data encryption key, and re-generate access keys (e.g., using the operations of operation 1090). Such operations may prevent potentially rouge users and client applications that may have stored the unencrypted copy of the access key from being able to decrypt the data after their access keys have been revoked.

FIG. 11 is a diagram showing an example algorithm for deriving a reference to identity records in the domain name system and an authentication endpoint web address from an identity handle, according to some embodiments. Any of the embodiments described with reference to operation 252 of FIG. 2, operation 258 of FIG. 2, operation 352 of FIG. 3, and/or operation 355 of FIG. 3 may also be used to implement such algorithm.

In an embodiment, the algorithm is performed by a client application, authentication provider application, and/or third-party application, and is used whenever such application needs to derive a reference to identity records and/or an authentication endpoint web address. In an embodiment, the algorithm is performed directly by a user to manually obtain the reference to identity records and/or the authentication endpoint web address.

As shown in the diagram, at operation 1110, the algorithm may receive an identity handle. The identity handle may be a string (a sequence of characters). The algorithm may receive the identity handle from the user (based on user input) or from the code of the application of which it is a part of (e.g., the identity handle may be hardcoded, derived in some way, etc.).

At operation 1120, the algorithm may derive a reference to identity records in the domain name system based on the received identity handle. For example, the algorithm may do this by performing operations 1121 and 1122. At operation 1121, the algorithm replaces the "@" character in the identity handle with "._at_" text to obtain a modified identity handle. At operation 1122, the algorithm may use the modified identity handle as a domain name to obtain a reference to DNS TXT records of such domain name, thus obtaining a reference to identity records associated with the identity handle. The applications and/or user may use such reference to query the domain name system and obtain the values of referenced TXT records, which are expected to hold information related to the identity handle (e.g., the public keys that may be used to verify signatures as previously discussed, the user's name, the user's initials, or a reference to the user's avatar picture).

At operation 1130 the algorithm may derive an authentication endpoint web address based on the identity handle. For example, the algorithm may do this by performing operations 1131 and 1132. At operation 1131, the algorithm extracts the part of the text appearing after the "@" character in the identity handle (e.g., "domain.example").

At operation 1132, the algorithm uses the extracted text as a domain name, queries the domain name system for TXT resource records of such domain name, and extracts the web address of authentication endpoint from one of the values of TxT resource records using a regular expression with a capture group (e.g., a capture group of regular expression/ ^auth (.+)$/may be used with a TXT resource record like "domain.example IN TXT 'auth https://auth.domain.example/'" to extract the web address of authentication endpoint "https://auth.domain.example/"). Client applications and/or the user may use such authentication endpoint web address to access authentication provider application through the web browsers installed on the user's devices.

The above-described implementation of the algorithm may provide multiple benefits, some of which are described in additional detail herein below.

A benefit of the implementation is that it offers protection from enumeration of identity records. An identity handle of the user needs to be known as it forms a part of the domain name, which prevents attackers from listing all identity records of all users that are associated with a particular top-level domain name (e.g., "domain.example"), allows for storing identity records for a virtually unlimited number of users under a single top-level domain, and limits the size of responses received from the domain name system, which may be helpful in limiting the scope of DNS amplification attacks.

A benefit of the implementation is that it uses a namespace (e.g., the "._at_." part of the domain name) that allows for easily identifying and distinguishing domain names that are used to hold identity records.

A benefit of the implementation is that it uses an underscore in a subdomain name (e.g., in the "._at_." part) which is an allowed character for domain names but is not allowed for hostnames. This means that web browsers are not able to directly access URLs that include such sub-domain name, and as such, there is a little chance of collision between domain names of existing resource records (e.g., address records of web servers) and the domain names of identity records.

A benefit of the implementation is that an algorithm that replaces the "@" character in the identity handle with "._at_." text or extracts the part of identity handle after "@" character and uses it as a hostname is easy to remember and thus can be manually performed by end-users when needed.

A benefit of the implementation is that the web address of the authentication endpoint is decoupled from the domain name of identity handle, and may be set by the domain name administrator to any web address under which authentication provider application is available. This may allow organizations to setup a dedicated subdomain/hostname (e.g., "auth.domain.example" for identity handles ending with "@domain.example"), or use an external provider (e.g., an external SaaS provider), for the authentication provider application.

Figure 12:
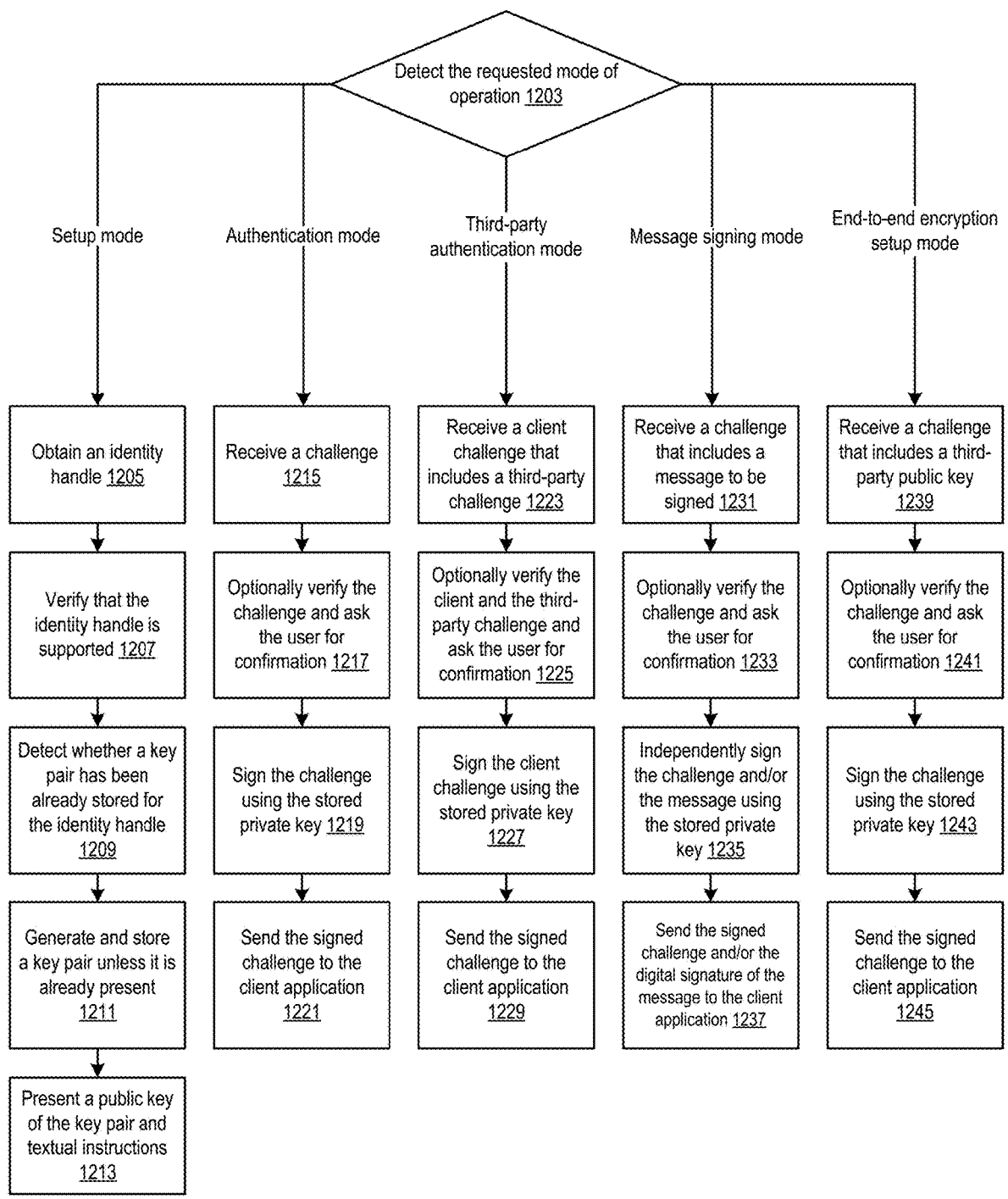
FIG. 12 is a diagram showing an overview of some of the operations performed by an authentication provider application that is executed in the user's web browser under an authentication endpoint web address, according to some embodiments.

FIG. 12 is a diagram showing an overview of some of the operations performed by an authentication provider application that is executed in the user's web browser under an authentication endpoint web address, according to some embodiments. The diagram is provided to provide a high-level overview of how the system works from the perspective of the authentication provider application, and thus may not include some of the operations, steps, or embodiments described with reference to other figures. For the sake of clarity, the diagram and the associated description focus on an embodiment in which the authentication provider application was initially set up to provide one digital signature for each challenge (e.g., multi-factor authentication is not used), the digital signature is generated using a private key stored on the client-side in the web browser through which the authentication provider application is accessed, and the client application is a web application that is accessed/running in the same web browser on the same device as the authentication provider application.

1. Detect the Requested Mode of Operation

At operation 1203, the authentication provider application may detect whether a setup, authentication of a user to a client application, authentication on behalf of a user of the client application to a third-party application, message signing, or assistance in the establishment of an end-to-end encrypted communication channel is to be performed.

In an embodiment, the type of the requested operation is included as a part of the challenge received by the authentication provider application.

In an embodiment, the type of operation is passed as a parameter (e.g., inside the URL or through the request body) or is automatically determined by the authentication provider application based on the received challenge and/or parameters.

2. When Operating in Setup Mode

When the requested mode of operation is the setup mode, the authentication provider application may attempt to set up the current web browser on a user's device (i.e., the web browser in which the authentication provider application code is currently executing) so that it may be used to authenticate a user-provided identity handle to client applications and/or third-party applications.

At operation 1205, the authentication provider application may obtain the identity handle that is being set up.

In an embodiment, a dialog box is presented in the user interface of the authentication provider application (e.g., through the window.prompt function) that allows the user to provide the identity handle.

In an embodiment, the identity handle is received as a parameter (e.g., inside the URL or through the request body).

At operation 1207, the authentication provider application may verify that the authentication endpoint web address derived from the user-provided identity handle matches the current web address under which the authentication provider application is executing in the web browser, to ensure that the web address under which the authentication provider application has been loaded in the web browser is the correct web address for the user-provided identity handle.

In an embodiment, the authentication provider application derives the authentication endpoint web address from the identity handle by using the part of the identity handle after the "@" character, as described elsewhere herein. The authentication endpoint web address may be derived from identity handle by any other previously described means.

In an embodiment, the authentication provider application verifies that the authentication endpoint web address has the same origin (e.g., a combination of a protocol, hostname, and port) as the currently executing code (e.g., by verifying that "window.location.origin" is the same as the origin of the authentication endpoint web address derived from the user-provided identity handle). If the verification fails, the authentication provider application may present an error screen together with the correct authentication endpoint web address to use for the user-provided identity handle.

At operation 1209, the authentication provider application may check whether a key pair of an asymmetric cryptography algorithm has been already generated and stored by the authentication provider application executing under the authentication endpoint web address.

In an embodiment, the authentication provider application accesses a client-side storage (e.g., an IndexedDB or localStorage) and uses the identity handle as a lookup key (e.g., through the following pseudo-code: "window.localStorage.get(identityHandle)") to check whether a private key has already been stored for such identity handle.

At operation 1211, if a private key for the identity handle has not been stored in such storage location, the authentication provider application may generate a new key pair of an asymmetric cryptography algorithm and store the private key of such key pair in a storage location that is accessible to the authentication provider application.

In an embodiment, the key pair of the asymmetric cryptography algorithm (e.g., Elliptic Curve Digital Signature Algorithm (ECDSA)) are generated by the authentication provider application (e.g., using a custom JavaScript function or the web browser's build-in Web Crypto API), with the private key being marked as non-extractable where possible (e.g., by setting the "extractable" argument of 'window.crypto.subtle.generateKey' function to "false").

In an embodiment, the generated key pair is stored within the web browser through a client-side storage mechanism (e.g., an IndexedDB API, or localStorage interface), preferentially in a way in which it is associated with the identity handle (e.g., by using the identity handle as a lookup key).

In an embodiment, the private key is additionally encrypted, and may be sent to an external service, as previously described.

At operation 1213, the authentication provider application may present a public key of the generated key pair to the user and/or may send it to some other application, with the expectation that the public key or a reference thereto will be published inside an identity record associated with the user-provided identity handle.

In an embodiment, the public key is base64 encoded and presented to the user together with textual instructions on how to publish it in an identity record in the domain name system, which will enable the public key to be used for the purpose of authenticating the identity handle using the current web browser. For example, for the identity handle of "john@domain.example," the authentication endpoint web address under which the current authentication provider application is accessed by the user in the web browser may be "https://domain.example/" and the instruction may read as follows: "Please publish a TXT record under the john._at_domain.example domain name with the value of 'key BFUHfngwsKRZZN8gxzIIy4DLFaZbsZrk4R3CrnEpBq-hWrdQi8o5VsMAftZ3DscXIpK3V+F8 x7qQV+PaJPz8y-UUI='".

In an embodiment, the public key is sent to an external service to be automatically published, as previously described.

3. When Operating in Authentication Mode

When the requested mode of operation is the authentication mode, the authentication provider application may attempt to authenticate the user as identified by the identity handle to the client application. The authentication provider application may do this by proving to the client application that it can use a private key for which a cryptographically matching public key has been published in an identity record in the domain name system that is associated with the identity handle.

At operation 1215, the authentication provider application may receive a challenge from the client application.

In an embodiment, the challenge is received as a parameter in the URL, through the request body, or through a cross-window communication interface (e.g., postMessage interface).

At operation 1217, the authentication provider application may verify the challenge meets some implementation-specific criteria and ask the user for confirmation that the user wishes to authenticate to the client application.

In an embodiment, the challenge is de-serialized into an object (e.g., from JSON, XML, or YAML format), and the authentication provider application may verify various fields of such object (e.g., that the "sub" field of such object matches at least one identity handle for which a private key is accessible to the authentication provider application, that the time value in the "expires" field has not yet passed, that the "issuer" field matches the origin of the request (e.g., as obtained from the window.referrer), etc.).

In an embodiment, the authentication provider application obtains information about the client application (e.g., through window.opener, window.parent, and/or document.referrer or from the data received as a part of the challenge), and may present it to the user for verification. The user may then accept or reject the authentication request. If the user rejects the authentication request, the authentication process is terminated.

In an embodiment, the authentication provider application also obtains a remember token as a part of the challenge, as previously described. If such remember token value matches a remember token value that was previously used by the client application during authentication and the authentication request was then approved by the user, an authentication request may not be presented to the user (e.g., the user's previous choice may be remembered and automatically applied).

At operation 1219, the authentication provider application may retrieve a private key or reference thereto from the storage location that is accessible to the authentication provider application and use the private key to cryptographically sign the received challenge.

In an embodiment, a reference to the private key is retrieved from a client-side storage location (e.g., IndexedDB).

In an embodiment, an asymmetric cryptography algorithm (e.g., ECDSA) is used to sign the challenge using the retrieved private key.

At operation 1221, the authentication provider application may respond to the client application by sending the signed challenge to the client application. The signed challenge may be sent over the same communication channel or method that was used by client application to send the challenge to the authentication provider application.

4. When Operating in the Third-Party Authentication Mode

When the requested mode of operation is the third-party authentication mode, the authentication provider application may allow the client application to authenticate to a third-party application on behalf of the user, as identified by identity handle.

At operation 1223, the authentication provider application may receive a client challenge that includes a third-party challenge.

At operation 1225, the authentication provider application may optionally verify the challenge and the third-party challenge, and ask the user for confirmation.

At operation 1227, the authentication provider application may sign the client challenge using the stored private key (assuming that the user confirms the authentication request).

At operation 1229, the authentication provider application may send the signed client challenge to the client application.

5. When Operating in the Message Signing Mode

When the requested mode of operation is the message signing mode, the authentication provider application may provide digital signatures for messages supplied by the client application, on behalf of the authenticated user identified by identity handle. Such messages and their digital signatures may then be used or transferred by the client application to third-party applications, and any of the third-party applications may be able to independently verify that the message was indeed signed on behalf of the user as identified by the identity handle.

At operation 1231, the authentication provider application may receive a challenge that includes a message to be signed.

At operation 1233, the authentication provider application may optionally verify the challenge and ask the user for confirmation.

At operation 1235, the authentication provider application may independently sign the challenge and/or the message using the stored private key.

At operation 1237, the authentication provider application may send the signed challenge and/or the digital signature of the message back to the client application.

6. When Assisting in Establishing of End-to-End Encrypted Communication Channel

When the requested mode of operation is the assistance in the establishment of an end-to-end encryption, the authentication provider application may aid the client application in establishing an end-to-end encrypted communication channel with a third-party application by proving the identity of the user (as identified by an identity handle) on behalf of which the end-to-end encrypted communication channel is being setup to the third-party application, thus allowing the third-party to make sure that it is communicating with the intended recipient.

At operation 1239, the authentication provider application may receive a challenge that includes a third-party public key.

At operation 1241, the authentication provider application may optionally verify the challenge and ask the user for confirmation.

At operation 1243, the authentication provider application may sign the challenge using the stored private key.

At operation 1245, the authentication provider application may send the signed challenge to the client application.

FIG. 13 is a diagram showing a user interface of an authentication provider application operating in the setup mode when accessed under the authentication endpoint web address through a web browser on a user's device, according to some embodiments.

As shown in the diagram, the authentication provider application 1303 may receive the value of the identity handle 1305 from the user and may proceed to generate a key pair of an asymmetric cryptography algorithm, store a public key of the key pair, and present it in the user interface together with textual instructions 1306 on how to publish an identity record in the domain name system that would contain information about the public key. These operations may allow the authentication provider application 1303, which is accessed through the authentication endpoint web address 1304 in a web browser 1302 on the user's device 1301, to further authorize the user to client applications.

Figure 14:
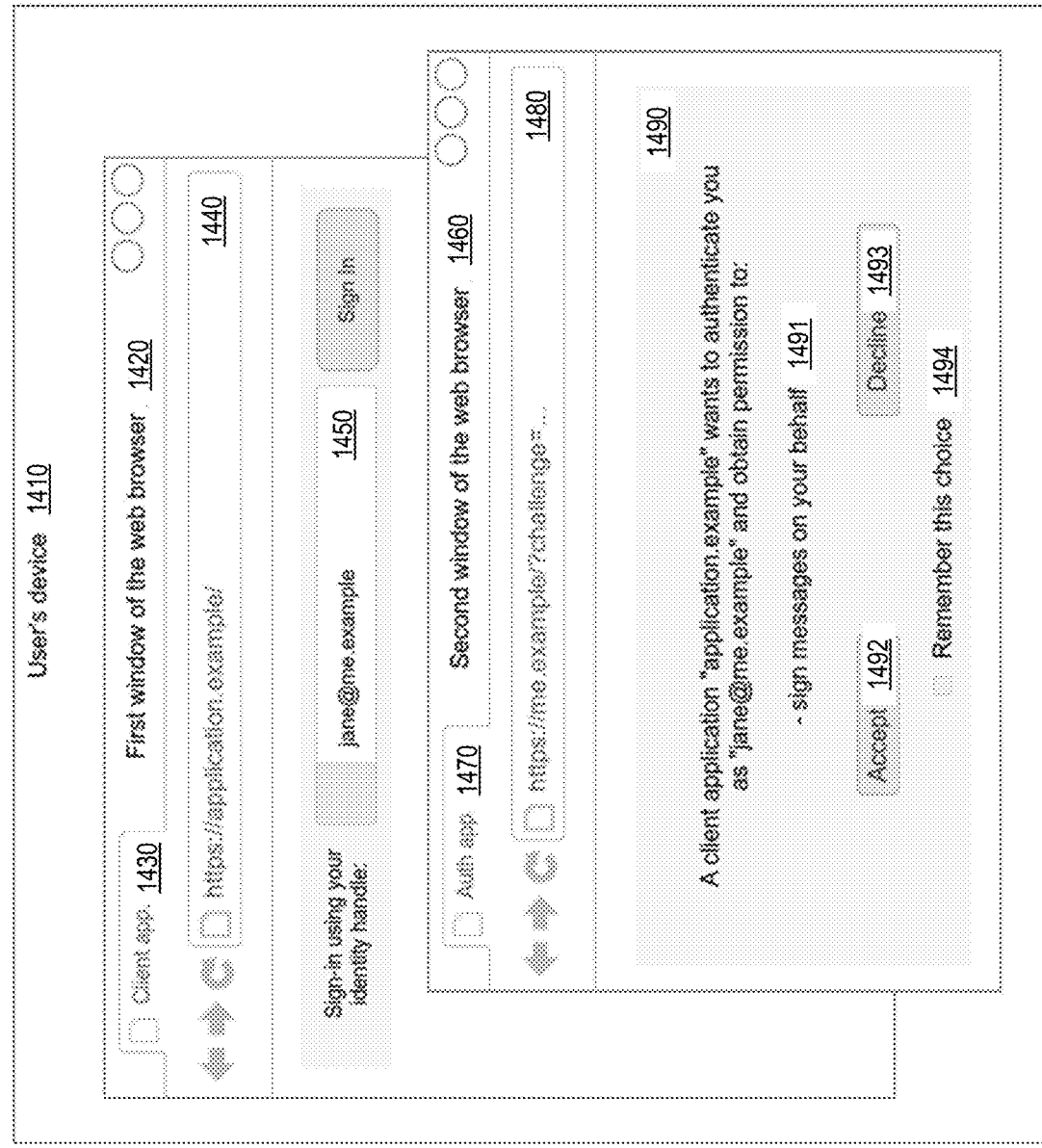
FIG. 14 is a diagram showing a user interface when a client application loaded in a first window of a web browser on the user's device is authenticating the user as identified by the user-provided identity handle through an authentication provider application that is accessed through an authentication endpoint web address that was derived from the user-provided identity handle and is loaded in a second window of the web browser, according to some embodiments.

FIG. 14 is a diagram showing a user interface when a client application loaded in a first window of a web browser on the user's device is authenticating the user as identified by the user-provided identity handle through an authentication provider application that is accessed through an authentication endpoint web address that was derived from the user-provided identity handle and is loaded in a second window of the web browser, according to some embodiments.

As shown in the diagram, the user may attempt to authenticate to a client application 1430 (at a particular address 1440) that was accessed by the user in the first window of the web browser 1420 running on the user's device 1410 by filling a respective form field with the user's identity handle 1450 that the user wishes to use for authentication and submitting the form to the client application 1430 (e.g., by pressing the "Sign In" button). The client application 1430 may receive the user-provided identity handle and derive an authentication endpoint web address 1480 based on the identity handle 1450. The client application 1430 may then prepare a challenge that may be a serialized object (e.g., a JSON serialized object containing the identity handle, the value of remember token, and the list of permissions that the client application 1430 wishes to acquire) and open a new browser window 1460 pointing at the authentication endpoint web address 1480 with the prepared challenge passed as a URL parameter.

The challenge is received by the authentication provider application 1470 loaded in the second window of the web browser 1460, and the authentication provider application 1470 may obtain information from the challenge (e.g., by de-serializing it into an object that contains the identity handle for which authentication is being performed 1450, the value of the remember token, and a list of permissions requested by the client application 1430). The authentication provider application 1470 may then present a message 1490 in its user interface that includes information about the client application 1430 (e.g., as obtained from the challenge or a document.referrer property), the identity handle 1450 that is being authenticated, and an optional list of additional permissions 1491 that are being requested by the client application 1430.

The user may then accept 1492 or decline 1493 such authentication request by clicking on the respective buttons presented in the message 1490. If the user declines 1493 the authentication request, the authentication provider application 1470 may close the second window of the web browser 1460, thus terminating the authentication process. If the user accepts 1492 the authentication request, the authentication provider application 1470 may proceed to sign the received challenge and send the signed challenge back to the client application 1430 through a cross-window communication interface (e.g., using the window.parent.postMessage function). The authentication provider application 1470 may also store information about the additional permissions 1491 that were requested by the client application 1430 and later perform related operations for the client application 1430 when requested by the client application 1430 (e.g., perform message signing, authentication of user to third-party applications, establishment of end-to-end encrypted communication channel, etc.). Prior to clicking on any of the buttons, the user may also check the checkbox 1494 that will make the authentication provider application 1470 remember the user's choice and automatically apply it to future authentication requests from the same client application 1430 (e.g., as identified by the client application's origin and/or the value of the remember token).

Figure 15:
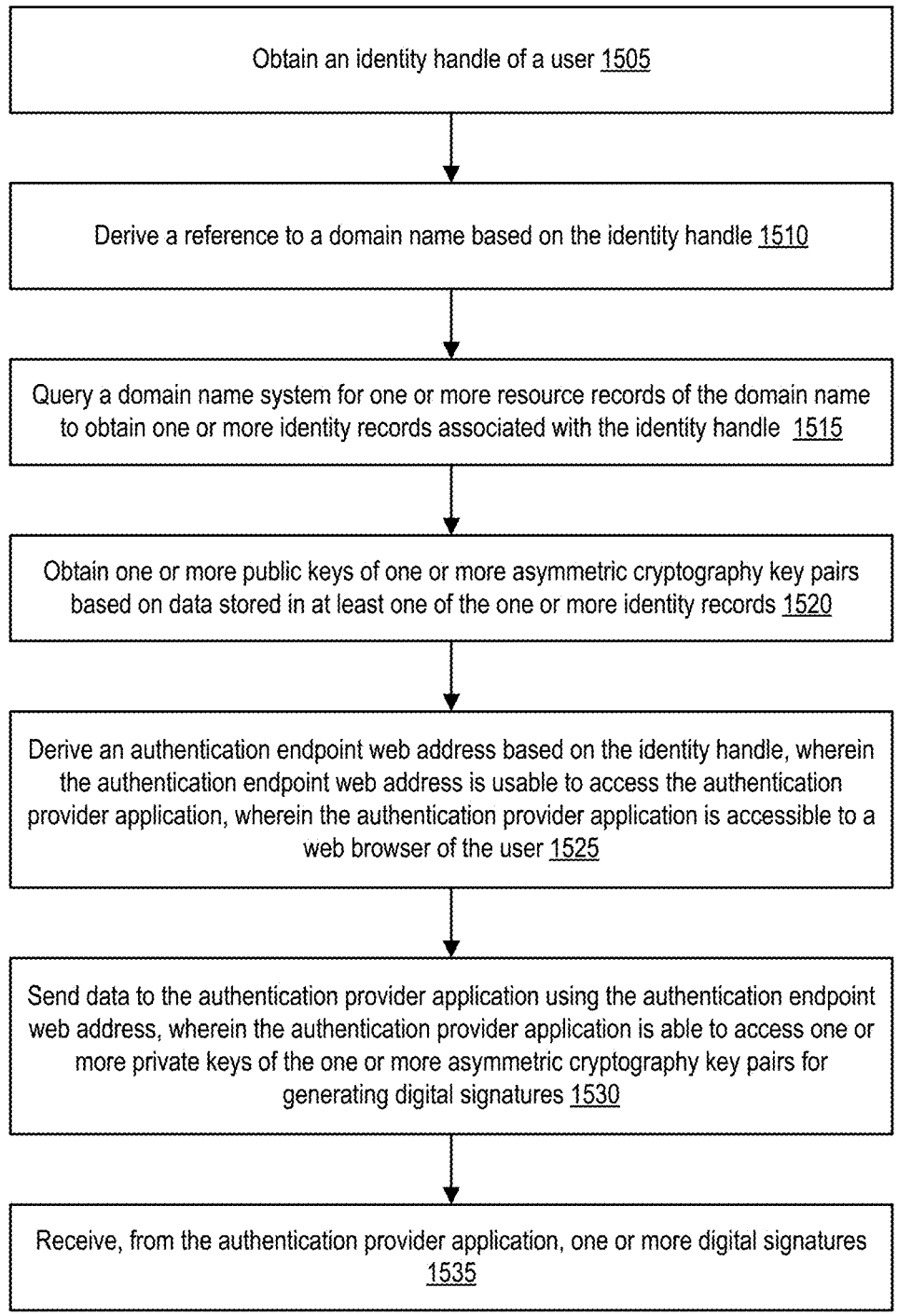
FIG. 15 is a flow diagram of a method for performing authentication, according to some embodiments.

FIG. 15 is a flow diagram of a method for performing authentication, according to some embodiments. In an embodiment, the method is performed by a client application of an authentication provider application.

At operation 1505, the client application obtains an identity handle of a user.

At operation 1510, the client application derives a reference to a domain name based on the identity handle.

At operation 1515, the client application queries a domain name system for one or more resource records of the domain name (e.g., using the reference to the domain name) to obtain one or more identity records associated with the identity handle.

At operation 1520, the client application obtains one or more public keys of one or more asymmetric cryptography key pairs based on data stored in at least one of the one or more identity records.

At operation 1525, the client application derives an authentication endpoint web address based on the identity handle, wherein the authentication endpoint web address is usable to access the authentication provider application, wherein the authentication provider application is accessible to a web browser of the user. In an embodiment, the authentication provider application is installed in the web browser of the user.

At operation 1530, the client application sends data to the authentication provider application using the authentication endpoint web address, wherein the authentication provider application is able to access one or more private keys of the one or more asymmetric cryptography key pairs for generating digital signatures. In an embodiment, the one or more private keys of the one or more asymmetric cryptography key pairs are stored in a client-side storage of the web browser of the user. In an embodiment, the data is sent to the authentication provider application by redirecting a web browser to a URL associated with the authentication endpoint web address, where the URL includes (e.g., as parameters) the data. In an embodiment, an iframe is opened with such URL. In an embodiment, the user is asked to enter such URL in a web browser (e.g., for command-line based client applications).

At operation 1535, the client application receives, from the authentication provider application, one or more digital signatures.

In an embodiment, the client application generates a challenge and includes the challenge in the data that is sent to the authentication provider application, wherein the authentication provider application is to generate a first digital signature based on the challenge using the one or more private keys of the one or more asymmetric cryptography key pairs, the first digital signature being included in the one or more digital signatures (that are received by the client application from the authentication provider application). The client application may then verify the first digital signature based on determining whether the first digital signature cryptographically matches any of the one or more public keys of the one or more asymmetric cryptography key pairs and determine that authentication is successful for the user in response to successfully verifying the first digital signature. As used herein, the phrase of performing an operation "in response to" an event or similar phrase means that the occurrence of the event is a prerequisite for performing the operation. However, it should be appreciated that the occurrence of the event might not be the only prerequisite for performing the operation (e.g., there can be additional conditions that need to be satisfied to perform the operation).

In an embodiment, the client application periodically queries the domain name system for one or more resource records of the domain name to obtain a current one or more identity records associated with the identity handle, obtains a list of one or more current public keys of one or more asymmetric cryptography key pairs based on data stored in at least one of the one or more current identity records, and signs out the user from the client application when one or more of the one or more public keys are not present in the list of one or more current public keys (e.g., when any of the one or more public keys that cryptographically match any of the one or more digital signatures is not present in the list of one or more current public keys).

In an embodiment, the client application receives a first challenge from a third-party application, generates a second challenge that includes the first challenge, and includes the second challenge in the data that is sent to the authentication provider application, wherein the authentication provider application is to generate a first digital signature based on the second challenge using the one or more private keys of the one or more asymmetric cryptography key pairs, the first digital signature being included in the one or more digital signatures (that are received by the client application from the authentication provider application). The client application may then send the first digital signature to the third-party application and access the third-party application on behalf of the user after receiving confirmation that the third-party application has successfully verified the first digital signature.

In an embodiment, the client application obtains a message that is to be digitally signed and includes the message in the data that is sent to the authentication provider application, wherein the authentication provider application is to generate a first digital signature based on the message using the one or more private keys of the one or more asymmetric cryptography key pairs, the first digital signature being included in the one or more digital signatures (that are received by the client application from the authentication provider application). The client application may then send the message and the first digital signature to a third-party application, wherein the third-party application is to verify the first digital signature based on obtaining the one or more public keys of one or more asymmetric cryptography key pairs based on the data stored in at least one of the one or more identity records and determining whether the first digital signature cryptographically matches any of the one or more public keys of the one or more asymmetric cryptography key pairs.

In an embodiment, the client application establishes a communication channel with a third-party application, receives a third-party public key of a third-party asymmetric cryptography key pair from the third-party application over the communication channel, generates a challenge that includes the third-party public key, and includes the challenge in the data that is sent to the authentication provider application, wherein the authentication provider application is to generate a first digital signature based on the challenge using the one or more private keys of the one or more asymmetric cryptography key pairs, the first digital signature being included in the one or more digital signatures (that are received by the client application from the authentication provider application). The client application may then generate a random session key of a symmetric encryption algorithm, encrypt the random session key and the first digital signature using the third-party public key to generate an encrypted payload, send the encrypted payload to the third-party application over the communication channel, and encrypt communications to the third-party application over the communication channel using the random session key with the symmetric encryption algorithm after the third-party application has successfully verified the first digital signature and successfully verified that the challenge includes the third-party public key.

In an embodiment, the client application establishes a communication channel with a second client application, wherein a second user is signed in to the second client application using a second identity handle, generates a first key pair that includes a first private key and a first public key, and includes the first public key in the data that is sent to the authentication provider application, wherein the authentication provider application is to generate a first digital signature based on the first public key using the one or more private keys of the one or more asymmetric cryptography key pairs, the first digital signature being included in the one or more digital signatures (that are received by the client application from the authentication provider application). The client application may then send the first public key, the first digital signature, and the identity handle of the user to the second client application over the communication channel, receive a second public key, a second digital signature corresponding to the second public key, and the second identity handle from the second client application, derive a reference to a second domain name based on the second identity handle, query the domain name system for second one or more resource records of the second domain name to obtain second one or more identity records associated with the second identity handle, obtain second one or more public keys of a second one or more asymmetric cryptography key pairs based on data stored in at least one of the second one or more identity records, verify the second digital signature based on determining whether the second digital signature matches any of the second one or more public keys of the second one or more asymmetric cryptography key pairs, obtain a session encryption key using a key agreement algorithm with the first private key and the second public key in response to successfully verifying the second digital signature, encrypt communications to the second client application over the communication channel, and decrypt communications received from the second client application over the communication channel using the session encryption key.

Figure 16:
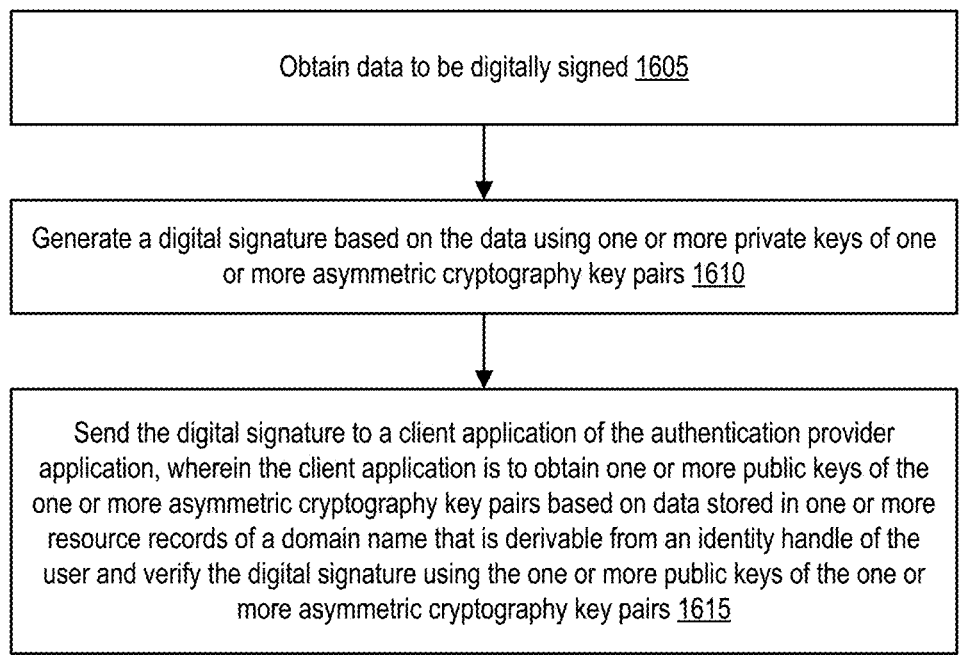
FIG. 16 is a flow diagram of a method for performing authentication, according to some embodiments.

FIG. 16 is a flow diagram of a method for performing authentication, according to some embodiments. In an embodiment, the method is performed by an authentication provider application.

At operation 1605, the authentication provider application obtains data to be digitally signed.

At operation 1610, the authentication provider application generates a digital signature based on the data using one or more private keys of one or more asymmetric cryptography key pairs.

At operation 1615, the authentication provider application sends the digital signature to a client application of the authentication provider application, wherein the client application is to obtain one or more public keys of the one or more asymmetric cryptography key pairs based on data stored in one or more resource records of a domain name that is derivable from an identity handle of the user and verify the digital signature using the one or more public keys of the one or more asymmetric cryptography key pairs.

In an embodiment, at least part of the data is received from the client application. In an embodiment, the authentication provider application is accessible using an authentication endpoint web address that is derivable from the identity handle of the user.

In an embodiment, the data is generated by the authentication provider application and the data is sent to the client application with the digital signature.

In an embodiment, the authentication provider application is installed in the web browser of the user.

In an embodiment, at least one of the one or more private keys is stored in a client-side storage of the web browser. In an embodiment, at least one of the one or more private keys is stored by an external service and the digital signature is provided by the external service to the authentication provider application.

Figure 17A:
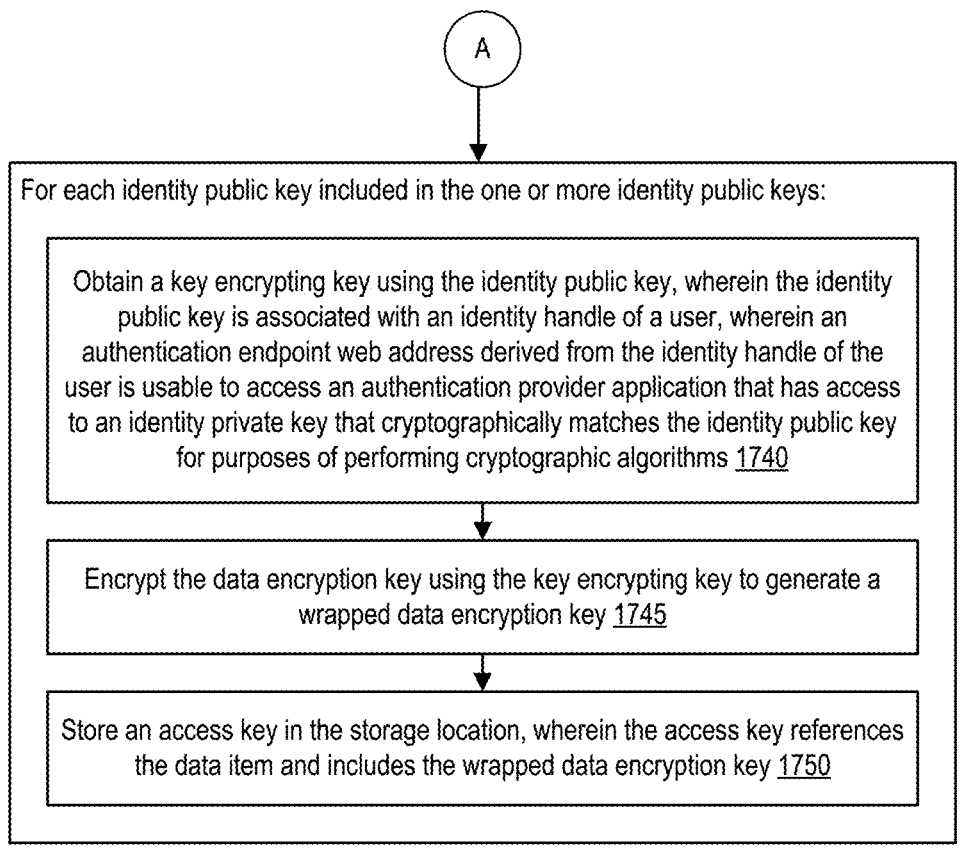
FIG. 17A is a flow diagram of a method for encrypting and storing a data item, according to some embodiments.

FIG. 17A is a flow diagram of a method for encrypting and storing a data item, according to some embodiments. In an embodiment, the method is performed by an application.

At operation 1705, the application obtains a data encryption key.

At operation 1710, the application encrypts the data item using the data encryption key to generate an encrypted data item.

At operation 1715, the application stores the encrypted data item in a storage location.

At operation 1720, the application obtains one or more identity handles of one or more users that should be given an ability to access a decrypted form of the data item.

At operation 1725, the application derives one or more references to one or more domain names based on the one or more identity handles.

At operation 1730, the application queries a domain name system for one or more resource records of the one or more domain names to obtain one or more identity records associated with the one or more identity handles.

At operation 1735, the application obtains one or more identity public keys associated with the one or more identity handles based on data stored in the one or more identity records.

The application may perform operations 1740-1750 for each identity public key included in the one or more identity public keys.

At operation 1740, the application obtains a key encrypting key using the identity public key, wherein the identity public key is associated with an identity handle of a user, wherein an authentication endpoint web address derived from the identity handle of the user is usable (e.g., by the user or by a client application installed/running on the device of the user to which the identity public key belongs to) to access an authentication provider application that has access to an identity private key that cryptographically matches the identity public key for purposes of performing cryptographic algorithms.

In an embodiment, obtaining the key encrypting key using the identity public key comprises generating an EC key pair that includes an EC private key and an EC public key and generating the key encrypting key using a key agreement algorithm with the EC private key and the identity public key, wherein the EC public key is stored as part of the access key in the storage location. In an embodiment, the key encrypting key is the same as the identity public key and an asymmetric encryption algorithm is used to encrypt the data encryption key.

In an embodiment, obtaining the key encrypting key using the identity public key comprises sending the identity public key to an authentication provider application accessible to a web browser of a user that is granting access to the data item and receiving the key encrypting key from the authentication provider application, wherein the authentication provider application is to use a key agreement algorithm with the identity public key and a private key accessible to the authentication provider application to generate the key encrypting key.

At operation 1745, the application encrypts the data encryption key using the key encrypting key to generate a wrapped data encryption key.

At operation 1750, the application stores an access key in the storage location, wherein the access key references the data item and includes the wrapped data encryption key. In an embodiment, the access key also includes the previously generated EC public key.

FIG. 17B is a flow diagram of a method for querying for and decrypting a data item, according to some embodiments. In an embodiment, the method is performed by a client application of an authentication provider application. The client application performing the method may be the same as or different from the application that performs the method of the flow diagram shown in FIG. 17A.

At operation 1755, the client application queries a storage location for the data item.

At operation 1760, the client application obtains, as a result of the querying, an encrypted data item and one or more access keys that reference the data item.

At operation 1765, the client application sends data extracted from the one or more access keys to an authentication provider application accessible to a web browser of a user that should have an ability to access a decrypted form of the data item. In an embodiment, the data contains one or more elliptic-curve (EC) public keys. In an embodiment, the one or more EC public keys are the same as one or more identity public keys. In an embodiment, the one or more identity public keys or a reference thereof act as a hint to the authentication provider application on which key to use.

At operation 1770, the client application receives the key encrypting key from the authentication provider application. In an embodiment, the authentication provider application uses the data (that the client application sent to the authentication provider application at operation 1765) to obtain the key encrypting key. For example, the authentication provider application may use a key agreement algorithm with one of the one or more EC public keys and the identity private key to obtain the key encrypting key. In an embodiment the authentication provider application received from the client application the wrapped data encryption key and uses the identity private key with asymmetric encryption algorithm to decrypt the wrapped data encryption key to obtain a data encryption key.

At operation 1775, the client application decrypts the wrapped data encryption key extracted from one of the one or more access keys using the key encrypting key to obtain the data encryption key.

At operation 1780, the client application decrypts the encrypted data item using the data encryption key to obtain the decrypted form of the data item.

Figure 18:
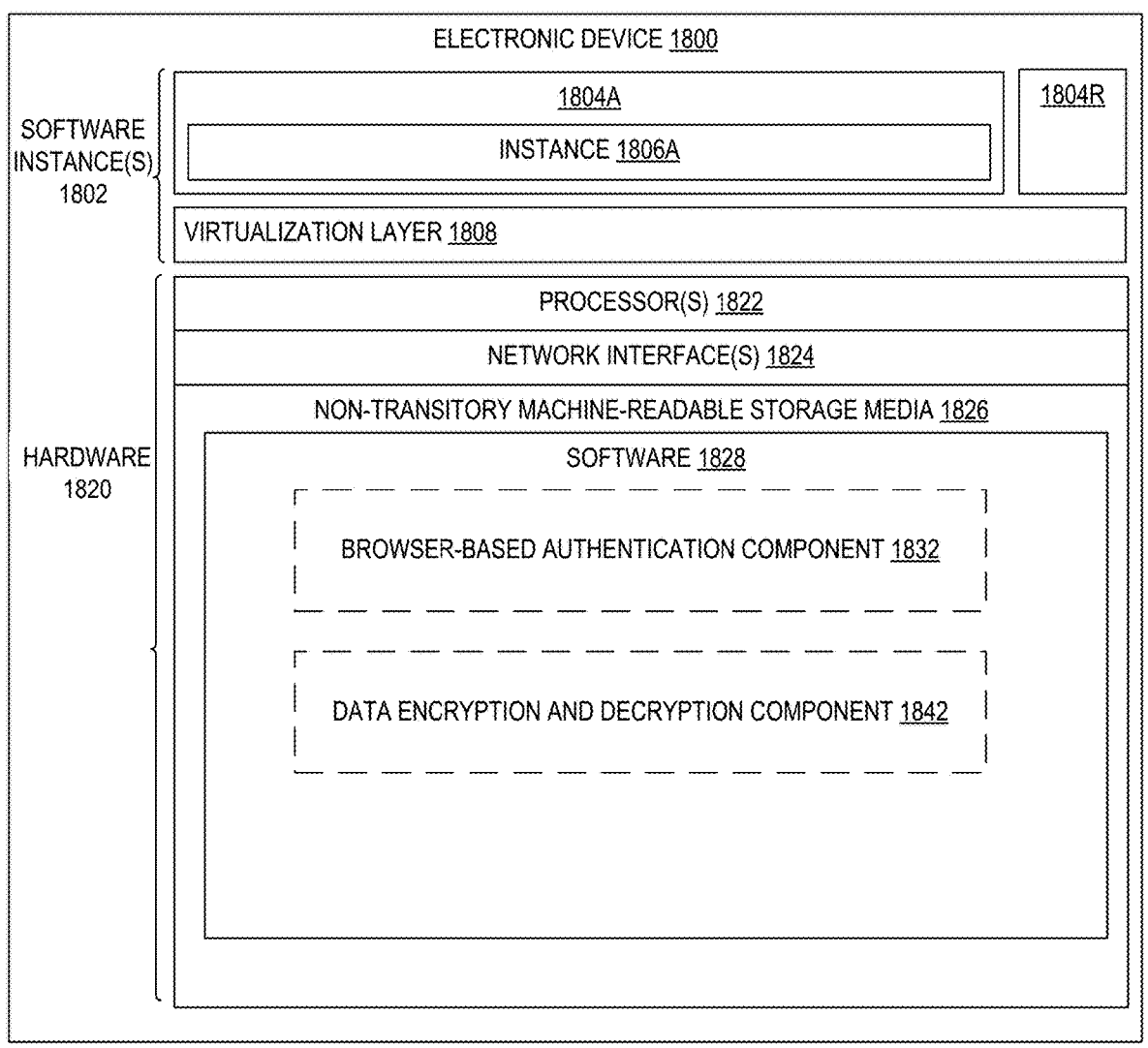
FIG. 18 is a diagram showing an electronic/network device, according to some embodiments.

FIG. 18 is a diagram showing an electronic/network device, according to some embodiments. FIG. 18 illustrates hardware 1820 comprising a set of one or more processor(s) 1822, a set of one or more network interfaces 1824 (wireless and/or wired), and non-transitory machine-readable storage medium/media 1826 having stored therein software 1828 (which includes instructions executable by the set of one or more processor(s) 1822). Software 1828 can include code such as browser-based authentication component 1832 and/or data encryption and decryption component 1842, which when executed by hardware 1820, causes the electronic device 1800 to perform operations of one or more embodiments described herein (e.g., operations of the authentication provider application 140 and/or operations of the client application 160 for authenticating users using the authentication scheme described herein and/or encrypting/decrypting data stored using the data storage scheme described herein).

In electronic devices that use compute virtualization, the set of one or more processor(s) 1822 typically execute software to instantiate a virtualization layer 1808 and software container(s) 18104A-R (e.g., with operating system-level virtualization, the virtualization layer 1808 represents the kernel of an operating system (or a shim executing on a base operating system) that allows for the creation of multiple software containers 1804A-R (representing separate user space instances and also called virtualization engines, virtual private servers, or jails) that may each be used to execute a set of one or more applications; with full virtualization, the virtualization layer 1808 represents a hypervisor (sometimes referred to as a virtual machine monitor (VMM)) or a hypervisor executing on top of a host operating system, and the software containers 1804A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1828 (illustrated as instance 1806A) is executed within the software container 1804A on the virtualization layer 1808. In electronic devices where compute virtualization is not used, the instance 1806A on top of a host operating system is executed on the "bare metal" electronic device 1800. The instantiation of the instance 1806A, as well as the virtualization layer 1808 and software containers 1104A-R if implemented, are collectively referred to as software instance(s) 1802.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device, etc.). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While the invention has been described in terms of several embodiments, those skilled in the art will recognize that the invention is not limited to the embodiments described, can be practiced with modification and alteration within the spirit and scope of the appended claims/embodiments. The description is thus to be regarded as illustrative instead of limiting.

What is claimed is:

1. A method performed by a client application of an authentication provider application to perform authentication, the method comprising:
    obtaining an identity handle of a user;
    deriving a reference to a domain name based on the identity handle;
    querying a domain name system for one or more publicly accessible resource records of the domain name to obtain one or more identity records associated with the identity handle;
    obtaining one or more public keys of one or more asymmetric cryptography key pairs based on data stored in at least one of the one or more identity records;
    deriving an authentication endpoint web address based on the identity handle, wherein the deriving the authentication endpoint web address involves performing a string manipulation operation on the identity handle to obtain a second domain name, querying the domain name system for a second one or more publicly accessible resource records of the second domain name, and obtaining an indication of the authentication endpoint web address from the second one or more publicly accessible resource records, wherein the authentication endpoint web address is a uniform resource locator (URL) usable by the client application to access the authentication provider application through a web browser of the user, wherein the authentication provider application is executed in the web browser of the user under the URL, wherein the URL is different from a web address that is usable to access the client application through the web browser of the user;
    generating a challenge;
    sending data, including the challenge, to the authentication provider application using the authentication endpoint web address, wherein the authentication provider application is able to access one or more private keys of the one or more asymmetric cryptography key pairs for generating digital signatures, wherein the authentication provider application is to generate a first digital signature based on the challenge using the one or more private keys of the one or more asymmetric cryptography key pairs;
    receiving, from the authentication provider application, one or more digital signatures including the first digital signature;
    verifying the first digital signature based on determining, using the challenge, whether the first digital signature cryptographically matches one or more of the one or more public keys of the one or more asymmetric cryptography key pairs; and
    authenticating the user in response to successfully verifying at least the first digital signature.

2. The method of claim 1, wherein the one or more private keys of the one or more asymmetric cryptography key pairs are stored in a client-side storage of the web browser of the user.

3. The method of claim 1, further comprising:
    periodically querying the domain name system for current one or more publicly accessible resource records of the domain name to obtain a current one or more identity records associated with the identity handle;
    obtaining a list of one or more current public keys of one or more current asymmetric cryptography key pairs based on data stored in at least one of the one or more current identity records; and
    automatically signing out the user from the client application when one or more of the one or more public keys are not present in the list of one or more current public keys regardless of user activity or inactivity in the client application.

4. The method of claim 1, further comprising:
    obtaining a message that is to be digitally signed;
    sending second data, including the message, to the authentication provider application, wherein the authentication provider application is to generate a second digital signature based on the message using the one or more private keys of the one or more asymmetric cryptography key pairs;

receiving, from the authentication provider application, second one or more digital signatures including the second digital signature; and sending and the second digital signature to a third-party application, wherein the third-party application is to verify the second digital signature based on obtaining the one or more public keys of one or more asymmetric cryptography key pairs based on the data stored in at least one of the one or more identity records and determining, using the message, whether the second digital signature cryptographically matches one or more of the one or more public keys of the one or more asymmetric cryptography key pairs.

5. The method of claim 1, further comprising:

establishing a communication channel with a third-party application;

receiving a third-party public key of a third-party asymmetric cryptography key pair from the third-party application over the communication channel;

generating a second challenge that includes the third-party public key;

sending second data, including the second challenge, to the authentication provider application, wherein the authentication provider application is to generate a second digital signature based on the second challenge using the one or more private keys of the one or more asymmetric cryptography key pairs;

receiving, from the authentication provider application, second one or more digital signatures including the second digital signature;

generating a random session key of a symmetric encryption algorithm;

encrypting the random session key and the second digital signature using the third-party public key to generate an encrypted payload;

sending the encrypted payload to the third-party application over the communication channel; and encrypting communications to the third-party application over the communication channel using the random session key with the symmetric encryption algorithm after the third-party application has successfully verified the second digital signature and successfully verified that the second challenge includes the third-party public key.

6. The method of claim 1, further comprising:

establishing a communication channel with a second client application, wherein a second user is signed in to the second client application using a second identity handle;

generating a first key pair that includes a first private key and a first public key;

sending second data, including the first public key, to the authentication provider application, wherein the authentication provider application is to generate a second digital signature based on the first public key using the one or more private keys of the one or more asymmetric cryptography key pairs;

receiving, from the authentication provider application, second one or more digital signatures including the second digital signature;

sending the first public key, the second digital signature, and the identity handle of the user to the second client application over the communication channel;

receiving a second public key, a third digital signature corresponding to the second public key, and the second identity handle from the second client application;

deriving a reference to a third domain name based on the second identity handle;

querying the domain name system for third one or more resource records of the third domain name to obtain second one or more identity records associated with the second identity handle;

obtaining second one or more public keys of a second one or more asymmetric cryptography key pairs based on data stored in at least one of the second one or more identity records;

verifying the third digital signature based on determining, using the second public key, whether the third digital signature cryptographically matches one or more of the second one or more public keys of the second one or more asymmetric cryptography key pairs;

obtaining a session encryption key using a key agreement algorithm with the first private key and the second public key in response to successfully verifying the third digital signature; and encrypting communications to the second client application over the communication channel and decrypting communications received from the second client application over the communication channel using the session encryption key.

7. A non-transitory machine-readable storage medium storing instructions that, when executed by a computing system implementing a client application of an authentication provider application, causes the client application to perform operations comprising:

obtaining an identity handle of a user;

deriving a reference to a domain name based on the identity handle;

querying a domain name system for one or more publicly accessible resource records of the domain name to obtain one or more identity records associated with the identity handle;

obtaining one or more public keys of one or more asymmetric cryptography key pairs based on data stored in at least one of the one or more identity records;

deriving an authentication endpoint web address based on the identity handle, wherein the deriving the authentication endpoint web address involves performing a string manipulation operation on the identity handle to obtain a second domain name, querying the domain name system for a second one or more publicly accessible resource records of the second domain name, and obtaining an indication of the authentication endpoint web address from the second one or more publicly accessible resource records, wherein the authentication endpoint web address is a uniform resource locator (URL) usable by the client application to access the authentication provider application through a web browser of the user, wherein the authentication provider application is executed in the web browser of the user under the URL, wherein the URL is different from a web address that is usable to access the client application through the web browser of the user;

generating a challenge;

sending data, including the challenge, to the authentication provider application using the authentication endpoint web address, wherein the authentication provider application is able to access one or more private keys of the one or more asymmetric cryptography key pairs for generating digital signatures, wherein the authentication provider application is to generate a first digital signature based on the challenge using the one or more private keys of the one or more asymmetric cryptography key pairs;

receiving, from the authentication provider application, one or more digital signatures including the first digital signature;

verifying the first digital signature based on determining, using the challenge, whether the first digital signature cryptographically matches one or more of the one or more public keys of the one or more asymmetric cryptography key pairs; and authenticating the user in response to successfully verifying at least the first digital signature.

8. The method of claim 1, wherein the authentication endpoint web address is pointed at a web server that serves the authentication provider application to the web browser of the user.

9. The method of claim 1, wherein the authentication provider application is accessible under the URL without a need for the web browser of the user to contact a web server.

10. The non-transitory machine-readable storage medium of claim 7,
wherein the operations further comprise:
obtaining a message that is to be digitally signed;
sending second data, including the message, to the authentication provider application, wherein the authentication provider application is to generate a second digital signature based on the message using the one or more private keys of the one or more asymmetric cryptography key pairs;
receiving, from the authentication provider application, second one or more digital signatures including the second digital signature; and
sending the second digital signature to a third-party application, wherein the third-party application is to verify the second digital signature based on obtaining the one or more public keys of one or more asymmetric cryptography key pairs based on the data stored in at least one of the one or more identity records and determining, using the message, whether the second digital signature cryptographically matches one or more of the one or more public keys of the one or more asymmetric cryptography key pairs.

11. The non-transitory machine-readable storage medium of claim 7, wherein the operations further comprise:
establishing a communication channel with a third-party application;
receiving a third-party public key of a third-party asymmetric cryptography key pair from the third-party application over the communication channel;
generating a second challenge that includes the third-party public key;
sending second data, including the second challenge, to the authentication provider application, wherein the authentication provider application is to generate a second digital signature based on the second challenge using the one or more private keys of the one or more asymmetric cryptography key pairs;
receiving, from the authentication provider application, second one or more digital signatures including the second digital signature;
generating a random session key of a symmetric encryption algorithm;
encrypting the random session key and the second digital signature using the third-party public key to generate an encrypted payload;
sending the encrypted payload to the third-party application over the communication channel; and
encrypting communications to the third-party application over the communication channel using the random session key with the symmetric encryption algorithm after the third-party application has successfully verified the second digital signature and successfully verified that the second challenge includes the third-party public key.

12. The non-transitory machine-readable storage medium of claim 7, wherein the operations further comprise:
establishing a communication channel with a second client application, wherein a second user is signed in to the second client application using a second identity handle;
generating a first key pair that includes a first private key and a first public key;
sending second data, including the first public key, to the authentication provider application, wherein the authentication provider application is to generate a second digital signature based on the first public key using the one or more private keys of the one or more asymmetric cryptography key pairs;
receiving, from the authentication provider application, second one or more digital signatures including the second digital signature;
sending the first public key, the second digital signature, and the identity handle of the user to the second client application over the communication channel;
receiving a second public key, a third digital signature corresponding to the second public key, and the second identity handle from the second client application;
deriving a reference to a third domain name based on the second identity handle;
querying the domain name system for third one or more resource records of the third domain name to obtain second one or more identity records associated with the second identity handle;
obtaining second one or more public keys of a second one or more asymmetric cryptography key pairs based on data stored in at least one of the second one or more identity records;
verifying the third digital signature based on determining, using the second public key, whether the third digital signature cryptographically matches one or more of the second one or more public keys of the second one or more asymmetric cryptography key pairs;
obtaining a session encryption key using a key agreement algorithm with the first private key and the second public key in response to successfully verifying the third digital signature; and
encrypting communications to the second client application over the communication channel and decrypting communications received from the second client application over the communication channel using the session encryption key.

13. A method performed by a client application of an authentication provider application to perform authentication, the method comprising:
obtaining an identity handle of a user;
deriving a reference to a domain name based on the identity handle;
querying a domain name system for one or more publicly accessible resource records of the domain name to obtain one or more identity records associated with the identity handle;

obtaining one or more public keys of one or more asymmetric cryptography key pairs based on data stored in at least one of the one or more identity records;

deriving an authentication endpoint web address based on the identity handle, wherein the authentication endpoint web address is a uniform resource locator (URL) usable by the client application to access the authentication provider application through a web browser of the user, wherein the authentication provider application is executed in the web browser of the user under the URL, wherein the URL is different from a web address that is usable to access the client application through the web browser of the user;

receiving a first challenge from a third-party application;

generating a second challenge that includes the first challenge;

sending data, including the second challenge, to the authentication provider application using the authentication endpoint web address, wherein the authentication provider application is able to access one or more private keys of the one or more asymmetric cryptography key pairs for generating digital signatures, wherein the authentication provider application is to generate a first digital signature based on the second challenge using the one or more private keys of the one or more asymmetric cryptography key pairs;

receiving, from the authentication provider application, one or more digital signatures including the first digital signature;

sending the first digital signature to the third-party application; and accessing the third-party application on behalf of the user after receiving confirmation that the third-party application has successfully verified the first digital signature.

14. A non-transitory machine-readable storage medium storing instructions that, when executed by a computing system implementing a client application of an authentication provider application, causes the client application to perform operations comprising:

obtaining an identity handle of a user;

deriving a reference to a domain name based on the identity handle;

querying a domain name system for one or more publicly accessible resource records of the domain name to obtain one or more identity records associated with the identity handle;

obtaining one or more public keys of one or more asymmetric cryptography key pairs based on data stored in at least one of the one or more identity records;

deriving an authentication endpoint web address based on the identity handle, wherein the authentication endpoint web address is a uniform resource locator (URL) usable by the client application to access the authentication provider application through a web browser of the user, wherein the authentication provider application is executed in the web browser of the user under the URL, wherein the URL is different from a web address that is usable to access the client application through the web browser of the user;

receiving a first challenge from a third-party application;

generating a second challenge that includes the first challenge;

sending data, including the second challenge, to the authentication provider application using the authentication endpoint web address, wherein the authentication provider application is able to access one or more private keys of the one or more asymmetric cryptography key pairs for generating digital signatures, wherein the authentication provider application is to generate a first digital signature based on the second challenge using the one or more private keys of the one or more asymmetric cryptography key pairs;

receiving, from the authentication provider application, one or more digital signatures including the first digital signature;

sending the first digital signature to the third-party application; and accessing the third-party application on behalf of the user after receiving confirmation that the third-party application has successfully verified the first digital signature.

* * * * *